(12) United States Patent
Kawakami

(10) Patent No.: US 11,327,758 B2
(45) Date of Patent: May 10, 2022

(54) NON-TRANSITORY COMPUTER-READABLE RECORDING MEDIUM, ASSEMBLY INSTRUCTION CONVERSION METHOD AND INFORMATION PROCESSING APPARATUS

(71) Applicant: FUJITSU LIMITED, Kawasaki (JP)

(72) Inventor: Kentaro Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/213,398

(22) Filed: Mar. 26, 2021

(65) Prior Publication Data

US 2022/0027155 A1 Jan. 27, 2022

(30) Foreign Application Priority Data

Jul. 27, 2020 (JP) .............................. JP2020-126706

(51) Int. Cl.
 *G06F 9/44* (2018.01)
 *G06F 9/30* (2018.01)
 *G06F 8/41* (2018.01)

(52) U.S. Cl.
 CPC ............ *G06F 9/3017* (2013.01); *G06F 8/447* (2013.01); *G06F 8/4435* (2013.01); *G06F 9/30043* (2013.01); *G06F 9/30098* (2013.01)

(58) Field of Classification Search
 None
 See application file for complete search history.

(56) References Cited

U.S. PATENT DOCUMENTS

| | | | | |
|---|---|---|---|---|
| 11,106,623 | B1* | 8/2021 | McKown | G06F 9/45533 |
| 2003/0130834 | A1* | 7/2003 | Krishnan | G06F 9/45504 |
| | | | | 717/138 |
| 2007/0055849 | A1* | 3/2007 | Chang | G06F 9/30156 |
| | | | | 712/226 |
| 2019/0197653 | A1* | 6/2019 | Artico | G06F 8/443 |

FOREIGN PATENT DOCUMENTS

| | | |
|---|---|---|
| JP | S63-138427 A | 6/1988 |
| JP | 2001-511556 A | 8/2001 |
| JP | 2009-258796 A | 11/2009 |

* cited by examiner

*Primary Examiner* — Qamrun Nahar
(74) *Attorney, Agent, or Firm* — Fujitsu Patent Center

(57) ABSTRACT

A non-transitory computer-readable recording medium having stored therein a program for causing a computer to execute a process. The process includes storing each of a plurality of generation instructions in a storage area for each of assembly instructions, the generation instructions instructing the generation of instruction sequences of a first instruction set, each instruction sequence of the first instruction set executing a processing equivalent to each assembly instruction of a second instruction set, identifying a first register that is not used by any of the assembly instructions corresponding to the plurality of generation instructions by referring to the storage area, determining a second register of the first instruction set corresponding to the first register as a temporary register in each of the instruction sequences, and generating the instruction sequence that uses the temporary register.

10 Claims, 40 Drawing Sheets

FIG. 16

(CONDITION A)
DESTINATION REGISTER OF ASSEMBLY INSTRUCTION 65b IS DIFFERENT FROM SOURCE REGISTER OF ASSEMBLY INSTRUCTION 65a (CONDITION B)
DESTINATION REGISTER AND SOURCE REGISTER OF ASSEMBLY INSTRUCTION 65b ARE DIFFERENT FROM EACH OTHER

FIG. 20

65a —— vpadd zmm29, zmm0, [r8]
65b —— vpadd zmm30, zmm1, [r8+64]
65c —— vpadd zmm31, zmm2, [r8+128]
65d —— vpadd zmm29, zmm3, [r8+192]

FIG. 25A

{zmm8} ← 87

```
class ZmmReg { // TYPE REPRESENTING OPERAND OF ZMM REGISTER
  int index;
}
class memOperand { // TYPE REPRESENTING MEMORY OPERAND
  int index; // NUMBER OF GENERAL-PURPOSE REGISTER
             //   HOLDING BASE ADDRESS
  int offset; // OFFSET VALUE OF ADDRESS TO BE
              //   ADDED TO BASE ADDRESS
}
class ZRegS { // TYPE REPRESENTING OPERAND OF Z REGISTER
              //   INCLUDING 16 PIECES OF 32-BIT DATA
  int index;
}
class XReg{ // TYPE REPRESENTING OPERAND OF
            //   GENERAL-PURPOSE REGISTER
  int index;
}
```

FIG. 26B

```
                                    101
  void vpadd(ZmmReg dst, ZmmReg src, memOperand memOp) {

102 ── if(TYPE OF ASSEMBLY INSTRUCTION INDICATED BY
        GENERATION INSTRUCTION IN FIFO BUFFER IS
        DIFFERENT FROM TYPE OF MNEMONIC FUNCTION vpadd) {
103 ── genJitCodeFifo();
      } else {
104 ── STORE GENERATION INSTRUCTION OF ASSEMBLY
        INSTRUCTION "vpadd dst, src, memOp" IN FLFO BUFFER
      }
  }
                                    100
```

```
            113
   void ret() {
114  if(TYPE OF ASSEMBLY INSTRUCTION INDICATED BY GENERATION
        INSTRUCTION IN FIFO BUFFER IS DIFFERENT FROM TYPE OF
        MNEMONIC FUNCTION ret) {
103  genJitCodeFifo();
     } else {
115  STORE GENERATION INSTRUCTION OF ASSEMBLY INSTRUCTION
        "ret" IN FLFO BUFFER
     }
   }
```

FIG. 29

```
void genJitCodeOfFifo() {                    ~103
    instType = NAME OF ASSEMBLY INSTRUCTION AND TYPE OF OPERAND INDICATED
              BY GENERATION INSTRUCTION IN FIFO BUFFER;

if(instType == (NAME OF ASSEMBLY INSTRUCTION IS vpadd, TYPE OF FIRST OPERAND IS zmmReg,   ~117
                    TYPE OF SECOND OPERAND IS zmmReg, AND TYPE OF THIRD OPERAND IS memOperand))
    {
        translateVPADD();    ~118
    } else if(instType == (NAME OF ASSEMBLY INSTRUCTION IS X, TYPE OF FIRST OPERAND IS Y,
                           TYPE OF SECOND OPERAND IS Z, AND TYPE OF THIRD OPERAND IS W))
    {
        translateX();                                                                          ~119
    } else if(instType == (NAME OF ASSEMBLY INSTRUCTION IS ret, TYPE OF FIRST OPERAND IS void,
                           (OPERAND IS NOT SPECIFIED), TYPE OF SECOND OPERAND IS void, AND TYPE OF THIRD OPERAND IS void))
    {
        translateRET();    ~120
    } else if(instType == (NAME OF ASSEMBLY INSTRUCTION IS A, TYPE OF FIRST OPERAND IS B,
                           TYPE OF SECOND OPERAND IS C, AND TYPE OF THIRD OPERAND IS D))
    {
        translateA();
    }
    EMPTY FIFO BUFFER    ~121
}
```

FIG. 30

```
                    118
    void translateVPADD() {
      ZRegS zSdst, zSsrc1, zSsrc2;
      XReg xaddr;
125   zSrc2.index = getTmpIndexConsideringFifo();
126   str(zSrc2, [x9]);
      int num = NUMBER OF GENERATION INSTRUCTIONS
                IN FIFO BUFFER;
      for(int i=0; i<num; i++) {
        if(memOp.offset OF i-TH GENERATION INSTRUCTION
           IN FIFO BUFFER == 0) {
127       xaddr.index = memOp.index OF i-TH GENERATION
                        INSTRUCTION IN FIFO BUFFER;
        } else {
          XReg tmp;
128       tmp.index = memOp.index OF i-TH GENERATION
                      INSTRUCTION IN FIFO BUFFER;
129       add(x25, tmp, memOp.offset OF i-TH ELEMENT IN fifo);
130       xaddr.index = 25;
        }
131     ldr(zSrc2, [xaddr]);
132     add(zSdst, zSsrc1, zSsrc2);
      }
133   ldr(zSrc2, [x9]);
    }
```

FIG. 35

(CONDITION A)
DESTINATION REGISTER OF ASSEMBLY INSTRUCTION CORRESPONDING TO MNEMONIC FUNCTION 100b IS DIFFERENT FROM SOURCE REGISTER OF ASSEMBLY INSTRUCTION CORRESPONDING TO MNEMONIC FUNCTION 100a (CONDITION B)
DESTINATION REGISTER AND SOURCE REGISTER OF ASSEMBLY INSTRUCTION CORRESPONDING TO MNEMONIC FUNCTION 100b ARE DIFFERENT FROM EACH OTHER

FIG. 36

```
                    118
                    /
void translateVPADD() {
  ZRegS zSdst, zSsrc1, zSsrc2;
  XReg xaddr;
171── zSrc2.index = getTmpIndexConsideringFifo();
172── bool TmpCanDiscard = isTmpCanDiscard();

if(TmpCanDiscard == fasle) {
173──   str(zSrc2, [x9]);
  } if( memOp.offset OF 0-TH GENERATION INSTRUCTION
          IN FIFO BUFFER == 0) {
174──     xaddr.index = memOp.index OF 0-TH
                        GENERATION INSTRUCTION IN FIFO BUFFER;
    } else {
       XReg tmp;
175──   tmp.index = memOp.index OF 0-TH
                    GENERATION INSTRUCTION IN FIFO BUFFER;
176──   add(x25, tmp, memOp.offset OF 0-TH
                GENERATION INSTRUCTION IN FIFO BUFFER);
177──   xaddr.index = 25;
    }
178──  ldr(zSrc2, [xaddr]);
179──  add(zSdst, zSsrc1, zSsrc2);

if(TmpCanDiscard == false) {
180──   ldr(zSrc2, [x9]);
  }
}
```

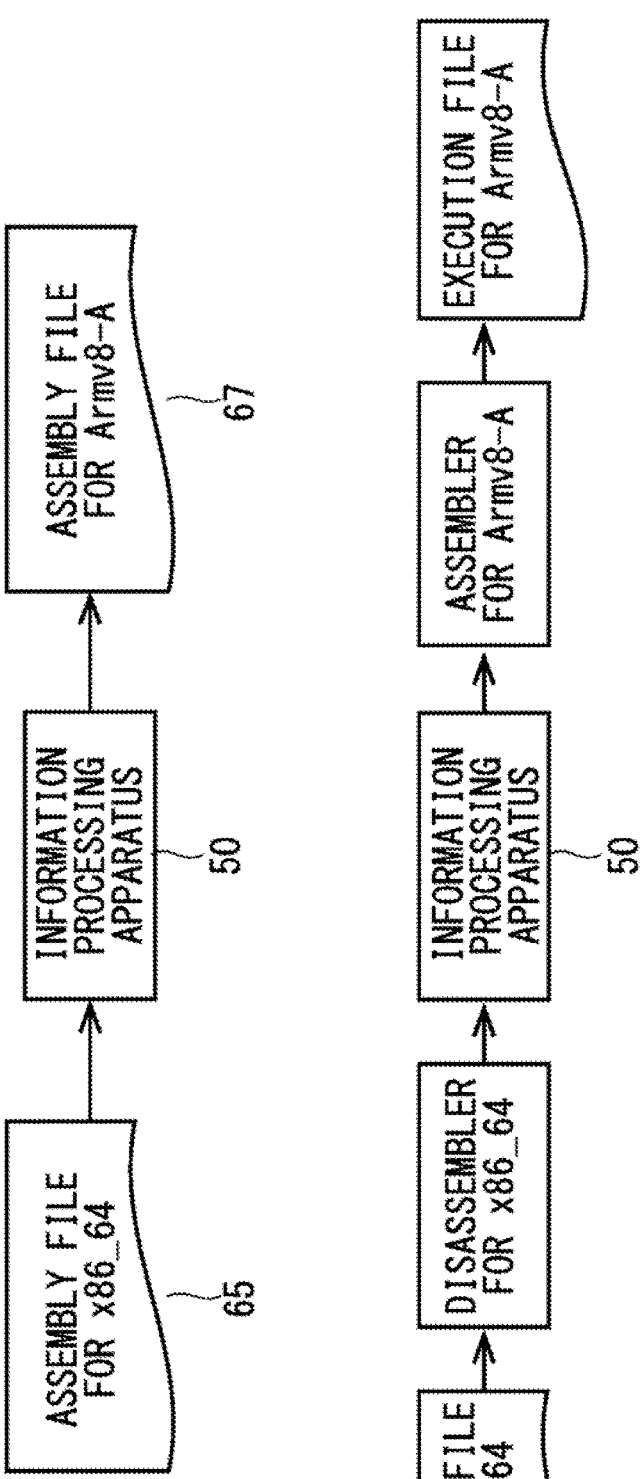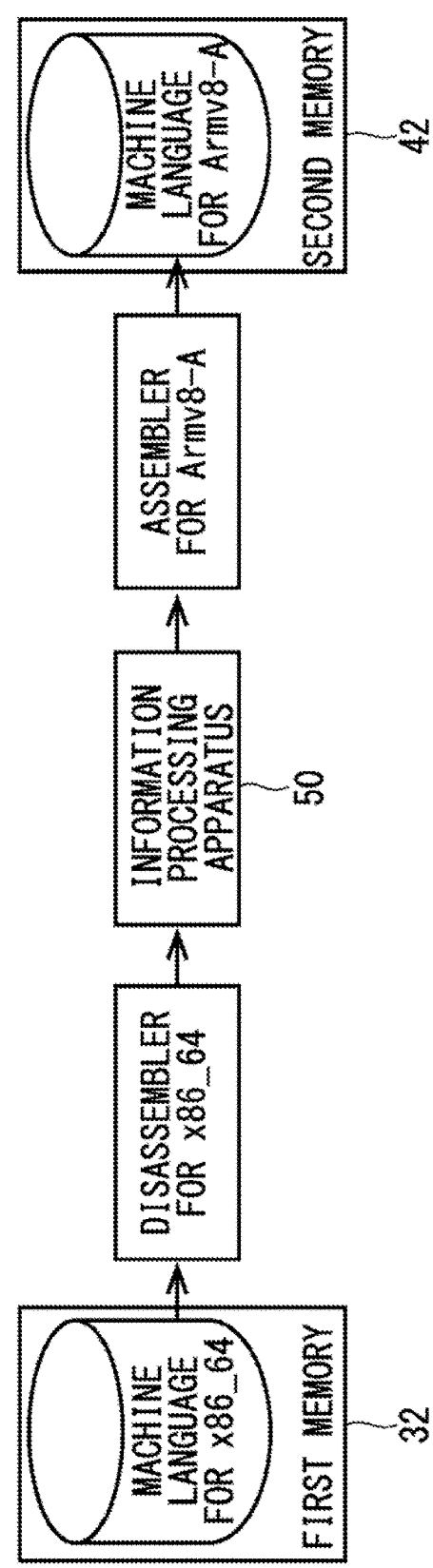

NON-TRANSITORY COMPUTER-READABLE RECORDING MEDIUM, ASSEMBLY INSTRUCTION CONVERSION METHOD AND INFORMATION PROCESSING APPARATUS

CROSS-REFERENCE TO RELATED APPLICATION

This application is based upon and claims the benefit of priority of the prior Japanese Patent Application No. 2020-126706 filed on Jul. 27, 2020, the entire contents of which are incorporated herein by reference.

FIELD

A certain aspect of the embodiments is related to a non-transitory computer-readable recording medium, an assembly instruction conversion method and an information processing apparatus.

BACKGROUND

A program that is executed on a processor includes instruction sequences of an instruction set adopted by the processor. It would be convenient if the executable program could be executed on another processor, but to achieve this, the instruction sequences need to be converted into instruction sequences of another instruction set for the another processor.

However, converting the instruction sequences of the instruction set into the instruction sequences of the another instruction set may make the converted instruction sequences unnecessarily long and make the execution time of the converted program increase. Note that the technique related to the present disclosure is disclosed in Japanese Laid-open Patent Publication No. S63-138427.

SUMMARY

According to an aspect of the present disclosure, there is provided a non-transitory computer-readable recording medium having stored therein a program for causing a computer to execute a process. The process includes storing each of a plurality of generation instructions in a storage area for each of assembly instructions, the generation instructions instructing the generation of instruction sequences of a first instruction set, each instruction sequence of the first instruction set executing a processing equivalent to each assembly instruction of a second instruction set, identifying a first register that is not used by any of the assembly instructions corresponding to the plurality of generation instructions by referring to the storage area, determining a second register of the first instruction set corresponding to the first register as a temporary register in each of the instruction sequences, and generating the instruction sequence that uses the temporary register.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a schematic diagram illustrating a case where a destination register "zmm1" of an assembly instruction 65b is used as a source register of a preceding assembly instruction 65a;

FIG. 16 is a schematic diagram illustrating conditions determined by the information processing apparatus according to the second embodiment;

FIG. 20 is a schematic diagram of assembly instructions acquired by an acquisition unit according to the second embodiment;

FIGS. 25A and 25B are schematic diagrams of a temporary register list according to the third embodiment;

FIG. 26A is a schematic diagram of a pseudo source code described by C++ of a type declaration used in a source code of the assembly instruction conversion program according to a fourth embodiment;

FIG. 26B is a schematic diagram of a pseudo source code described by C++ indicating the definition of a vpadd function according to the fourth embodiment;

FIG. 29 is a schematic diagram of a pseudo source code described by C++ indicating an example of the definition of a genJitCodeOfFifo function according to the fourth embodiment;

FIG. 30 is a schematic diagram of a pseudo source code described by C++ indicating an example of the definition of a translateVPADD function according to the fourth embodiment;

FIG. 35 is a schematic diagram illustrating conditions judged by the translateVPADD function according to the fifth embodiment;

FIG. 36 is a schematic diagram of a pseudo source code described by C++ indicating an example of the definition of the translateVPADD function according to the fifth embodiment;

FIGS. 40A to 40C are schematic diagrams for explaining other examples of the first embodiment and the second embodiment.

DESCRIPTION OF EMBODIMENTS

Prior to the description of the present embodiment, matters underlying the present embodiment will be described.

It would be convenient if a program for a processor adopting one instruction set could be executed on another processor adopting a different instruction set. For example, the following considers running a program for a processor adopting the instruction set of an x86_64 architecture of Intel Corporation on a processor adopting the instruction set of an Armv8-A architecture of ARM Holdings. To achieve this, each of assembly instructions included in the instruction set of x86_64 may be converted into assembly instructions included in the instruction set of Armv8-A as follows.

Figure 1:
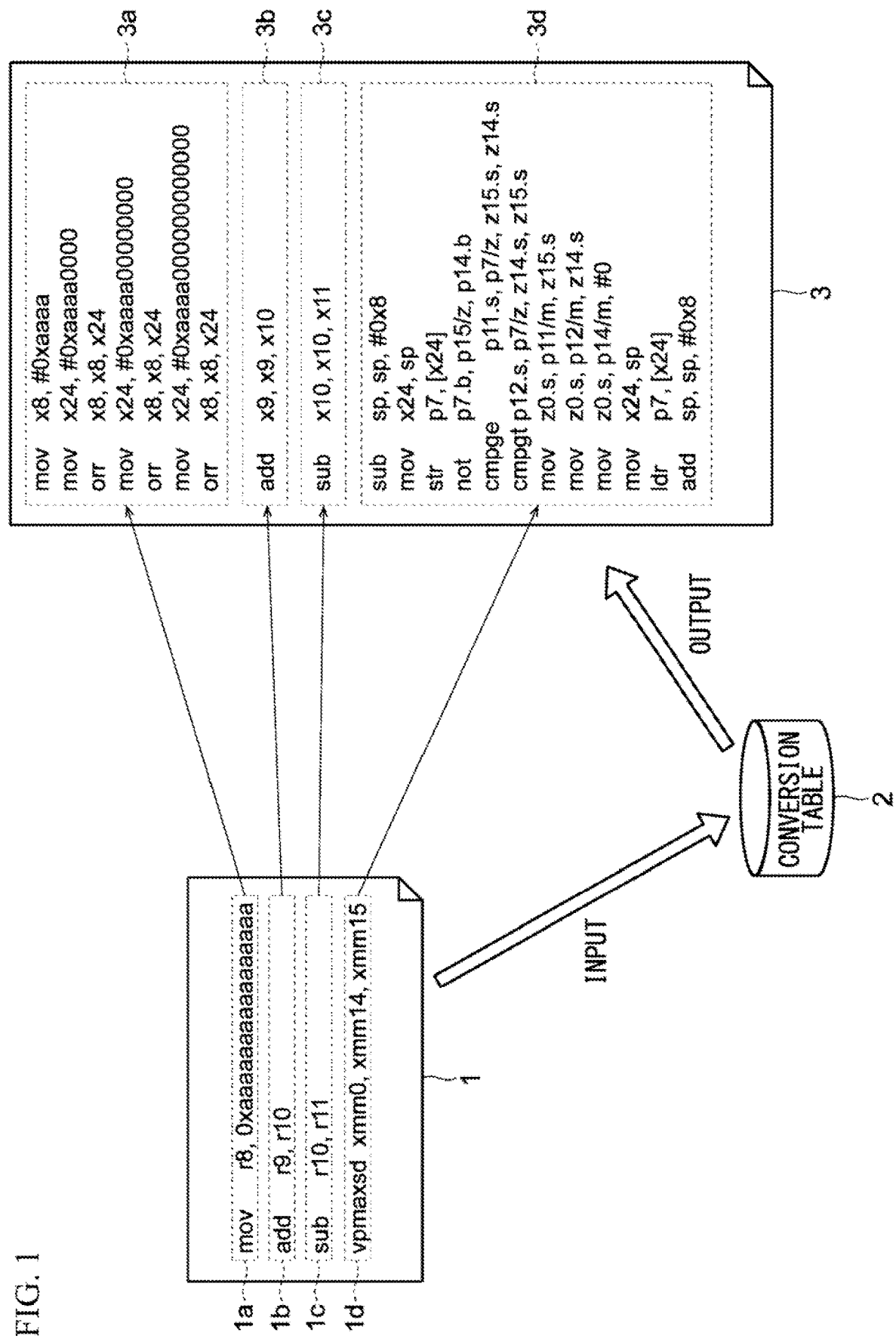
FIG. 1 is a schematic diagram illustrating a conversion method from assembly instructions of x86_64 to assembly instructions of Armv8-A.

FIG. 1 is a schematic diagram illustrating a conversion method from assembly instructions of x86_64 to assembly instructions of Armv8-A.

In the example of FIG. 1, each assembly instruction of x86_64 described in an assembly file 1 is converted by using a conversion table 2, so that an assembly file 3 in which each assembly instruction of Armv8-A is described is obtained.

The assembly file 1 describes a mov instruction 1a, an add instruction 1b, a sub instruction 1c, and a vpmaxsd instruction 1d as the assembly instructions of x86_64.

In Armv8-A, the mov instruction 1a can be realized by an instruction sequence 3a including 7 assembly instructions. Further, the add instruction 1b can be realized by an add instruction 3b of Armv8-A, and the sub instruction 1c can be realized by a sub instruction 3c of Armv8-A.

Then, the vpmaxsd instruction 1d can be realized by an instruction sequence 3d including 12 assembly instructions of Armv8-A.

The conversion table 2 stores a correspondence relationship between the assembly instruction of a conversion source and the assembly instruction of a conversion destination, and the output assembly file 3 can be obtained from the assembly file 1 as described above by using this correspondence relationship.

In both of x86_64 and Armv8-A, there are assembly instructions that specify vector registers in operands. Next, the vector registers of each of x86_64 and Armv8-A will be described.

Figure 2A:
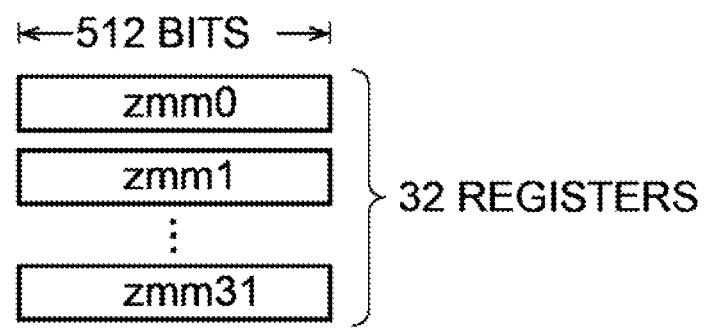
FIG. 2A is a schematic diagram for explaining vector registers in an x86_64 architecture.

FIG. 2A is a schematic diagram for explaining the vector registers in the x86_64 architecture.

As illustrated in FIG. 2A, in the x86_64 architecture, a total of 32 512-bit SIMD (Single Instruction Multiple Data) registers are prepared as the vector registers. The names of the vector registers are "zmm0", "zmm1", . . . "zmm31".

Figure 2B:
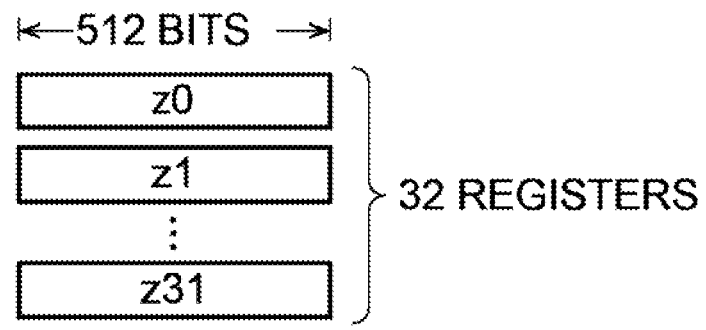
FIG. 2B is a schematic diagram for explaining vector registers in an Armv8-A architecture.

FIG. 2B is a schematic diagram for explaining the vector registers in the Armv8-A architecture.

Figure 32:
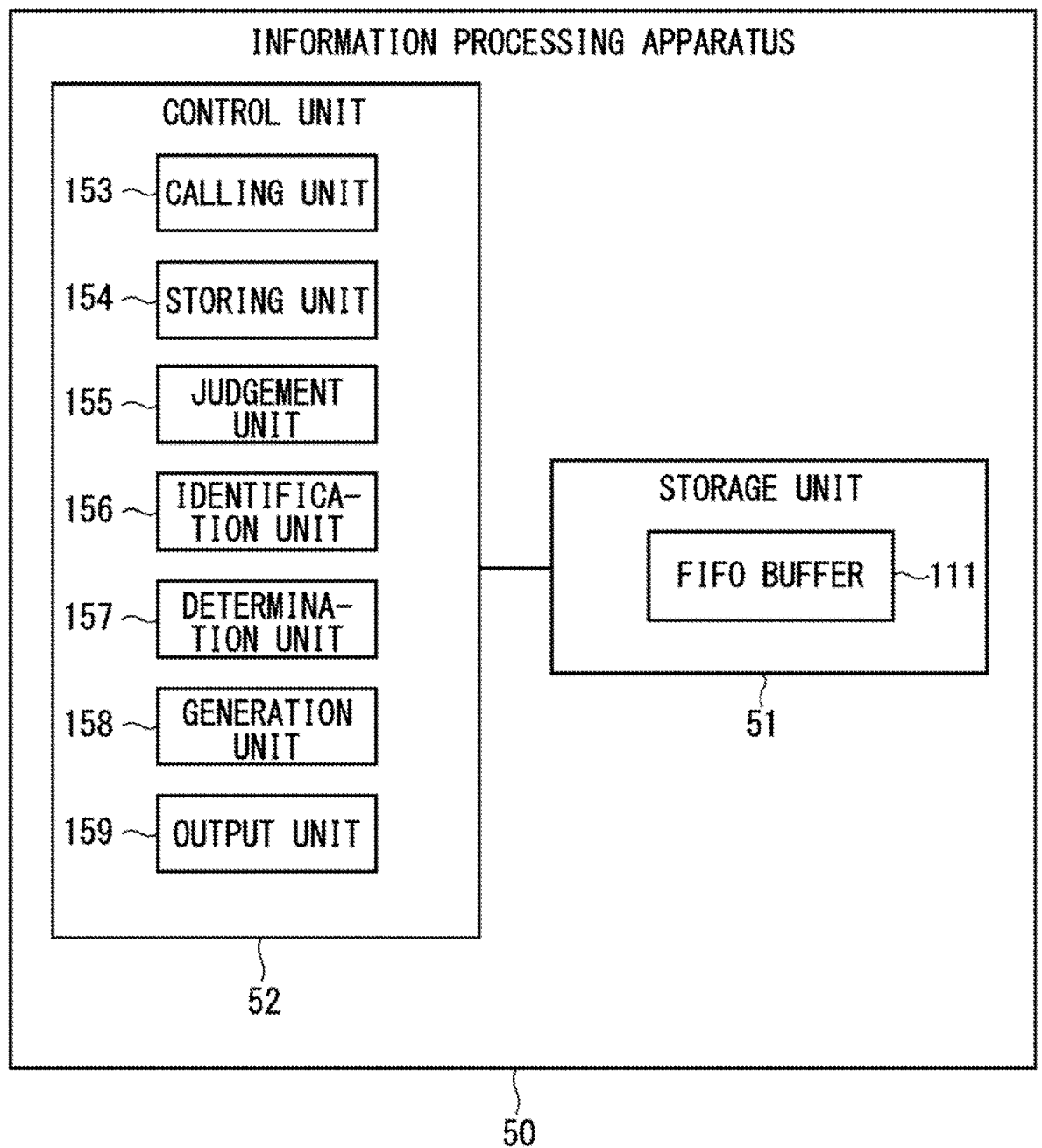
FIG. 32 is a functional configuration diagram of the information processing apparatus according to the fourth embodiment.

As illustrated in FIG. 2B, 32 512-bit SIMD registers are prepared as the vector registers also in the Armv8-A architecture. However, unlike the x86_64 architecture, the names of the vector registers are "z0", "z1", . . . "z31".

The assembly instruction that specifies only the vector registers as operands among the assembly instructions of x86_64 can be easily converted into the assembly instruction of Armv8-A as follows.

Figure 3:
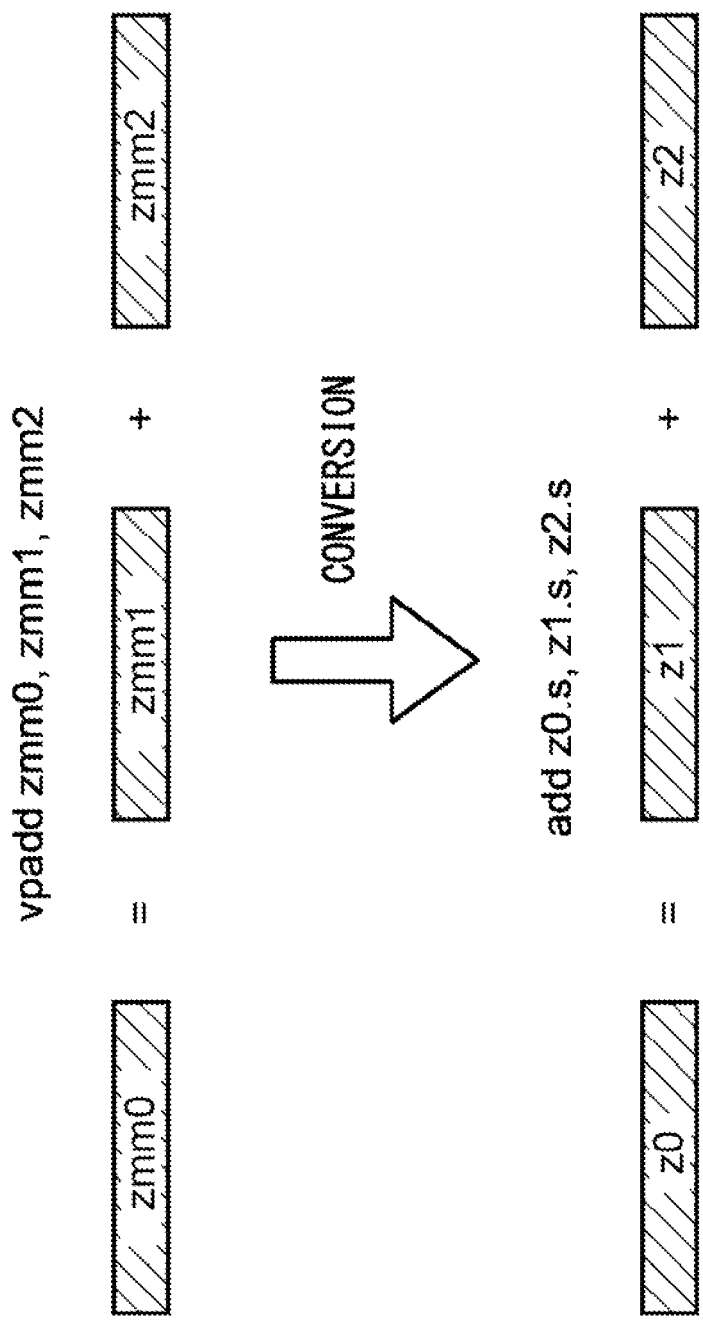
FIG. 3 is a schematic diagram illustrating a method for converting an assembly instruction "vpadd zmm0, zmm1, zmm2" of x86_64 into the assembly instruction of Armv8-A.

FIG. 3 is a schematic diagram illustrating a method for converting an assembly instruction "vpadd zmm0, zmm1, zmm2" of x86_64 into the assembly instruction of Armv8-A.

The assembly instruction "vpadd zmm0, zmm1, zmm2" is an instruction that adds each of 16 pieces of 32-bit data stored in the vector register zmm1 to each of 16 pieces of 32-bit data stored in the vector register zmm2. The 16 pieces of 32-bit data obtained from the addition are stored in the vector register zmm0.

The assembly instruction "vpadd zmm0, zmm1, zmm2" can be realized by the assembly instruction "add z0.s, z1.s, z2.s" of Armv8-A. In this format, ".s" indicates that a 512-bit vector register is divided into 16 elements having 32-bit and is used. Moreover, the add instruction is an instruction that adds each of the 16 pieces of 32-bit data stored in the vector register z1 and each of the 16 pieces of 32-bit data stored in the vector register z2, and stores the results in the vector register z0.

Thus, the vpadd instruction of x86_64 that specifies only the vector registers as the operands can be easily converted into the single add instruction of Armv8-A.

However, the assembly instruction of x86_64 that specifies the memory address as the operand cannot be easily converted into the single assembly instruction of Armv8-A as described above.

This will be explained using the assembly instruction "vpadd" of x86_64 as an example.

Figure 4:
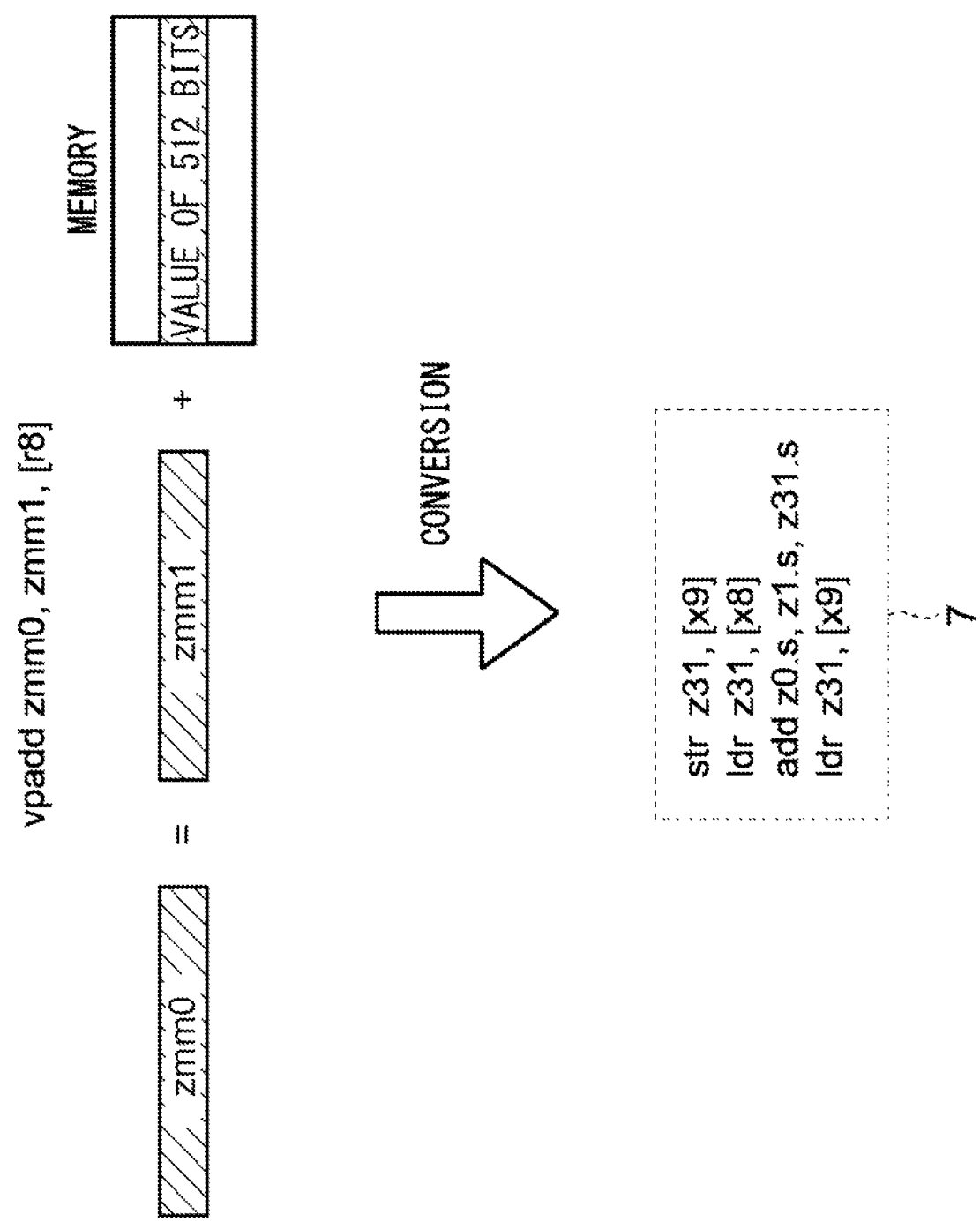
FIG. 4 is a schematic diagram illustrating a method for converting an assembly instruction "vpadd zmm0, zmm1, [r8]" of x86_64 into an assembly instruction of Armv8-A.

FIG. 4 is a schematic diagram illustrating a method for converting an assembly instruction "vpadd zmm0, zmm1, [r8]" of x86_64 into the assembly instruction of Armv8-A.

The assembly instruction "vpadd zmm0, zmm1, [r8]" is an instruction that adds data in a memory address indicated by a general-purpose register r8 and data stored in the vector register zmm1, and stores the results in the vector register zmm0. As in the example in FIG. 3, each data of addition objects is 16 pieces of 32-bit data.

On the other hand, the instruction set of Armv8-A does not have an assembly instruction that can realize a processing equivalent to the assembly instruction "vpadd". Therefore, it is necessary to combine a plurality of assembly instructions included in the instruction set of Armv8-A to realize the processing equivalent to the assembly instruction "vpadd".

In this example, an instruction sequence 7 including "str z31, [x9]", "ldr z31, [x8]", "add z0.s, z1.s, z31.s", and "ldr z31, [x9]" in the instruction set of Armv8-A realizes the processing equivalent to the assembly instruction "vpadd".

The first assembly instruction "str z31, [x9]" in the instruction sequence 7 is a store instruction that saves the data stored in advance in the vector register z31 to a memory. A save destination is the memory address indicated by a general-purpose register x9.

The next assembly instruction "ldr z31, [x8]" is a load instruction that stores data in the memory address indicated by a general-purpose register x8 into a vector register z31.

Furthermore, the next assembly instruction "add z0.s, z1.s, z31.s" is an instruction that adds the data stored in the vector register z31 to the data stored in the vector register z1, and stores the results in the vector register z0.

The last assembly instruction "ldr z31, [x9]" is a load instruction that returns the data saved in memory by the first assembly instruction "str z31, [x9]" to the original vector register z31.

The vector register z31 in the instruction sequence 7 is a temporary register. The temporary register is a vector register specified in the destination register of the load instruction (ldr z31, [x8]) and in the source register of the assembly instruction (add z0.s, z1.s, z31.s) immediately after the load instruction.

Thus, the instruction sequence 7 using the temporary register can realize the processing equivalent to the assembly instruction "vpadd" of x86_64.

However, this method has the following problem.

Figure 5:
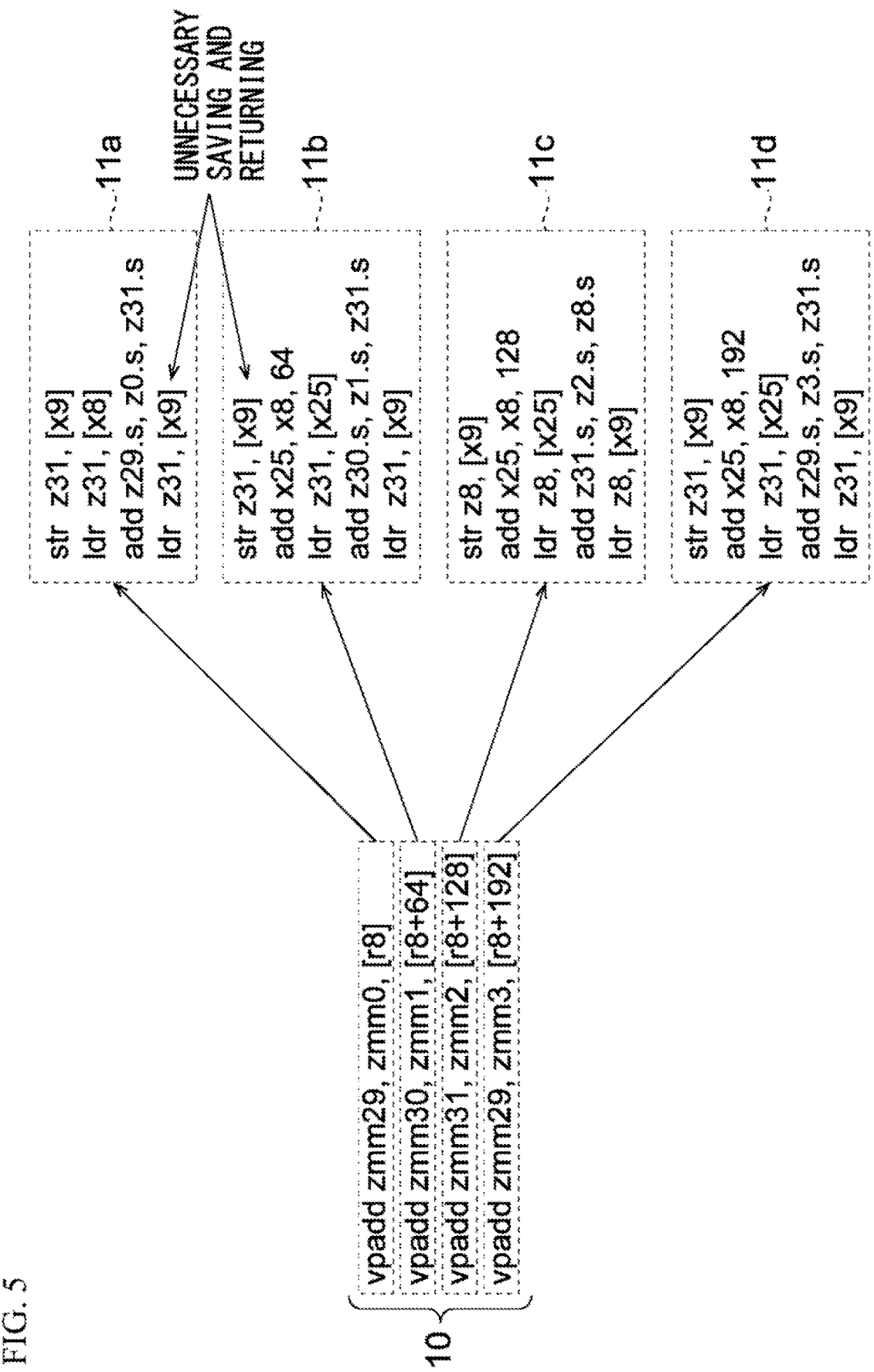
FIG. 5 is a schematic diagram for explaining a problem.

FIG. 5 is a schematic diagram for explaining the problem.

FIG. 5 illustrates a case where each assembly instruction included in an instruction sequence 10 of x86_64 is converted into an instruction sequence of Armv8-A that realizes the processing equivalent to it.

An assembly instruction "vpadd zmm29, zmm0, [r8]" in the instruction sequence 10 can be realized by an instruction sequence 11a including four assembly instructions "str z31, [z9]", "ldr z31, [z8]", "add z29.s, z0.s, z31" and "ldr z31, [x9]" in the same way as the example in FIG. 4.

On the other hand, an instruction including a memory offset "64" like the assembly instruction "vpadd zmm30, zmm1, [r8+64]" can be realized by five assembly instructions of Armv8-A like an instruction sequence 11b.

The first assembly instruction "str z31, [x9]" in the instruction sequence 11b is a store instruction that saves the data stored the vector register z31, which is used by the instruction sequence 11b as the temporary register, to the memory. The next assembly instruction "add x25, x8, 64" is an assembly instruction that stores, in a general-purpose register x25, the memory address obtained by adding the data in the general-purpose register x8 and the offset "64".

Then, the next assembly instruction "ldr z31, [x25]" is a load instruction that stores the data in the memory address indicated by the general-purpose register x25, in the vector register z31.

The next assembly instruction "add z30.s, z1.s, z31.s" is an assembly instruction that adds the data stored in the vector register z31 to the data stored in the vector register z1, and stores the results in a vector register z30.

The last assembly instruction "ldr z31, [x9]" is a load instruction that returns the data first saved in memory to the original vector register z31.

Such an instruction sequence 11b can realize the processing equivalent to the assembly instruction "vpadd zmm30, zmm1, [r8+64]".

Similarly, the instruction sequence 11c and the instruction sequence 11d can realize processings equivalent to the assembly instructions "vpadd zmm31, zmm2, [r8+128]" and "vpadd zmm29, zmm3, [r8+192]", respectively.

In this way, in a method of converting the assembly instructions one by one, the instruction sequences 11a to 11d are generated for the assembly instructions included in the instruction sequence 10 of the conversion source, respectively. Therefore, each of the instruction sequences 11a to 11d might use the same temporary register.

In the example of FIG. 5, the instruction sequence 11a and the next instruction sequence 11b use the same vector register z31 as the temporary register. As a result, the two instructions "ldr z31, [x9]" and "str z31, [x9]" that save and return the data to the same vector register z31 are adjacent to each other. These instructions "ldr z31, [x9]" and "str z31, [x9]" are unnecessary instructions that do not change the contents of the vector register z31 before and after the execution, which makes the instruction sequence 11 unnecessarily long.

If an assembly instruction that uses the vector register z31 as the destination operand is executed without using the vector register z31 as the source operand in the instruction sequence after the instruction sequence 11b, the first instruction "str z31, [x9]" and the last instruction "ldr z31, [x9]" in the instruction sequence 11b are unnecessary because the value stored in the vector register z31 is never referenced.

However, in this method of performing conversion for each single assembly instruction, it is not possible to determine whether the vector register z31 is used in the instruction sequence 11b or later, and hence the instruction "str z31, [x9]" and the instruction "ldr z31, [x9]" cannot be deleted.

Hereinafter, each embodiment that can delete such unnecessary instructions will be described.

First Embodiment

In the present embodiment, when the instruction of the x86_64 architecture is converted into the instruction sequence of the Armv8-A architecture, the converted instruction sequence is suppressed from becoming unnecessarily long. Therefore, the target machines adopting these architectures will be first described.

Figure 6:
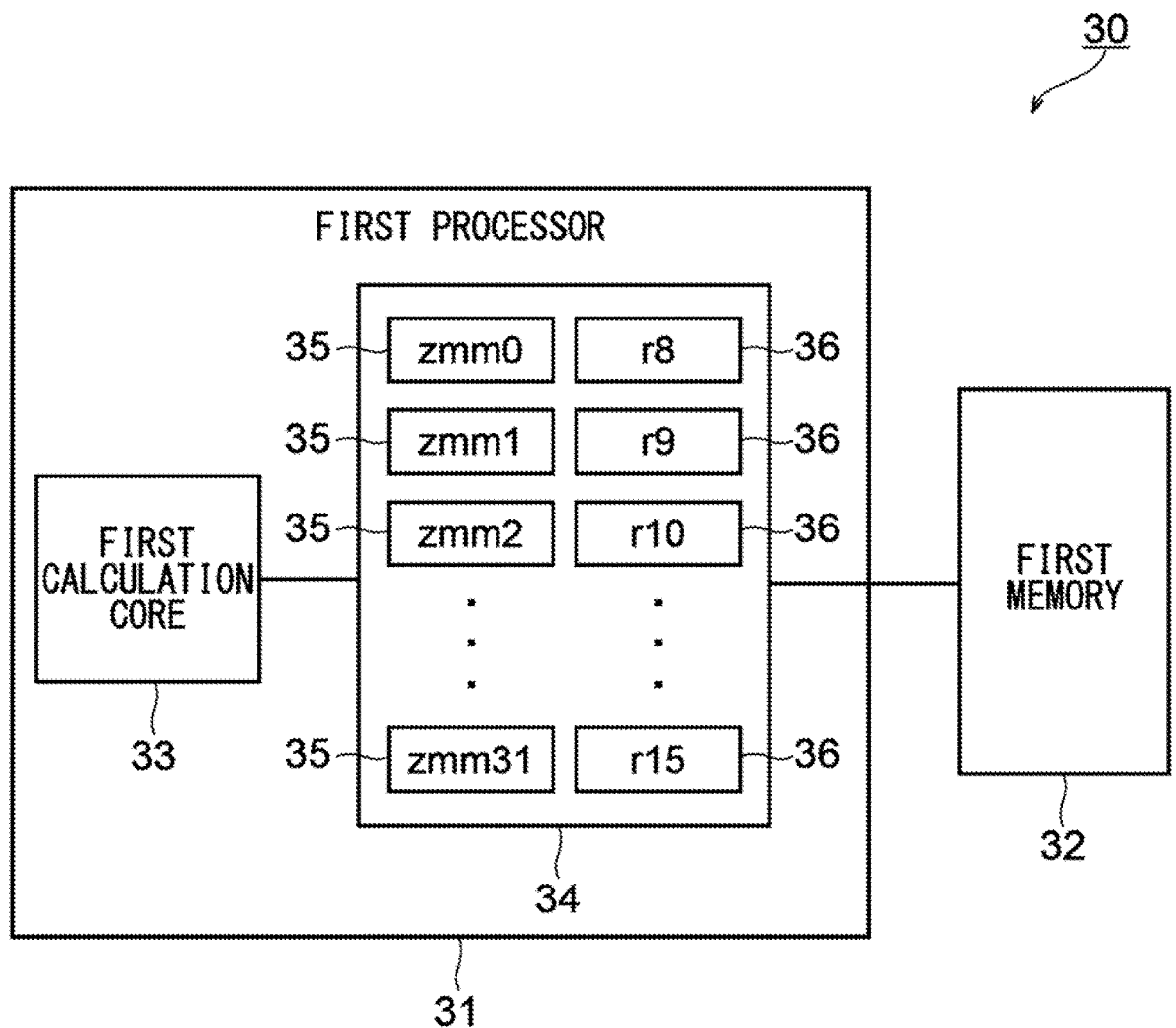
FIG. 6 is a hardware configuration diagram of a first target machine adopting the x86_64 architecture.

FIG. 6 is a hardware configuration diagram of a first target machine adopting the x86_64 architecture.

A first target machine 30 is a computer such as a server or a PC (Personal Computer), and includes a first processor 31 and a first memory 32.

The first processor 31 is a CPU (Central Processing Unit) adopting the x86_64 architecture, and includes a first calculation core 33 including an arithmetic unit that performs arithmetic operation and logical operation, and a first register file 34.

The first register file 34 is hardware including a plurality of vector registers 35 and a plurality of general-purpose registers 36. The size of each vector register 35 is 512 bits. Further, there are 32 vector registers 35 in total, and they are identified by the character sequences "zmm0", "zmm1", ... "zmm31", respectively. The integer values "0", "1", ... "31" in the character sequences indicate the register numbers of the respective vector registers 35.

On the other hand, the size of each general-purpose register 36 is 64 bits. There are 16 general-purpose registers 36 in total, and they are identified by the character sequences "eax", "ebx", "ecx", "edx", "edi", "esi", "esp", "ebp", "r8", "r9", ... "r15", respectively. Similar to the vector registers 35, the integer values "8", "9", ... "15" in these character sequences indicate the register numbers of the respective general-purpose registers 36, and the register numbers of "eax", "ebx", "ecx", "edx", "edi", "esi", "esp", "ebp" are, for example, "0", "1", ... "7", respectively.

The first memory 32 is a volatile memory such as DRAM (Dynamic Random Access Memory) in which the machine language of x86_64 is expanded.

Figure 7:
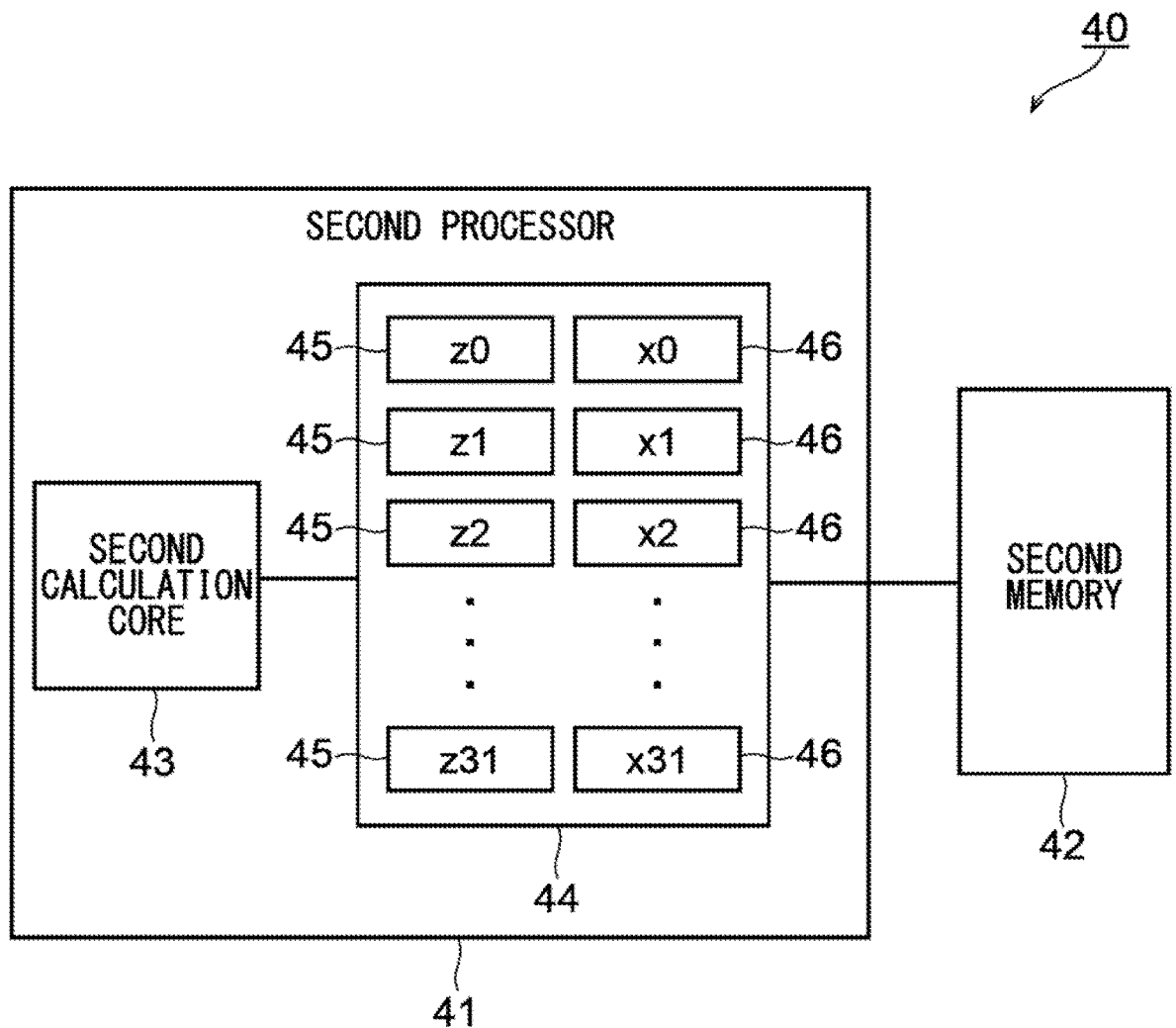
FIG. 7 is a hardware configuration diagram of a second target machine adopting the Armv8-A architecture.

FIG. 7 is a hardware configuration diagram of a second target machine adopting the Armv8-A architecture.

A second target machine 40 is a computer such as a server or a PC (Personal Computer), and includes a second processor 41 and a second memory 42.

The second processor 41 is a CPU (Central Processing Unit) adopting the Armv8-A architecture, and includes a second calculation core 43 including an arithmetic unit that performs arithmetic operation and logical operation, and a second register file 44.

The second register file 44 is hardware including a plurality of vector registers 45 and a plurality of general-purpose registers 46. The size of each vector register 45 is 512 bits. Further, there are 32 vector registers 45 in total, and they are identified by the character sequences "z0", "z1", ... "z31", respectively. The integer values "0", "1", ... "31" in the character sequences indicate the register numbers of the respective vector registers 45.

On the other hand, the size of each general-purpose register 46 is 64 bits. There are 32 general-purpose registers 46 in total, and they are identified by the character sequences "x0", "x1", ... "x31", respectively. Similar to the vector registers 45, the integer values "0", "1", ... "31" in these character sequences indicate the register numbers of the respective general-purpose registers 46.

The second memory 42 is a volatile memory such as DRAM (Dynamic Random Access Memory) in which the machine language of Armv8-A is expanded.

Figure 8:
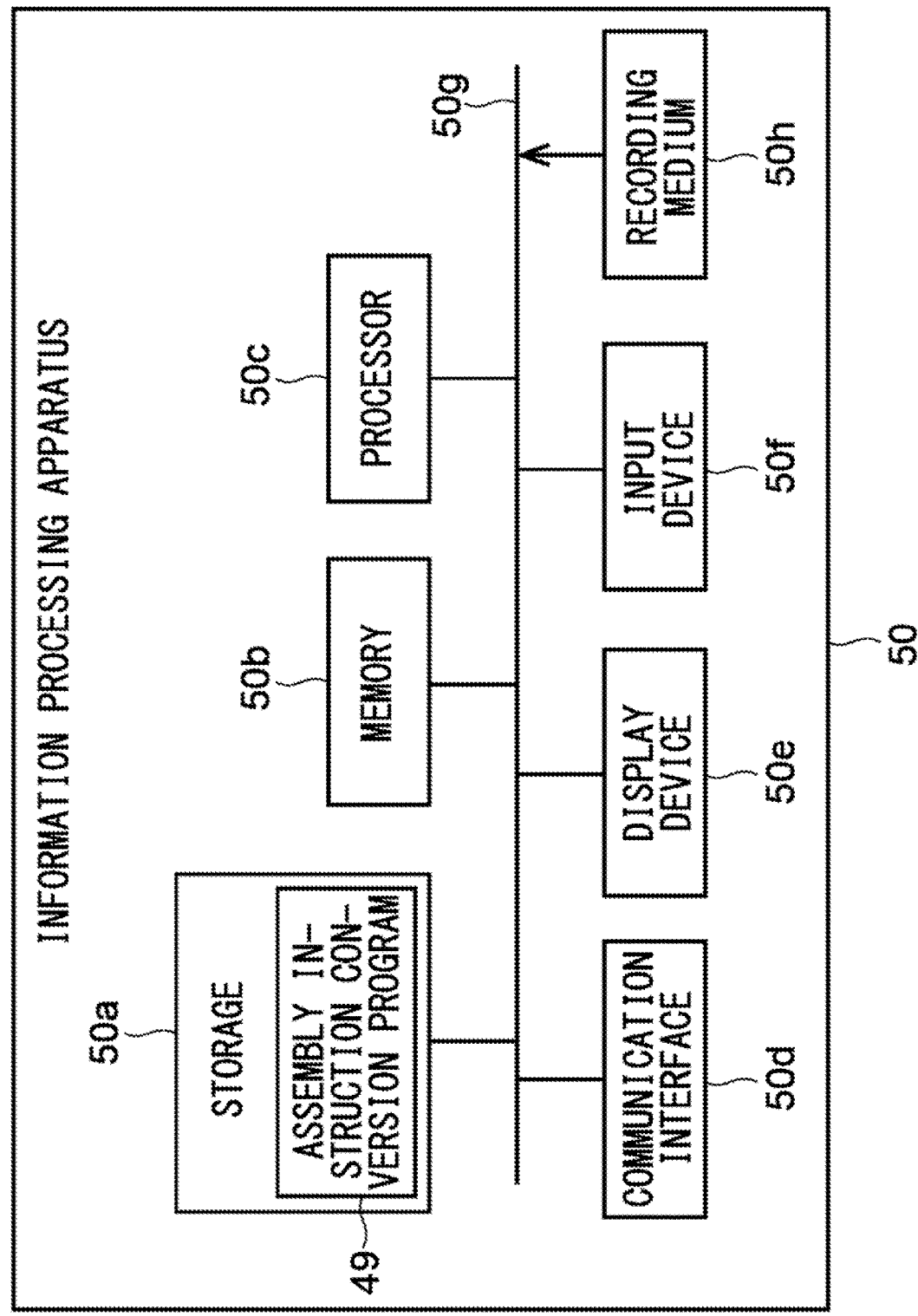
FIG. 8 is a hardware configuration diagram of an information processing apparatus according to first to fifth embodiments.

FIG. 8 is a hardware configuration diagram of an information processing apparatus for converting the assembly instruction for the first processor 31 into the instruction sequence for the second processor 41.

As illustrated in FIG. 8, an information processing apparatus 50 includes a storage 50a, a memory 50b, a processor 50c, a communication interface 50d, a display device 50e, and an input device 50f. These elements are connected to each other by a bus 50g.

The storage 50a is a non-volatile storage device such as an HDD (Hard Disk Drive) or an SSD (Solid State Drive), and stores an assembly instruction conversion program 49 according to the present embodiment.

The assembly instruction conversion program 49 may be recorded on a computer-readable recording medium 50h, and the processor 50c may read the assembly instruction conversion program 49 from the recording medium 50h.

Examples of such a recording medium 50h include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 50h. The recording medium 50h is not a temporary medium such as a carrier wave having no physical form.

Further, the assembly instruction conversion program 49 may be stored in a device connected to a public line, the Internet, a LAN (Local Area Network), or the like. In this case, the processor 50c may read and execute the assembly instruction conversion program 49.

Meanwhile, the memory 50b is hardware that temporarily stores data, such as a DRAM (Dynamic Random Access Memory), and the assembly instruction conversion program 49 is deployed on the memory 50b.

The processor 50c is hardware such as a CPU (Central Processing Unit) or a GPU (Graphical Processing Unit) that controls each element of the information processing apparatus 50 and executes the assembly instruction conversion program 49 in cooperation with the memory 50b.

Further, the communication interface 50d is an interface for connecting the information processing apparatus 50 to a network such as a LAN (Local Area Network).

The display device 50c is hardware such as a liquid crystal display device, and displays a prompt prompting a developer to input various information. Further, the input device 50f is hardware such as a keyboard and a mouse.

Next, an outline of the processing executed by the information processing apparatus 50 according to the present embodiment will be described.

Figure 9:
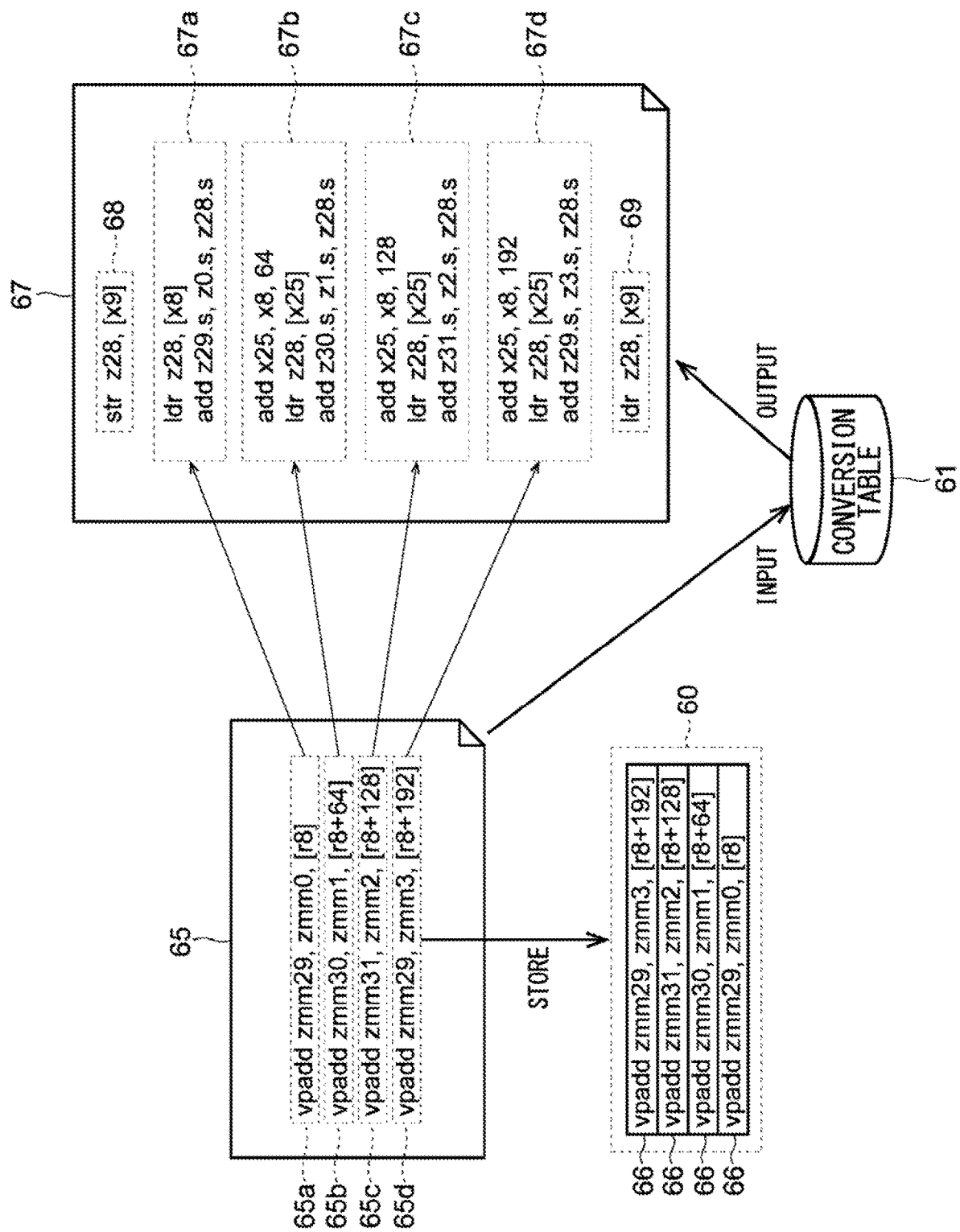
FIG. 9 is a schematic diagram for explaining an assembly instruction conversion method according to the first embodiment.

FIG. 9 is a schematic diagram for explaining the assembly instruction conversion method according to the present embodiment.

In the present embodiment, the information processing apparatus 50 acquires an assembly file 65 in which a plurality of assembly instructions 65a to 65d to be converted are described, so that it acquires the assembly instructions 65a to 65d in this order. The assembly instructions 65a to 65d are the instructions of the x86_64 architecture and are executed in this order.

Next, the information processing apparatus 50 stores a generation instruction 66 in a FIFO (First In First Out) buffer 60 for each of the acquired assembly instructions 65a to 65d. The FIFO buffer 60 is an example of a storage area secured in the storage 50a, the memory 50b, or the like.

The generation instruction 66 is information that instructs the generation of the instruction sequence of Armv8-A that executes the processing equivalent to each of the assembly instructions 65a to 65d of x86_64. In this example, each of the plurality of generation instructions 66 is identified by each of the assembly instructions of x86_64 such as "vpadd zmm30, xmm1, [r8+64]". For example, the generation instruction 66 identified by "vpadd zmm30, xmm1, [r8+64]" corresponds to the assembly instruction 65b, and represents an instruction that generates the instruction sequence of Armv8-A that executes the processing equivalent to the assembly instruction "vpadd zmm30, xmm1, [r8+64]" of x86_64.

An order in which the generation instructions 66 are stored in the FIFO buffer 60 is the same as an order in which the information processing apparatus 50 acquires the assembly instructions 65*a* to 65*d*. Therefore, when the information processing apparatus 50 first acquires the assembly instruction "vpadd zmm29, zmm0, [r8]", the generation instruction 66 corresponding to this assembly instruction is stored in the FIFO buffer 60. After that, the generation instructions 66 corresponding to assembly instructions "vpadd zmm30, xmm1, [r8+64]", "vpadd zmm31, zmm2, [r8+128]" and "vpadd zmm29, zmm3, [r8+192]" are stored in the FIFO buffer 60.

Next, the information processing apparatus 50 identifies the first vector register 35 that is not used by any of the assembly instructions corresponding to the plurality of generation instructions 66 by referring to the FIFO buffer 60.

In this example, the first vector registers 35 used by the four generation instructions 66 are register identified by the register numbers "0", "1", "2", "3", "29", "30", and "31". Therefore, the information processing apparatus 50 identifies the first vector register 35 having the register number other than these register numbers. Here, the information processing apparatus 50 identifies the first vector register 35 having a largest integer value "28" as the register number which is different from all of "0", "1", "2", "3", "29", "30", and "31", among the register numbers 0 to 31 of the first vector registers 35.

Then, the information processing apparatus 50 identifies the second vector register 45 corresponding to the first vector register 35 identified above as the temporary register.

In this example, the information processing apparatus 50 identifies the first vector register 35 having the register number "28". Therefore, the information processing apparatus 50 determines the second vector register 45 of "z28" having the same register number "28" as the identified first vector register 35 as the temporary register.

By referring to a conversion table 61, the information processing apparatus 50 generates instruction sequences 67*a* to 67*d* of Armv8-A that execute the processing equivalent to the assembly instructions 65*a* to 65*d*, respectively. The conversion table 61 is a table in which the assembly instruction of x86_64 is associated with the instruction sequence of Armv8-A that executes the processing equivalent to it. For example, in the conversion table 61, the assembly instruction "vpadd" of x86_64 is associated with the instruction sequence "ldr, add" of Armv8-A that executes the processing equivalent to it. Further, the information processing apparatus 50 uses the second vector register 45 of the above-mentioned "z28" as the temporary register with respect to each of the instruction sequences 67*a* to 67*d*.

For example, the processing equivalent to the assembly instruction 65*b* of x86_64 is realized by the instruction sequence 67*b* of Armv8-A. In the instruction sequence 67*b*, the second vector register 45 of "z28" is used as the temporary register, but the first vector register 35 of "zmm28" corresponding to "z28" is not used in the subsequent instructions 65*c* and 65*d*. Therefore, it is not necessary to add, to the beginning of the instruction sequence 67*b*, the store instruction that saves data stored in the second vector register 45 of "z28" to the second memory 42. Similarly, it is not necessary to add, to the end of the instruction sequence 67*b*, the load instruction that returns the data to the second vector register 45 of "z28".

For the same reason, it is not necessary to add the store instruction and the load instruction to the beginning and the end of each of the instruction sequences 67*a* and 67*c* to 67*d*.

Thereby, in the present embodiment, unnecessary store and load instructions are not added to each of the instruction sequences 67*a* to 67*d*, and hence the number of instructions in the instruction sequences 67*a* to 67*d* can be reduced and the execution time can be suppressed from becoming long.

It should be noted that the subsequent assembly instructions of the instruction sequences 67*a* to 67*d* may use the second vector register 45 of "z28". In this case, if the second vector register 45 of "z28" is used as the temporary register as described above, the data to be used by the subsequent assembly instructions will be damaged by the instruction sequences 67*a* to 67*d*.

Therefore, the information processing apparatus 50 adds, to the beginning of the instruction sequences 67*a* to 67*d*, a store instruction 68 "str z28, [x9]" that saves the data in the second vector register 45 of "z28" to the second memory 42. Then, the information processing apparatus 50 adds, to the end of the instruction sequences 67*a* to 67*d*, a load instruction 69 "ldr z28, [x9]" that returns the saved data to the second vector register 45 of "z28". This can prevent the execution results of the subsequent assembly instructions of the instruction sequences 67*a* to 67*d* from being changed due to the use of the second vector register 45 of "z28" as the temporary register.

After that, the information processing apparatus 50 outputs an assembly file 67 in which each of the instruction sequences 67*a* to 67*d*, the store instruction 68, and the load instruction 69 is described, to the outside. Next, a description will be given of the functional configuration of the information processing apparatus 50 according to the present embodiment.

Figure 10:
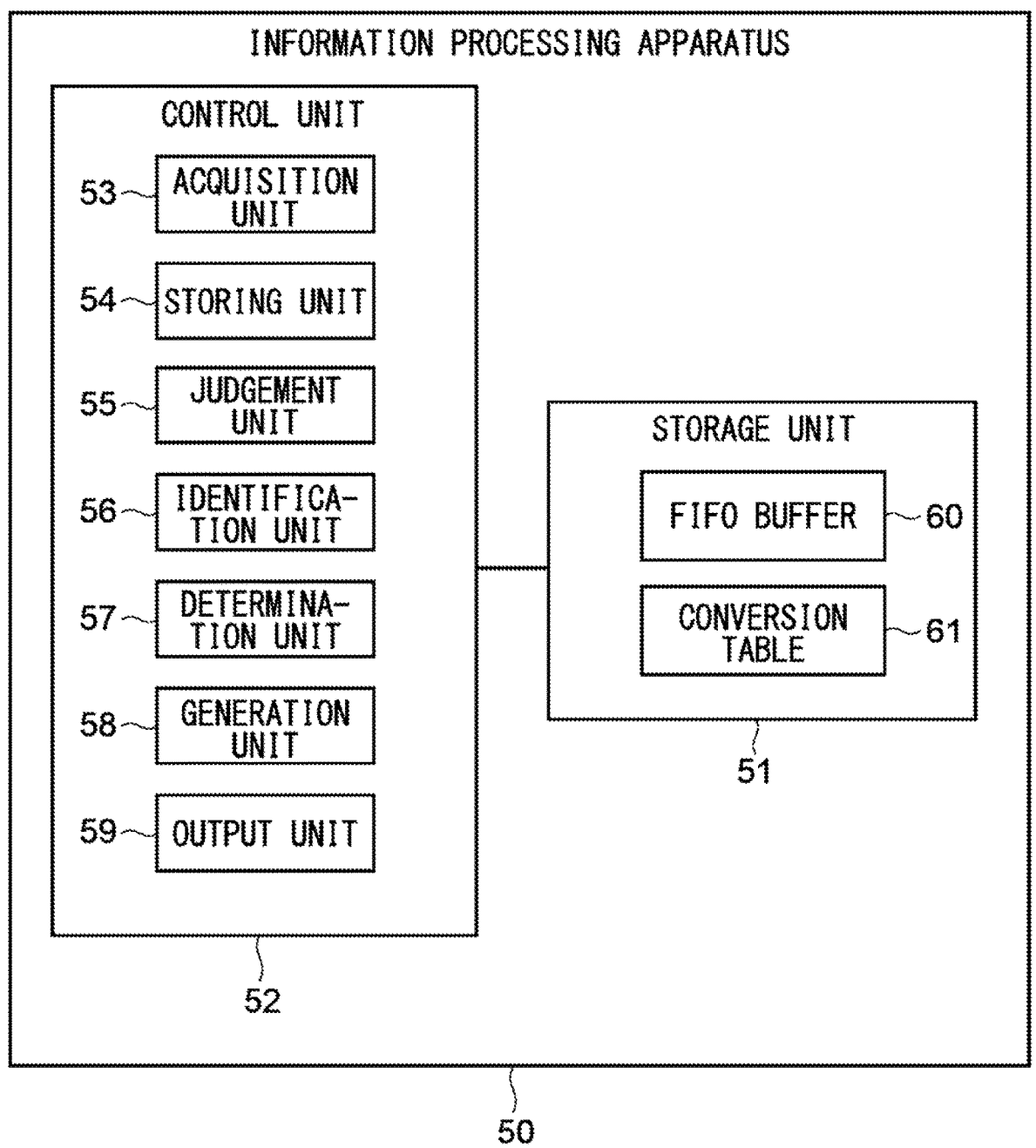
FIG. 10 is a functional configuration diagram of the information processing apparatus according to the first embodiment.

FIG. 10 is a functional configuration diagram of the information processing apparatus 50 according to the present embodiment.

As illustrated in FIG. 10, the information processing apparatus 50 includes a storage unit 51 and a control unit 52.

The storage unit 51 is a processing unit that stores the FIFO buffer 60 and the conversion table 61. As an example, the storage unit 51 is realized by the storage 50*a* and the memory 50*b* of FIG. 8.

The control unit 52 is a processing unit that controls each unit of the information processing apparatus 50, and includes an acquisition unit 53, a storing unit 54, a judgement unit 55, an identification unit 56, a determination unit 57, a generation unit 58, and an output unit 59.

The acquisition unit 53 is a processing unit that acquires the assembly instructions 65*a* to 65*d* of x86_64 to be converted described in the assembly file 65 by acquiring the assembly file 65.

The storing unit 54 is a processing unit that stores the generation instruction 66 in the FIFO buffer 60 for each of the acquired assembly instructions 65*a* to 65*d*. The FIFO buffer 60 is empty before the acquisition unit 53 acquires the assembly instructions 65*a* to 65*d*.

The storing unit 54 stores the generation instruction 66 in the FIFO buffer 60 each time the acquisition unit 53 acquires each of the assembly instructions 65*a* to 65*d*. Therefore, the order in which the generation instructions 66 are stored in the FIFO buffer 60 is the same as the order in which the acquisition unit 53 acquires the assembly instructions 65*a* to 65*d*.

The judgement unit 55 processing unit that judges whether the type of assembly instruction newly acquired in the acquisition unit 53 is different from the type of assembly instruction indicated by the generation instruction 66 already stored in the FIFO buffer 60. The type of assembly instruction is a set of the name of the assembly instruction and the types of the operands.

In the present embodiment, when the plurality of generation instructions 66 are stored in the FIFO buffer 60, the types of the assembly instructions indicated by all the stored generation instructions 66 are the same as each other. Therefore, the judgement unit 55 judges whether the type of any assembly instruction among the plurality of generation instructions 66 is different from the type of the assembly instruction newly acquired by the acquisition unit 53.

The identification unit 56 is a processing unit that identifies the first vector register 35 that is not used by any of the assembly instructions corresponding to the plurality of generation instructions 66 by referring to the FIFO buffer 60. When there are a plurality of such first vector registers 35, the identification unit 56 identifies the first vector register 35 having the largest register number among the plurality of first vector registers 35.

The determination unit 57 determines the second vector register 45 corresponding to the first vector register 35 identified by the identification unit 56 as the temporary register used by each of the instruction sequences 67a to 67d. In the present embodiment, the first vector register 35 and the second vector register 45 having the same register number are referred to as vector registers corresponding to each other.

The generation unit 58 is a processing unit that generates each of the instruction sequences 67a to 67d that executes the processing equivalent to each of the assembly instructions 65a to 65b corresponding to the generation instructions 66 for each of the generation instructions 66 stored in the FIFO buffer 60. For example, the generation unit 58 generates the instruction sequence 67a corresponding to the assembly instruction 65a by referring to the conversion table 61. At this time, the generation unit 58 uses the temporary register determined by the determination unit 57 for the instruction sequence 67a.

The generation unit 58 does not add, to each of the instruction sequences 67a to 67d, the store instruction that saves the data stored in the temporary register to the second memory 42 and the load instruction that returns the data to the temporary register. This reduces the number of instructions in the instruction sequences 67a to 67d due to the reduction of the unnecessary store and load instructions, and suppresses the execution time from becoming long, as described with reference to FIG. 9.

Further, the generation unit 58 adds, to the beginning of the instruction sequences 67a to 67d, the store instruction 68 that saves the data stored in the second vector register 45 used as the temporary register to the second memory 42. In addition, the generation unit 58 adds, to the end of the instruction sequences 67a to 67d, the load instruction 69 that returns the data to the original second vector register 45.

The output unit 59 is a processing unit that outputs, to the outside, the assembly file 67 in which each of the instruction sequences 67a to 67d, the store instruction 68, and the load instruction 69 is described.

Next, a description will be given of the assembly instruction conversion method according to the present embodiment.

Figure 11:
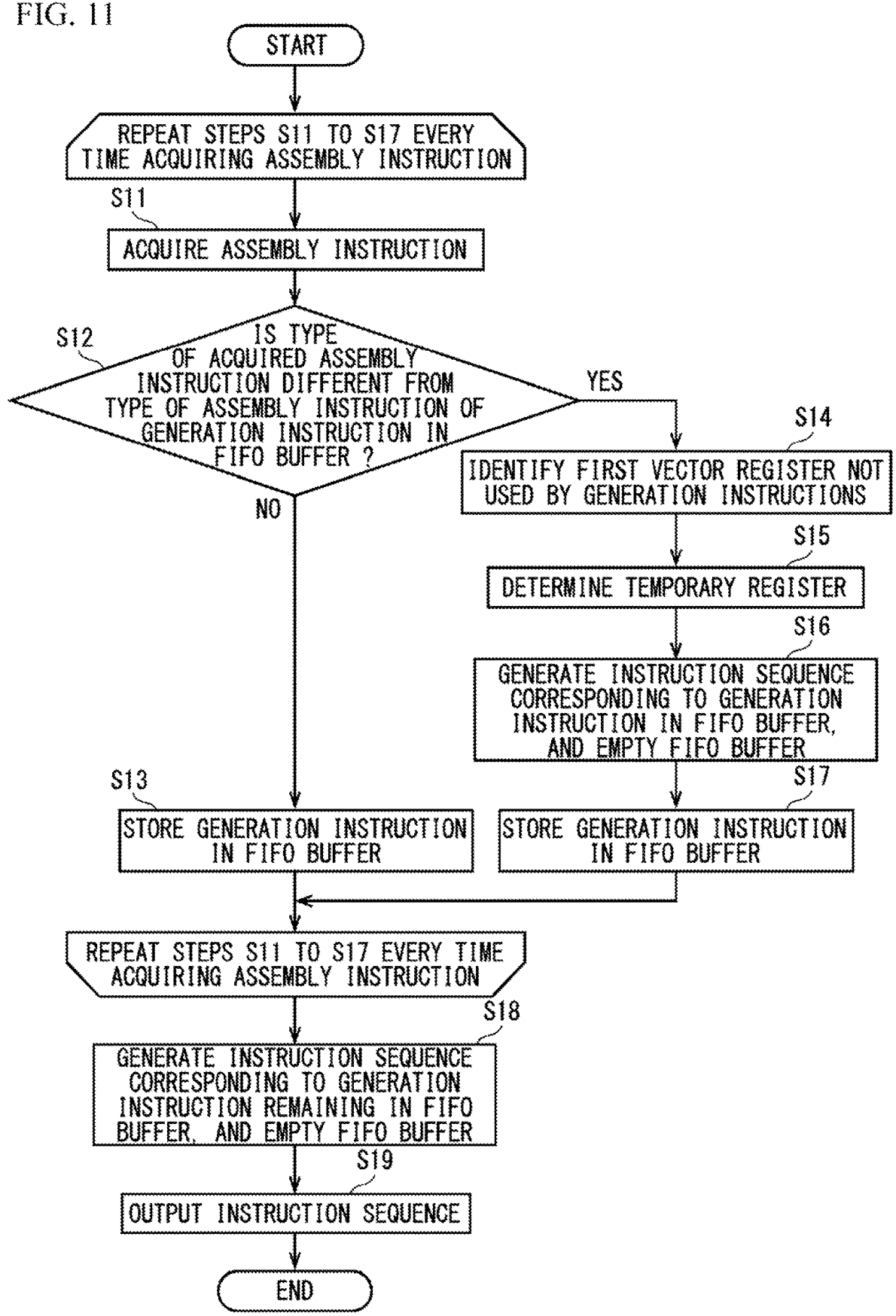
FIG. 11 is a flowchart of the assembly instruction conversion method according to the first embodiment.

FIG. 11 is a flowchart of the assembly instruction conversion method according to the present embodiment.

First, the acquisition unit 53 acquires the assembly instruction 65a of x86_64 (step S11).

Next, the judgement unit 55 judges whether the type of the assembly instruction acquired by the acquisition unit 53 in step S11 is different from the type of the assembly instruction indicated by the generation instruction 66 stored in the FIFO buffer 60 (step S12).

When the type of the assembly instruction acquired in step S11 is the same as the type of the assembly instruction indicated by the generation instruction 66 stored in the FIFO buffer 60 (step S12: NO), the process proceeds to step S13. Also when the FIFO buffer 60 is empty, the process proceeds to step S13.

In step S13, the storing unit 54 stores the generation instruction 66 corresponding to the assembly instruction 65a acquired in step S11 in the FIFO buffer 60.

On the other hand, when the type of the assembly instruction acquired in step S11 is different from the type of the assembly instruction indicated by the generation instruction 66 stored in the FIFO buffer 60 (step S12: YES), the process proceeds to step S14.

In step S14, the identification unit 56 identifies the first vector register 35 that is not used by any of the assembly instructions corresponding to the plurality of generation instructions 66 by referring to the FIFO buffer 60.

Next, the determination unit 57 determines the second vector register 45 corresponding to the first vector register 35 identified by the identification unit 56 as the temporary register (step S15).

Next, the generation unit 58 generates each of the instruction sequences 67a to 67d that executes the processing equivalent to each of the assembly instructions 65a to 65b corresponding to the generation instructions 66, for each generation instruction 66 stored in the FIFO buffer 60 (step S16). At this time, the generation unit 58 uses the temporary register determined in step S15 for the instruction sequence 67a. Further, the generation unit 58 adds the store instruction 68 and the load instruction 69 to the beginning and the end of the instruction sequences 67a to 67d, respectively. After that, the generation unit 58 empties the FIFO buffer 60.

Next, the storing unit 54 stores the generation instruction 66 corresponding to the assembly instruction 65a acquired in step S11 in the FIFO buffer 60 (step S17).

Then, every time the acquisition unit 53 acquires the assembly instruction, steps S11 to S17 are repeated.

Next, the generation unit 58 generates the instruction sequence of Armv8-A that executes the processing equivalent to the assembly instruction indicated by the generation instruction 66 according to the generation instruction 66 remaining in the FIFO buffer 60 (step S18).

After that, the output unit 59 outputs, to the outside, an output file in which the instruction sequences generated in each of steps S15 and S18 are described (step S19).

This completes the basic processing of the assembly instruction conversion method according to the present embodiment.

Next, how the contents of the FIFO buffer 60 change in the present embodiment will be described.

FIGS. 12A to 12F are schematic diagrams illustrating the transition of contents of the FIFO buffer 60 according to the flowchart of FIG. 11.

Figure 12A:
FIGS. 12A to 12F are schematic diagrams illustrating the transition of contents of a FIFO buffer in the first embodiment according to the flowchart of FIG. 11.

As illustrated in FIG. 12A, the FIFO buffer 60 is empty before the acquisition unit 53 acquires the assembly instructions 65a to 65d in step S11.

Figure 12B:
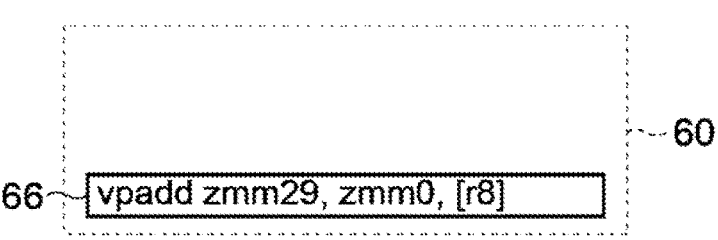

Next, when the acquisition unit 53 acquires the assembly instruction 65a of "vpadd zmm29, zmm0, [r8]" in step S11, the generation instruction 66 corresponding to the assembly instruction 65a is stored in the FIFO buffer 60 in step S13, as illustrated in FIG. 12B.

In this state, it is assumed that the assembly instruction 65b of "vpadd zmm30, zmm1, [r8+64]" is further acquired in step S11. Here, the assembly instruction "vpadd zmm29, zmm0, [r8]" indicated by the generation instruction 66 already stored in the FIFO buffer 60 and the newly acquired assembly instruction "vpadd zmm30, zmm1, [r8+64]" have the same name "vpadd". Furthermore, the types of the first to third operands in both assembly instructions are also the same. Therefore, the type of the assembly instruction "vpadd zmm29, zmm0, [r8]" indicated by the generation instruction 66 already stored in the FIFO buffer 60 and the type of the newly acquired assembly instruction "vpadd zmm30, zmm1, [r8+64]" are the same.

Figure 12C:
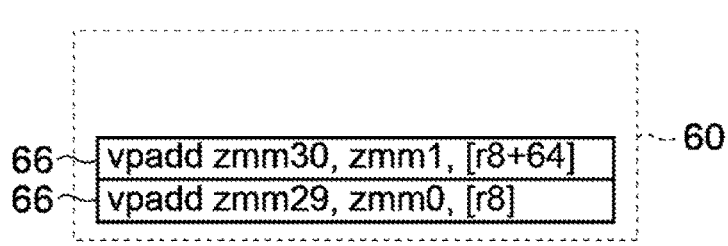

Therefore, in this case, the process proceeds from step S12 to step S13, and the generation instruction 66 corresponding to the assembly instruction 65b is stored in the FIFO buffer 60 as illustrated in FIG. 12C.

Figure 12D:
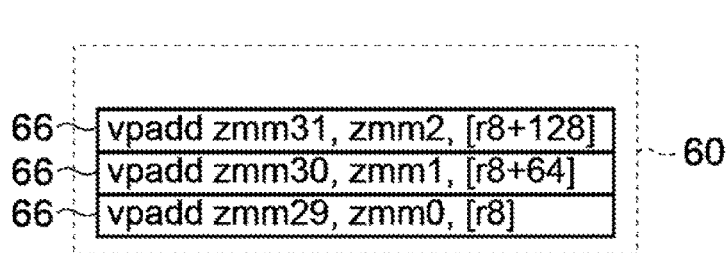
Figure 12E:
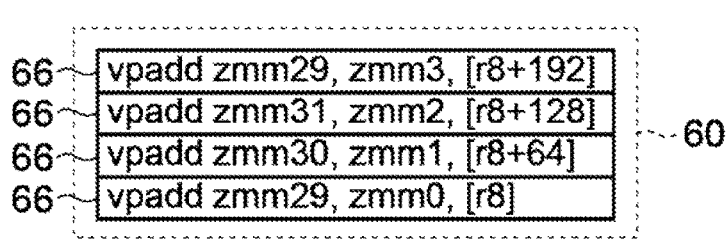

Similarly, the generation instructions 66 according to the assembly instructions 65c to 65d are stored in the FIFO buffer 60, as illustrated in FIGS. 12D to 12E.

After that, it is assumed that the acquisition unit 53 acquires the assembly instruction "ret" of x86_64 in step S11. The assembly instruction "ret" has a different name from the assembly instructions "vpadd" indicated by the four generation instructions 66 already stored in the FIFO buffer 60 at this point. Therefore, in this case, the FIFO buffer 60 is emptied in step S16.

Figure 12F:
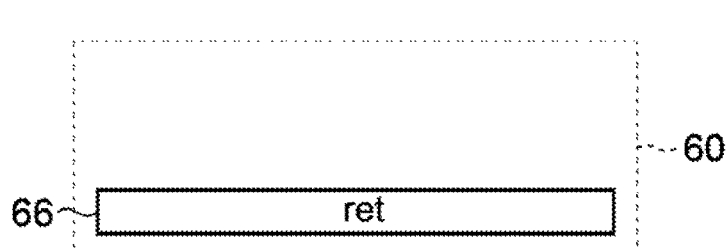

Then, the generation instruction 66 corresponding to the assembly instruction "ret" is stored in the FIFO buffer 60 in step S17, as illustrated in FIG. 12F.

Thus, in the present embodiment, a branch destination of step S12 changes according to the type of the assembly instruction acquired in step S11. Therefore, the names of the assembly instructions indicated by the generation instructions 66 stored in the FIFO buffer 60 are the same.

According to the present embodiment described above, the storing unit 54 stores the generation instruction 66 corresponding to each of the plurality of assembly instructions 65a to 65d in the FIFO buffer 60. Therefore, the identification unit 56 can identify the first vector register 35 that is not used by each of the plurality of assembly instructions 65a to 65d by referring to the FIFO buffer 60.

The determination unit 57 determines the second vector register 45 corresponding to the identified first vector register 35 as the temporary register. The first vector register 35 corresponding to the temporary register is not used in any of the plurality of assembly instructions 65a to 65d.

Therefore, it is not necessary for the generation unit 58 to include, in each of the instruction sequences 67a to 67d, the store instruction that saves the data stored in the temporary register to the second memory 42 and the load instruction that returns the data to the temporary register. As a result, it is possible to suppress each of the instruction sequences 67a to 67d from becoming unnecessarily long due to the store instruction and the load instruction.

Second Embodiment

In a second embodiment, the temporary register is determined by a method different from the above method of the first embodiment.

Figure 13:
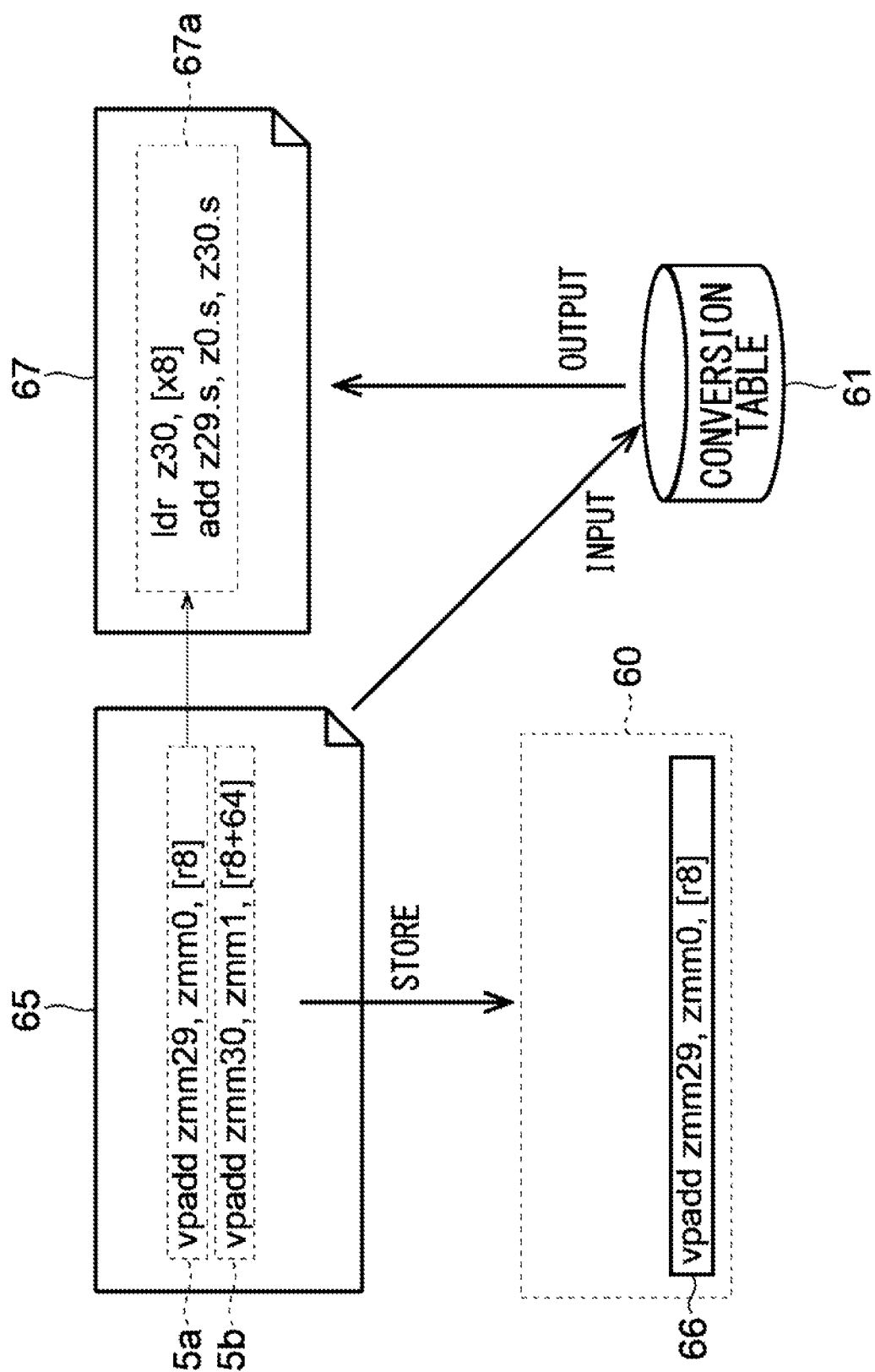
FIG. 13 is a schematic diagram for explaining the assembly instruction conversion method according to a second embodiment.

FIG. 13 is a schematic diagram for explaining the assembly instruction conversion method according to the present embodiment. In FIG. 13, the same elements as those in the first embodiment are designated by the same reference numerals, and the description thereof will be omitted below.

It is assumed that the information processing, apparatus 50 acquires two adjacent assembly instructions 65a and 65b of x86_64 in this order by acquiring the assembly file 65, in FIG. 13. In this case, the information processing apparatus 50 first stores the generation instruction 66 corresponding to the assembly instruction 65a in the FIFO buffer 60. Then, the information processing apparatus 50 determines the temporary register used in the preceding assembly instruction 65a when the subsequent assembly instruction 65b is acquired.

In this example, the destination register of the subsequent assembly instruction 65b is the first vector register 35 of "zmm30". On the other hand, the preceding assembly instruction 65a does not use the first vector register 35 of above "zmm30".

Therefore, even if "zmm30" is used as the temporary register in the assembly instruction 65a, the contents of "zmm30" are overwritten by the subsequent assembly instruction 65b, so that the execution results of the assembly instructions 65a and 65b do not change.

Therefore, the information processing apparatus 50 generates the instructor sequence 67a of Armv8-A that uses the second vector register 45 of "z30" corresponding to "zmm30" as the temporary register. The instruction sequence 67a is an instruction sequence that realizes the processing equivalent to the assembly instruction 65a of x86_64.

Further, the contents of the first vector register 35 of "zmm30" are overwritten by the subsequent assembly instruction 65b. Therefore, the information processing apparatus 50 does not need to add, to the instruction sequence 67a, the store instruction that saves the data of "z30" to the second memory 42 and the load instruction that returns the data to "z30", and can suppress the instruction sequence 67a from becoming unnecessarily long.

In generating the instruction sequence 67a, the information processing apparatus 50 refers to the conversion table 61. In the conversion table 61, the assembly instruction "vpadd" of x86_64 and the instruction sequence "ldr, add" of Armv8-A equivalent thereto are associated with each other, as described in the first embodiment. The information processing apparatus 50 can generate the instruction sequence 67a based on the above correspondence relationship.

Figure 14:
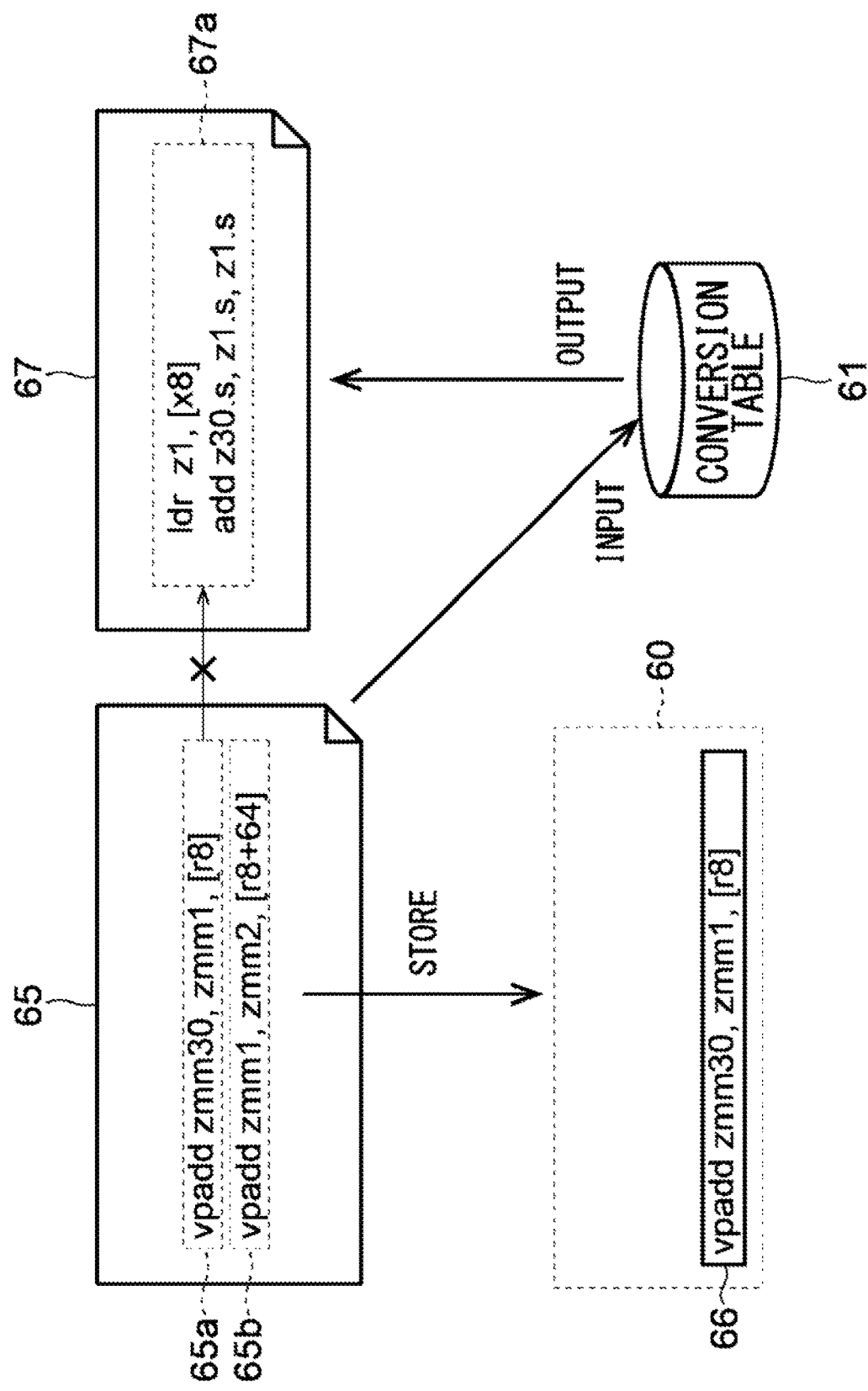

FIG. 14 is a schematic diagram illustrating a case where the destination register "zmm1" of the assembly instruction 65b is used as the source register of the preceding assembly instruction 65a unlike the example of FIG. 13.

In this case, it is assumed that the second vector register 45 of "z1" corresponding to "zmm1" is used as the temporary register, as illustrated in the instruction sequence 67a. When the instruction sequence 67a is executed, the assembly instruction "ldr" causes the data in the memory address indicated by the second general-purpose register 46 of "x8" to be stored in the second vector register 45 of "z1". Then, the assembly instruction "add" causes the data in "z1" to add each other and store the result in "z30".

On the other hand, when the assembly instruction 65a is executed, the data in the memory address indicated by the first general-purpose register 36 of "r8" and the data of "zmm1" are added, and the result is stored in "zmm30". Therefore, the execution results of the assembly instruction 65a and the instruction sequence 67a are different from each other, and the instruction sequence 67a is not equivalent to the assembly instruction 65a.

As described above, in order to use the destination register of the assembly instruction 65b as the temporary register, it is necessary that the destination register is not used as the source register in the preceding assembly instruction 65a.

Even when the destination register of the assembly instruction 65b is not used as the source register of the assembly instruction 65a, the following problem may occur.

Figure 15:
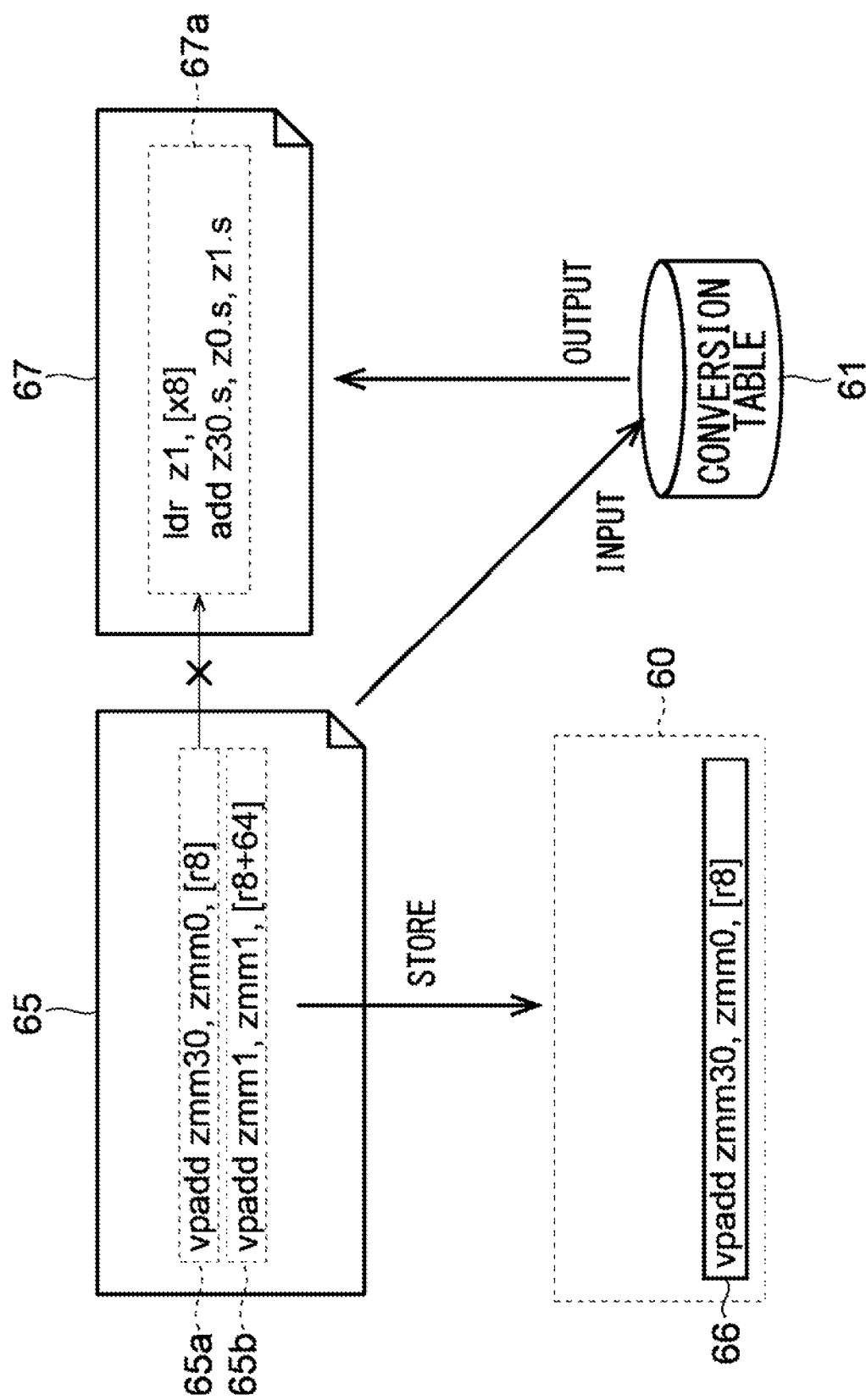
FIG. 15 is a schematic diagram for explaining a problem.

FIG. 15 is a schematic diagram for explaining the problem.

In the example of FIG. 15, the destination register of the assembly instruction 65b is "zmm1", and is different from the source register "zmm0" of the assembly instruction 65a. However, both of the source register and the destination register of the assembly instruction 65b are the same "zmm1".

In this case, it is assumed that the instruction sequence 67a uses the second vector register 45 of "z1" corresponding to the destination register "zmm1" of the assembly instruction 65b as the temporary register. When the instruction sequence 67a is executed, the data in the memory address indicated by the second general-purpose register 46 of "x8" is stored in the second vector register 45 of "z1", and the contents of "z1" are damaged. Since the data used by the assembly instruction 65b was stored in the first vector register 35 of "zmm1" corresponding to "z1", the execution result of the assembly instruction 65b would be changed.

As described above, in order to use the destination register of the assembly instruction 65b as the temporary register, both of the condition A and the condition B of FIG. 16 must be satisfied.

FIG. 16 is a schematic diagram illustrating the conditions determined by the information processing apparatus 50 according to the present embodiment.

When both of the conditions A and B are satisfied, the information processing apparatus 50 generates the instruction sequence 67a of Armv8-A equivalent to the assembly instruction 65a of x86_64, as illustrated in FIG. 13. In the instruction sequence 67a, the second vector register 45 corresponding to the destination register of the assembly instruction 65b is used as the temporary register. Further, the information processing apparatus 50 does not generate the store instruction that saves the data in the temporary register to the second memory 42 and the load instruction that returns the data to the temporary register. Thereby, it is possible to suppress the instruction sequence from becoming unnecessarily long.

Next, the functional configuration of the information processing apparatus 50 will be described.

Figure 17:
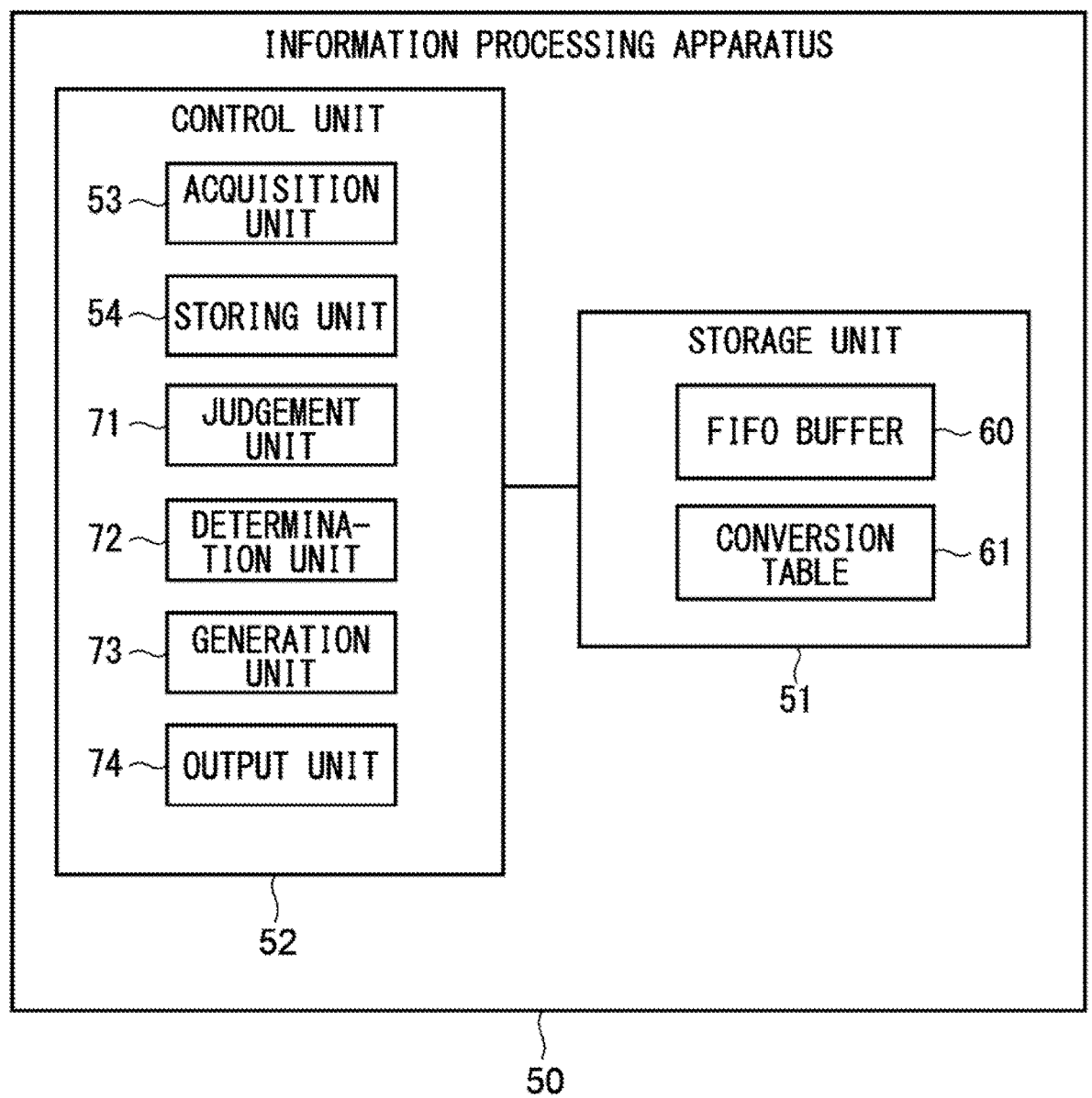
FIG. 17 is a functional configuration diagram of the information processing apparatus according to the second embodiment.

FIG. 17 is a functional configuration diagram of the information processing apparatus 50 according to the present embodiment. In FIG. 17, the same elements as those in the first embodiment are designated by the same reference numerals, and the description thereof will be omitted below.

As illustrated in FIG. 17, the control unit 52 of the information processing apparatus 50 includes a judgement unit 71, a determination unit 72, a generation unit 73, and an output unit 74 in addition to the acquisition unit 53 and the storing unit 54 described in the first embodiment.

The acquisition unit 53 is a processing unit that acquires the assembly instructions 65a and 65b in this order by acquiring the assembly file 65 in which the assembly instructions 65a and 65b of x86_64 of FIG. 13 are described. The storing unit 54 is a processing unit that stores the generation instruction 66 corresponding to each of the assembly instructions 65a and 65b in the FIFO buffer 60.

The judgement unit 71 is a processing unit that judges whether both of the condition A and the condition B of FIG. 16 are satisfied based on the assembly instruction 65a corresponding to the generation instruction 66 already stored in the FIFO buffer 60 and the newly acquired assembly instruction 65b.

The determination unit 72 is a processing unit that determines the second vector register 45 corresponding to the destination register of the assembly instruction 65b as the temporary register in the instruction sequence 67a when both of the conditions A and B are satisfied.

The generation unit 73 is a processing unit that generates the instruction sequence 67a which uses the temporary register determined by the determination unit 72. The output unit 74 is a processing unit that outputs, to the outside, the assembly file 67 in which the instruction sequence 67a is described.

Next, a description will be given of the assembly instruction conversion method according to the present embodiment.

Figure 18:
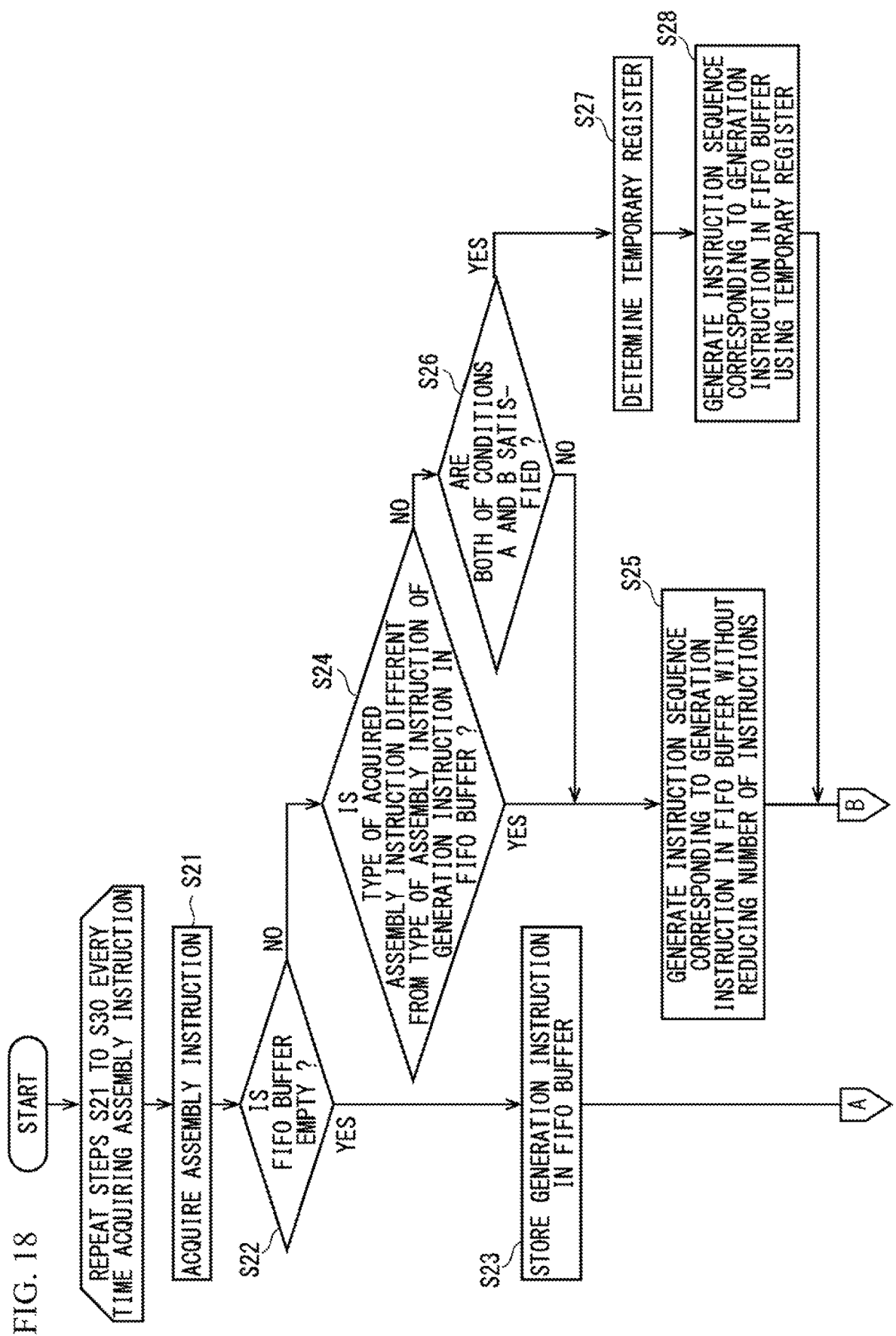
FIG. 18 is a flowchart of the assembly instruction conversion method according to the second embodiment (part 1)
Figure 19:
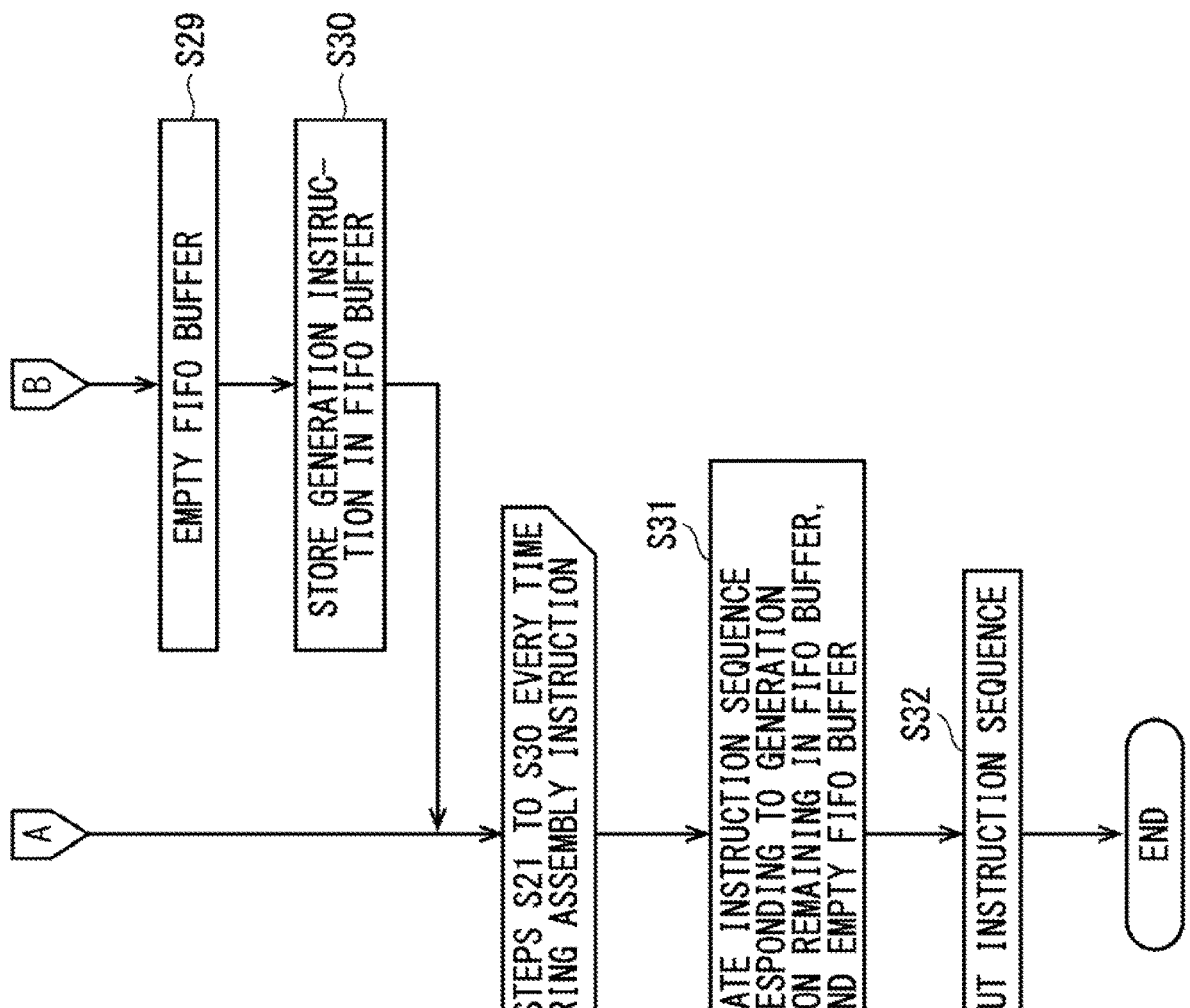
FIG. 19 is a flowchart of the assembly instruction conversion method according to the second embodiment (part 2)

FIGS. 18 and 19 are flowcharts of the assembly instruction conversion method according to the present embodiment.

First, the acquisition unit 53 acquires the assembly instruction 65a of x86_64 (step S21).

Next, the judgement unit 71 judges whether the FIFO buffer 60 is empty (step S22).

When the FIFO buffer 60 is empty (step S22: YES), the process proceeds to step S23. In step S23, the storing unit 54 stores the generation instruction 66 corresponding to the assembly instruction 65a acquired in step S21 in the FIFO buffer 60.

On the other hand, when the FIFO buffer 60 is not empty (step S22: NO), the process proceeds to step S24. In step S24, the judgement unit 71 judges whether the type of the assembly instruction acquired by the acquisition unit 53 in step S21 is different from the type of the assembly instruction indicated by the generation instruction 66 stored in the FIFO buffer 60.

In the present embodiment, only one generation instruction 66 is stored in the FIFO buffer 60 unlike the first embodiment. Therefore, it is sufficient for the judgement unit 71 to judge whether the type of the assembly instruction acquired in step S21 is different from the type of the assembly instruction indicated by the one generation instruction 66 stored in the FIFO buffer 60.

When the type of the assembly instruction acquired in step S21 is different from the type of the assembly instruction indicated by the generation instruction 66 stored in the FIFO buffer 60 (step S24: YES), the process proceeds to step S25.

In step S25, the generation unit 73 generates the instruction sequence of Armv8-A that executes the processing equivalent to the assembly instruction 65a by using the method described with reference to FIG. 4. In this method, the generation unit 73 adds, to the beginning of the instruction sequence, the store instruction that saves the data in the temporary register. Further, the generation unit 73 adds, to the end of the instruction sequence, the load instruction that returns the data to the temporary register. Therefore, in step S25, the number of instructions increases due to the store instruction and the load instruction, and the reduction in the number of instructions is not executed.

On the other hand, when the type of the assembly instruction acquired in step S21 is the same as the type of the assembly instruction indicated by the generation instruction 66 stored in the FIFO buffer 60 (step S24: NO), the process proceeds to step S26.

In step S26, the judgement unit 71 judges whether both of the conditions A and B of FIG. 16 are satisfied.

When both of the conditions A and B are not satisfied (step S26: NO), the above-mentioned step S25 is performed.

On the other hand, when both of the conditions A and B are satisfied (step S26: YES), the process proceeds to step S27. For example, it is assumed that the generation instruction 66 corresponding to the assembly instruction 65a is already stored in the FIFO buffer and the assembly instruction 65b is acquired in step S21 in this state, as illustrated in FIG. 13. In this case, since the destination register "zmm30" of the assembly instruction 65b is different from the source register "zmm0" of the assembly instruction 65a, the condition A is satisfied. Further, since the destination register "zmm30" and the source register "zmm1" of the assembly instruction 65b are different from each other, the condition B is also satisfied.

In this case, in step S27, the determination unit 57 determines the second vector register 45 of the "z30" corresponding to the destination register "zmm30" of the assembly instruction 65b as the temporary register.

Next, the generation unit 73 generates the instruction sequence 67a which uses the temporary register determined by the determination unit 57 in step S27 (step S28). Since the instruction sequence 67a does not include the store instruction that saves the data in the temporary register to the second memory 42 and the load instruction that returns the data to the temporary register as illustrated in FIG. 13, the number of instructions can be reduced.

After completing step S25 or step S28 as described above, the process proceeds to step S29.

In step S29, the storing unit 54 empties the FIFO buffer 60.

Next, the storing unit 54 stores the generation instruction 66 corresponding to the assembly instruction acquired in step S21 in the FIFO buffer 60 (step S30).

After that, steps S21 to S30 are repeated every time the acquisition unit 53 acquires the assembly instruction.

Next, according to the generation instruction 66 remaining in the FIFO buffer 60, the generation unit 73 generates the instruction sequence of Armv8-A that executes the processing equivalent to the assembly instruction indicated by the remained generation instruction 66 (step S31).

After that, the output unit 74 outputs, to the outside, the output file in which the instruction sequences generated in the respective steps S25, S28, and S31 are described (step S32).

This completes the basic processing of the assembly instruction conversion method according to the present embodiment.

Next, how the contents of the FIFO buffer 60 change in the present embodiment will be described.

FIG. 20 is a schematic diagram of the assembly instructions 65a to 65d acquired by the acquisition unit 53. Hereinafter, a case where the acquisition unit 53 acquires the assembly instructions 65a to 65d in this order will be described as an example.

FIGS. 21A to 21E are schematic diagrams illustrating the transition of contents of the FIFO buffer 60 according to the flowcharts of FIGS. 18 and 19.

Figure 21A:
FIGS. 21A to 21E are schematic diagrams illustrating the transition of contents of the FIFO buffer in the second embodiment according to the flowcharts of FIGS. 18 and 19.

As illustrated in FIG. 21A, the FIFO buffer 60 is empty before the acquisition unit 53 acquires the assembly instruction 65a in step S21.

Figure 21B:
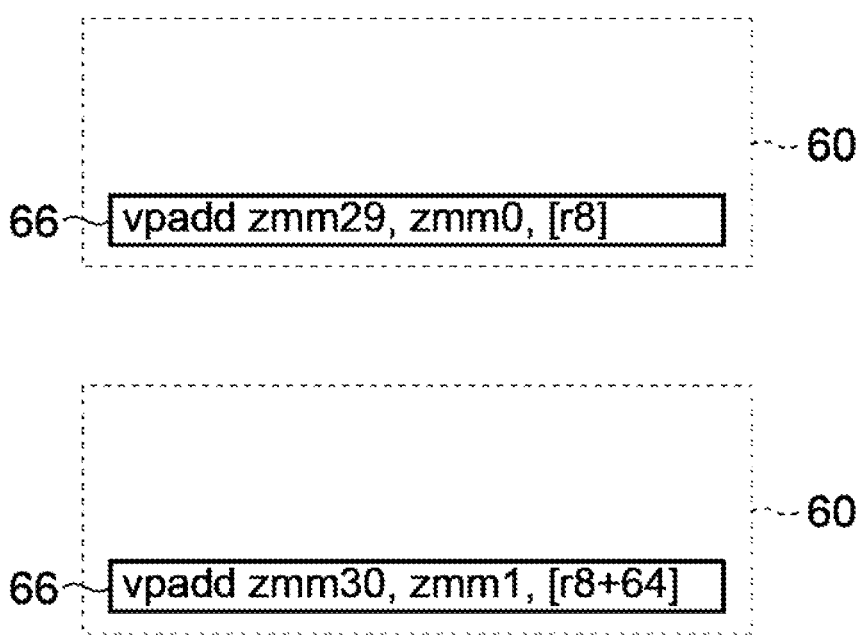

Next, when the acquisition unit 53 acquires the assembly instruction 65a of "vpadd zmm29, zmm0, [r8]" in step S21 as illustrated in FIG. 21B, the generation instruction 66 corresponding to the assembly instruction 65a is stored in the FIFO buffer 60 in step S23.

In this state, it is assumed that the acquisition unit 53 further acquires the assembly instruction 65b of "vpadd zmm30, zmm1, [r8+64]" in step S21. Here, the assembly instruction "vpadd zmm29, zmm0, [r8]" indicated by the generation instruction 66 already stored in the FIFO buffer 60 and the newly acquired assembly instruction "vpadd zmm30, zmm1, [r8+64]" have the same name "vpadd". Furthermore, the types of the first to third operands in both assembly instructions are also the same.

Furthermore, the preceding assembly instruction "vpadd zmm29, zmm0, [r8]" and the subsequent assembly instructions "vpadd zmm30, zmm1, [r8+64]" satisfy both of the conditions A and B. Therefore, in this case, the FIFO buffer 60 is emptied in step S29 after the instruction sequence is generated in step S28.

Figure 21C:
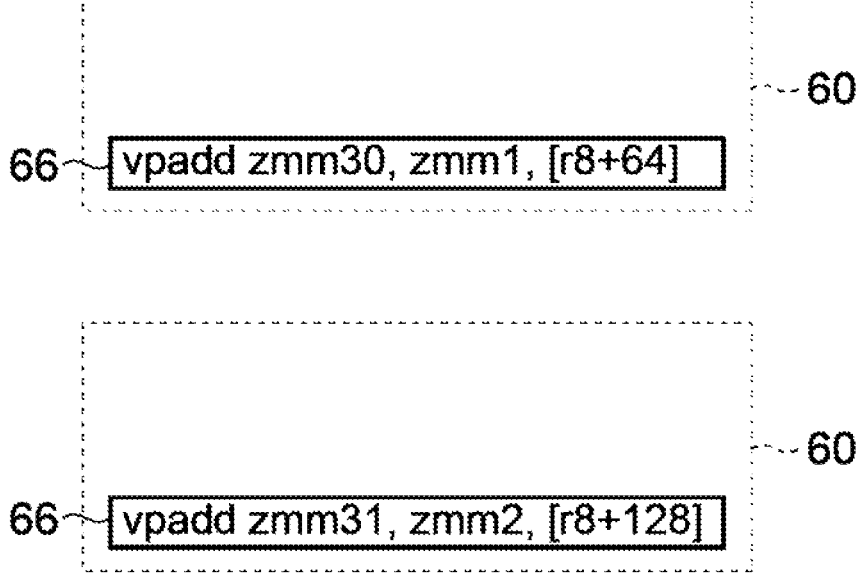

After that, as illustrated in FIG. 21C, the generation instruction 66 corresponding to the assembly instruction "vpadd zmm30, zmm1, [r8+64]" is stored in the FIFO buffer 60 in step S30.

Figure 21D:
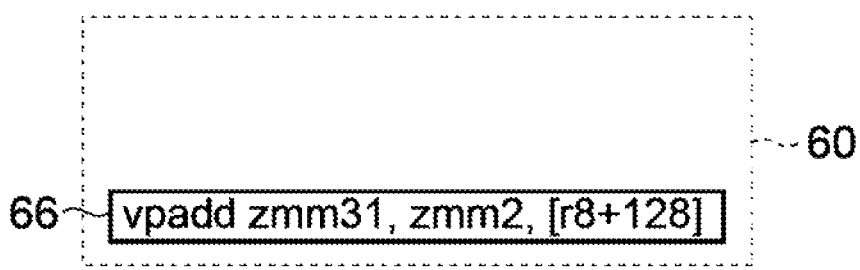
Figure 21E:
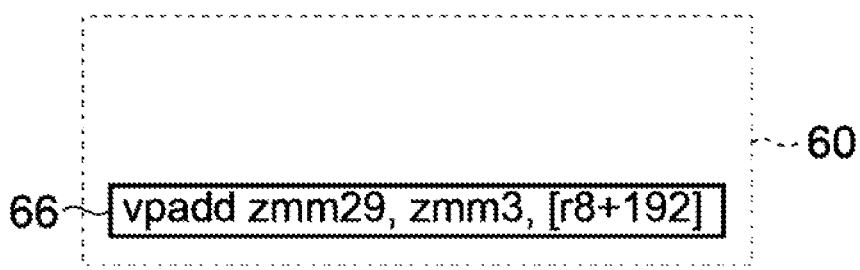

In the same way, only one generation instruction 66 is stored in the FIFO buffer 60 as illustrated in FIGS. 21D to 21E.

According to the present embodiment described above, the storing unit 54 stores the generation instruction 66 corresponding to the assembly instruction 65a in the FIFO buffer 60. Therefore, the judgement unit 71 can judge whether the assembly instruction 65a and the subsequent assembly instruction 65b corresponding to the generation instruction 66 satisfy both of the conditions A and B of FIG. 16 by referring to the FIFO buffer 60.

When both of the conditions A and B are satisfied, the determination unit 72 determines the second vector register 45 corresponding to the destination register of the assembly instruction 65b as the temporary register in the instruction sequence 67a. The data in the temporary register is overwritten by the subsequent assembly instruction 65b. Therefore, the generation unit 73 does not need to generate the store instruction that saves the data to the second memory 42 and the load instruction that returns the data to the temporary register, and can suppress the instruction sequence 67a from becoming unnecessarily long.

Third Embodiment

In the first embodiment and the second embodiment, the FIFO buffer 60 is used to reduce the number of instructions. In contrast, in a third embodiment, the FIFO buffer 60 is not required as follows.

Figure 22:
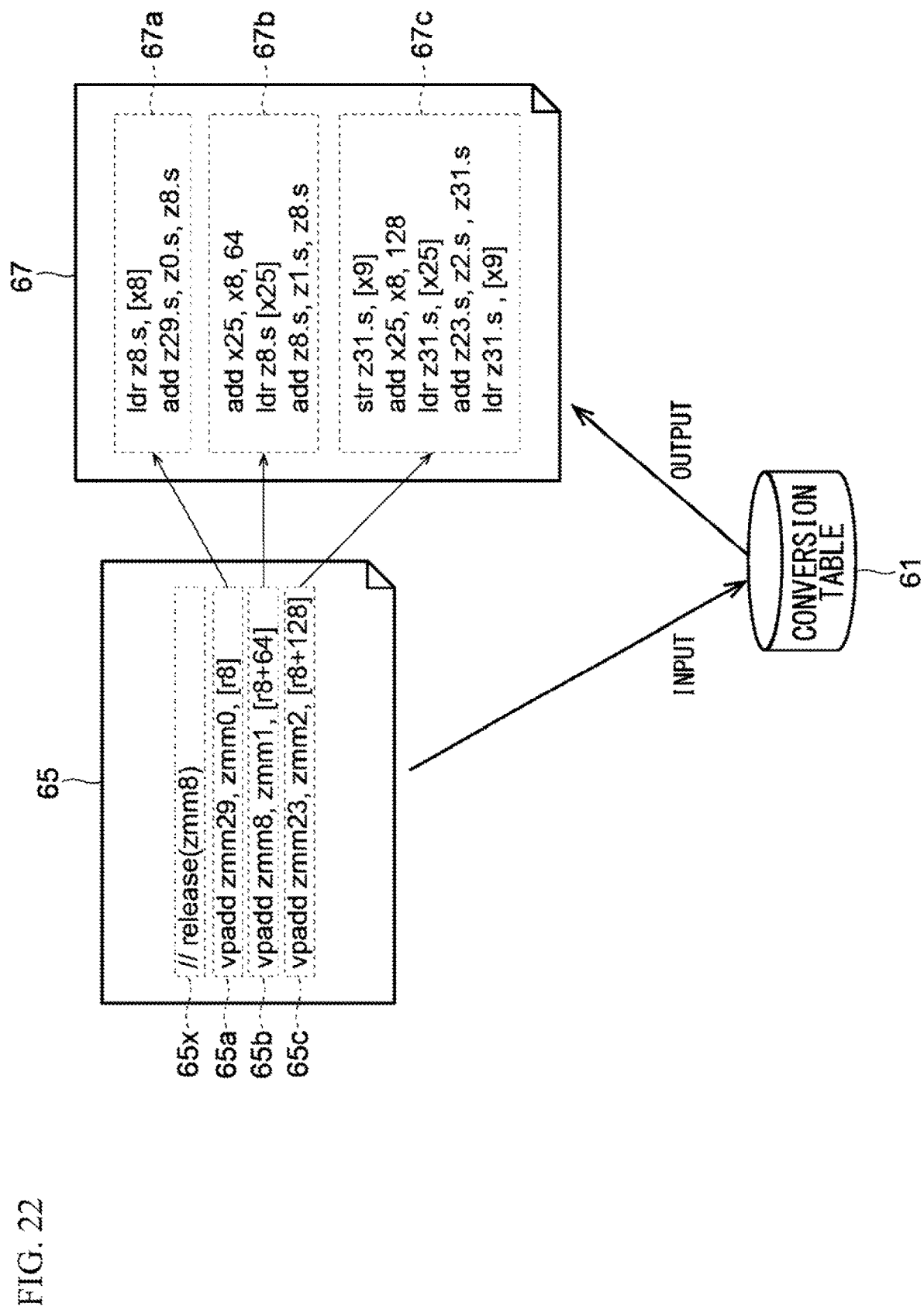
FIG. 22 is a schematic diagram for explaining the assembly instruction conversion method according a third embodiment.

FIG. 22 is a schematic diagram for explaining the assembly instruction conversion method according the present embodiment. In FIG. 22, the same elements as those in the first and the second embodiments are designated by the same reference numerals, and the description thereof will be omitted below.

In FIG. 22, it is assumed that the information processing apparatus 50 acquires the assembly file 65 in which the assembly instructions 65a to 65c of x86_64 are described. In the present embodiment, the developer describes a code 65x at a position before each of the assembly instructions 65a to 65c in the assembly file 65. The code 65x is a code that specifies the first vector register 35 that can be used as the temporary register, and is written by the developer.

In the example of FIG. 22, a character sequence "zmm8" following a character sequence "release" specifies that the first vector register 35 of "zmm8" is the temporary register.

Further, the information processing apparatus 50 generates the instruction sequences 67a to 67c of Armv8-A that execute the processing equivalent to the assembly instructions 65a to 65c of x86_64 by referring to the conversion table 61. At this time, the information processing apparatus 50 uses the second vector register 45 of "z8" corresponding to "zmm8" as the temporary register of the instruction sequences 67a and 67b.

The developer uses the code 65x to specify the vector register that does not require saving data to the second memory 42 or returning the data from the second memory 42 as the temporary register. Therefore, the information processing apparatus 50 does not include, in the instruction sequences 67a and 67b, the store instruction that saves the data in the temporary register to the second memory 42. Similarly, the information processing apparatus 50 does not include, in the instruction sequences 67a and 67b, the load instruction that returns data from the second memory 42 to the temporary register. Thereby, it is possible to suppress the instruction sequences 67a and 67b from becoming unnecessarily long due to the load instruction and the store instruction.

In this example, the destination register of the assembly instruction 65b is the same as the first vector register 35 of "zmm8" specified by the code 65x. In this case, if the subsequent assembly instruction 65c uses "zmm8" as the temporary register, the assembly instruction 65c overwrites the data stored in the first vector register 35 of "zmm8" by the assembly instruction 65b.

Therefore, in this case, the information processing apparatus 50 uses the second vector register 45 of "z31", which is different from the second vector register 45 specified by the code 65x, in the instruction sequence 67c. The second vector register 45 of "z31" may store data used in the subsequent instructions of the instruction sequence 67c. Therefore, the information processing apparatus 50 adds, to the beginning of the instruction sequence 67c, an assembly instruction "str z31.s, [x9]" that saves the data to the second memory 42. Further, the information processing apparatus 50 adds, to the end of the instruction sequence 67c, an assembly instruction "ldr z31.s, [x9]" that returns from the second memory 42 to the second vector register 45 of "z31".

Figure 23:
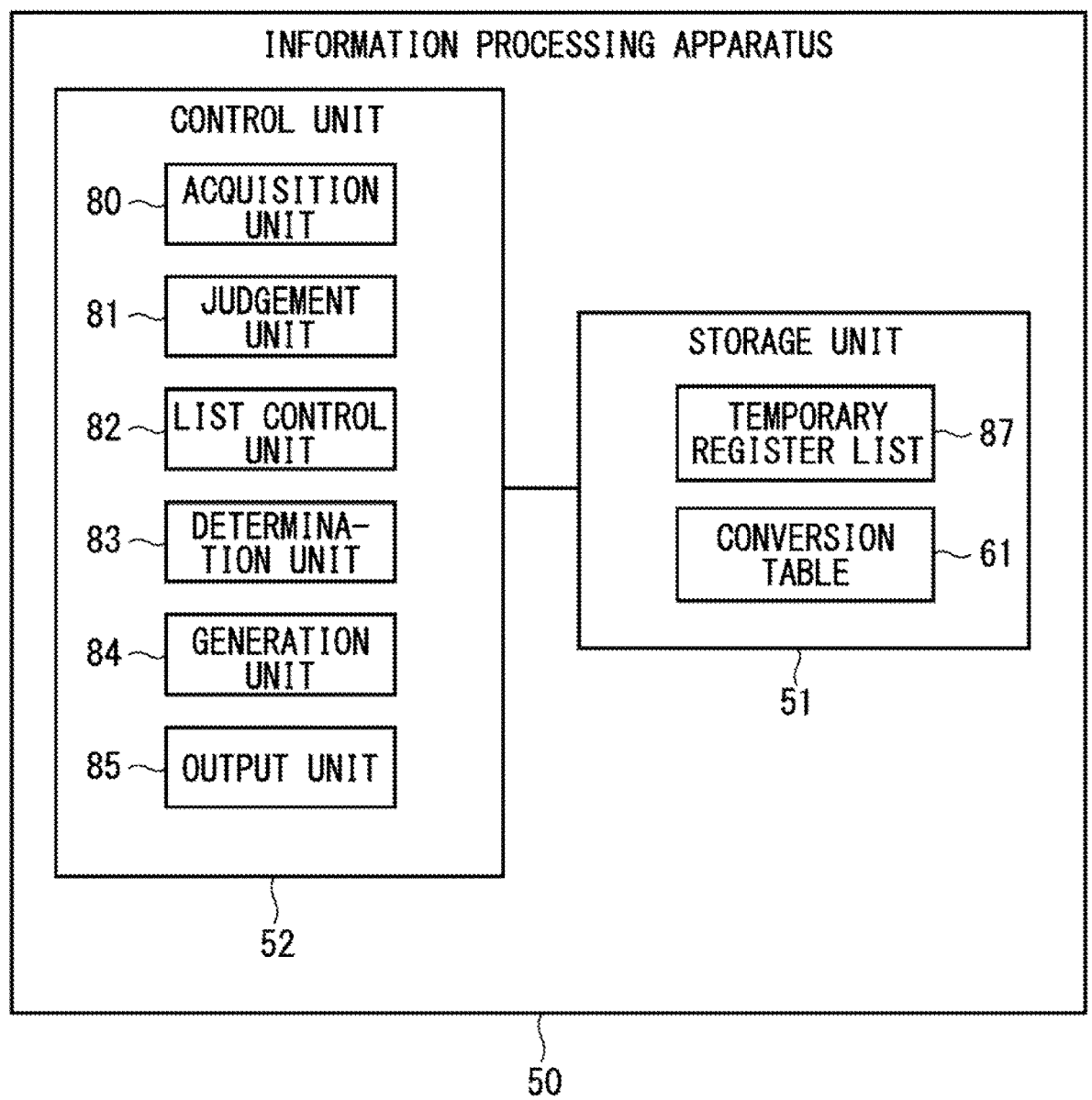
FIG. 23 is a functional configuration diagram of the information processing apparatus according to the third embodiment.

FIG. 23 is a functional configuration diagram of the information processing apparatus 50 according to the present embodiment.

In FIG. 23, the same elements as those in the first and the second embodiments are designated by the same reference numerals, and the description thereof will be omitted below.

As illustrated in FIG. 23, the storage unit 51 in the present embodiment stores a temporary register list 87 in addition to the conversion table 61. The temporary register list 87 is a list that stores the name "zmm8" of the first vector register 35 specified by the code 65x.

On the other hand, the control unit 52 includes an acquisition unit 80, a judgement unit 81, a list control unit 82, a determination unit 83, a generation unit 84, and an output unit 85.

The acquisition unit 80 is a processing unit that acquires the assembly file 65. Then, the judgement unit 81 judges whether the assembly file 65 includes the code 65x.

The list control unit 82 is a processing unit that adds the name of the first vector register 35 specified by the code 65x to the temporary register list 87.

The determination unit 83 is a processing unit that identifies the name stored in the temporary register list 87 and determines the second vector register 45 corresponding to the name as the temporary register.

The generation unit 84 is a processing unit that generates the instruction sequences 67a to 67d that perform the processing equivalent to the assembly instructions 65a to 65b, respectively. For example, the generation unit 84 generates the instruction sequence 67a corresponding to the assembly instruction 65a by referring to the conversion table 61. At this time, the generation unit 84 uses the temporary register determined by the determination unit 83 in the instruction sequence 67a.

The generation unit 84 does not add, to each of the instruction sequences 67a to 67d, the store instruction that saves the data stored in the temporary register to the second memory 42 and the load instruction that returns the data to the temporary register. This suppresses the execution time of the instruction sequences 67a to 67d from becoming longer due to the reduction of the unnecessary store and load instructions.

The output unit 85 is a processing unit that outputs, to the outside, the assembly file 67 in which the instruction sequences 67a to 67d are described.

Next, a description will be given of the assembly instruction conversion method according to the present embodiment.

Figure 24:
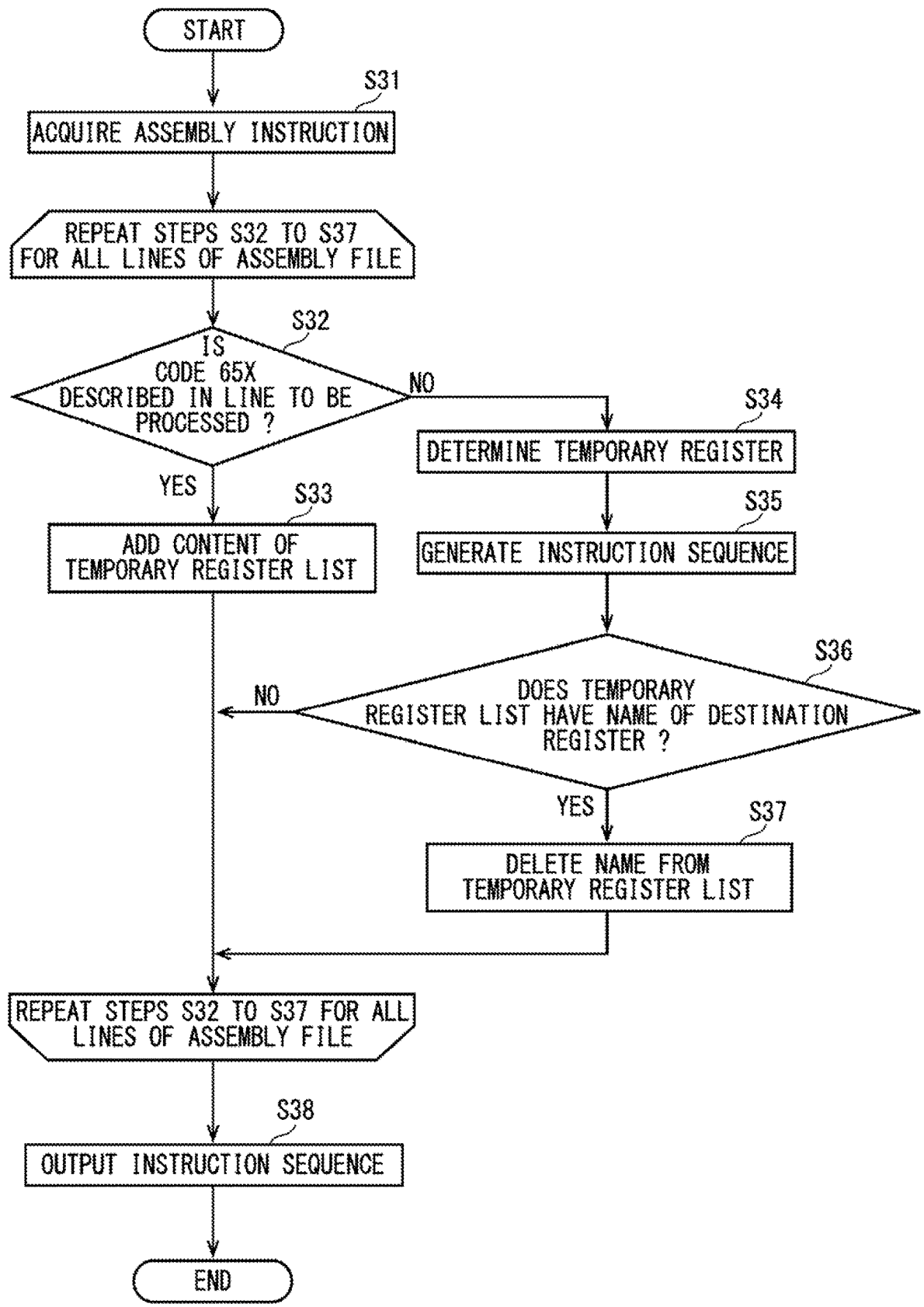
FIG. 24 is a flowchart of the assembly instruction conversion method according to the third embodiment.

FIG. 24 is a flowchart of the assembly instruction conversion method according to the present embodiment.

First, the acquisition unit 80 acquires the assembly file 65 (step S31).

Hereafter, the following processing is repeated for each line of the assembly file 65.

First, the judgement unit 81 judges whether the code 65x is included in the assembly file 65 by judging whether the code 65x is described in the line to be processed (step S32).

When the code 65x is described (step S32: YES), the process proceeds to step S33.

In step S33, the list control unit 82 adds the name of the first vector register 35 specified by the code 65x to the temporary register list 87.

Figures 25A, 25B:
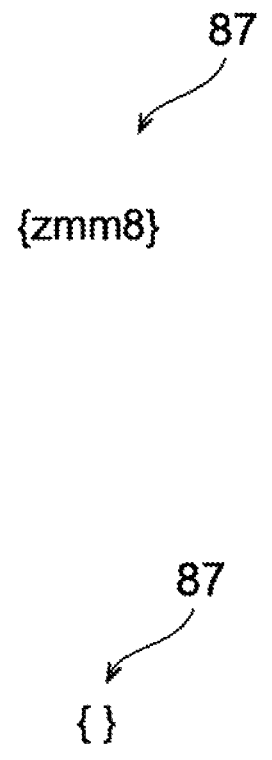

FIG. 25A is a schematic diagram of the temporary register list 87. Here, as illustrated in FIG. 22, a case where the name of the first vector register 35 specified by the code 65x is "zmm8" is illustrated.

FIG. 24 is referred again.

On the other hand, when the code 65x is not described (step S32: NO), the process proceeds to step S34.

In step S34, the determination unit 83 identifies the name stored in the temporary register list 87, and determines the second vector register 45 corresponding to the name as the temporary register.

Next, the generation unit 84 generates the instruction sequence of Armv8-A that executes the processing equivalent to the assembly instruction of x86_64 described in the line being processed (step S35). At this time, the generation unit 84 uses the temporary register determined in step S34 for the instruction sequence.

For example, it is assumed that the assembly instruction described in the line being processed is the assembly instruction 65a in FIG. 22. In this case, the generation unit 84 generates the instruction sequence 67a that use each of the assembly instructions of "ldr" and "add" by referring to the conversion table 61. Further, the generation unit 84 uses, as the temporary register, the second vector register 45 of "z8" corresponding to the name "zmm8" stored in the temporary register list 87 in the instruction sequence 67a.

Next, the judgement unit 81 judges whether the temporary register list 87 has the name of the destination register of the assembly instruction described in the line being processed (step S36). For example, it is assumed that the assembly instruction 65b in FIG. 22 is described in the line being processed and the name "zmm8" is stored in the temporary register list 87. In this case, since the destination register of the assembly instruction 65b is "zmm8", the name is in the temporary register list 87.

In this case, if "zmm8" is used as the temporary register in the subsequent assembly instruction 65c, the assembly instruction 65c overwrites the data written in "zmm8" by the assembly instruction 65b as described above.

If the name of the destination register is in the temporary register list 87 (step S36: YES) in order to prevent this, the list control unit 82 deletes the name from the temporary register list 87 in step S37. In the example of FIG. 22 above, the name "zmm8" is deleted from the temporary register list 87. FIG. 25B is a schematic diagram of the temporary register list 87 when the name "zmm8" is deleted in this way.

After that, steps S32 to S37 are repeated for all the lines of the assembly file 65. If the name of the destination register is not in the temporary register list 87 (step S36: YES), steps S32 to S37 are repeated in the same manner.

Then, the output unit 85 outputs the assembly file 67 including the instruction sequences generated in step S35 to the outside (step S38).

This completes the basic processing of the assembly instruction conversion method according to the present embodiment.

According to the present embodiment described above the generation unit 84 uses the second vector register 45 corresponding to the first vector register 35 specified by the code 65x as the temporary register, in the instruction sequence 67b. The temporary register is a register specified by the developer as the vector register that does not require saving the data to the second memory 42 and returning the data from the second memory 42. Therefore, the generation unit 84 does not need to include the store instruction that saves the data and the load instruction that returns the data in the instruction sequence 67b, and can suppress the instruction sequence 67b from becoming unnecessarily long.

Fourth Embodiment

In the first to third embodiments, the instruction sequence of Armv8-A that executes the processing equivalent to the assembly instruction of x86_64 is suppressed from being unnecessarily long. In contrast, in the present embodiment, the machine language sequence generated by the JIT (Just In Time) compiler technique is suppressed from being unnecessarily long.

The JIT compiler technology is a technology that generates a suitable instruction sequence of a machine language from a source code according to the parameters determined at runtime, processing content, and a status of the processor. The instruction sequence of the machine language generated using the JIT compiler technology is faster in processing than an executable program including an instruction sequence of the machine language that can be processed general-purposely and generated by an AOT (Ahead Of Time) type compiler.

A description will be given of an example of the source code of the assembly instruction conversion program 49 when the JIT compiler technology is used.

FIG. 26A is a schematic diagram of a pseudo source code described by C++ of a type declaration used in the source code of the assembly instruction conversion program 49.

In the present embodiment, the types "ZmmReg", "memOperand", "ZRegS", and "XReg" are declared as illustrated in FIG. 26A.

The "ZmmReg" type is a type indicating the first vector register 35 of x86_64, and has a class variable "index" indicating the register number of the first vector register 35.

The "memOperand" type is a type indicating the memory operand of the assembly instruction of x86_64. A class variable "index" indicating a register number of the first general-purpose register 36 holding the memory address and a class variable "offset" indicating the memory offset are declared in the "memOperand" type.

Further, the "ZRegS" type is a type indicating the second vector register 45 of Armv8-A, and has a class variable "index" indicating a register number of the second vector register 45.

The "XReg" type is a type indicating the second general-purpose register 46 of Armv8-A, and has a class variable "index" indicating a register number of the second general-purpose register 46.

FIG. 26B is a schematic diagram of a pseudo source code 100 described by C++ indicating the definition of a vpadd function that generates the machine language of the assembly instruction "vpadd" of x86_64.

The vpadd function 101 is a function that takes variables of the "ZmmReg" type for the first and second operands and a variable of the "memOperand" type for the third operand as arguments, and generates the machine language of Armv8-A that executes the processing equivalent to the assembly instruction "vpadd" of x86_64. In this way, a function whose name is the same as the name of the assembly instruction and which generates the machine language of the assembly instruction is hereinafter referred to as a mnemonic function.

When the vpadd function 101 is called, either a genJit-CodeOfFifo function 103 or a code 104 is executed depending on a judgment result of an if statement 102.

The code 104 is a code that stores a generation instruction for generating the machine language of Armv8-A that executes the processing equivalent to the assembly instruction "vpadd" in the FIFO buffer. The FIFO buffer is an example of the storage area secured in the storage 50a, the memory 50b, or the like.

FIGS. 27A to 27E are schematic diagrams of the FIFO buffer.

Figure 27A:
FIGS. 27A to 27E are schematic diagrams of the FIFO buffer according to the fourth embodiment.
Figure 27B:
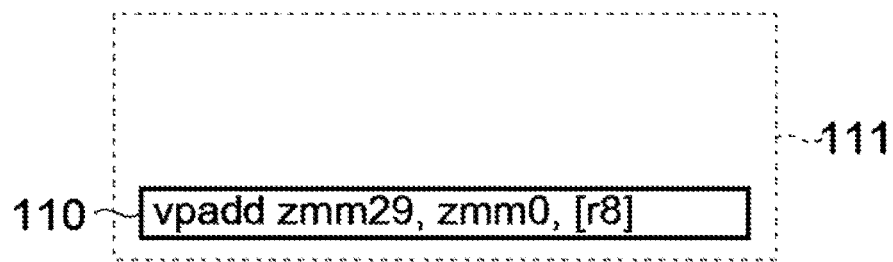
Figure 27C:
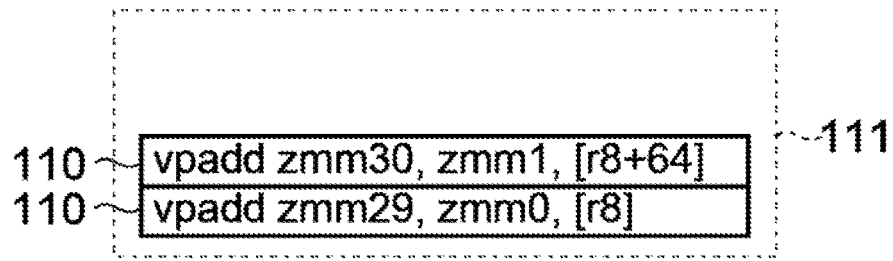
Figure 27D:
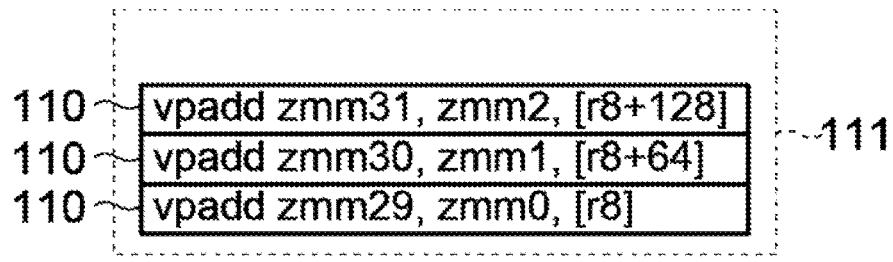
Figure 27E:
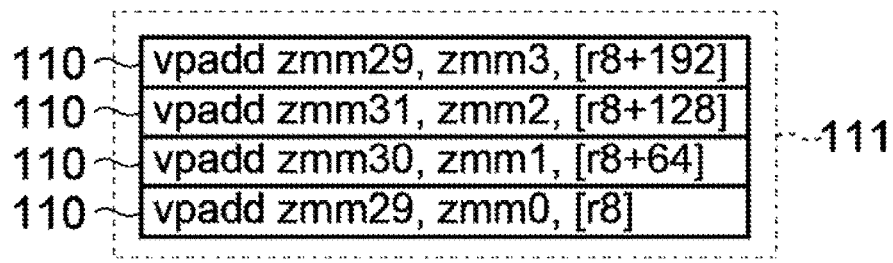

As illustrated in FIG. 27A, a FIFO buffer 111 is empty before the source code 100 is executed.

Then, a generation instruction 110 is stored in the FIFO buffer 111 every time the code 104 is executed, as illustrated in FIGS. 27B to 27E.

Here, each of the plurality of generation instructions 110 is identified by the assembly instruction such as "vpadd zmm29, zmm0, [r8]". For example, the generation instruction 110 identified by "vpadd zmm30, zmm1, [r8+64]" represents an instruction which generates the machine language of Armv8-A that executes the processing equivalent to the assembly instruction "vpadd zmm30, zmm1, [r8+64]" of x86_64.

Further, an order in which the generation instruction 110 is stored in the FIFO buffer 111 is the same as an order in which the code 104 is executed. In FIGS. 27B to 27E, it is assumed that the generation instruction 110 corresponding to the assembly instruction "vpadd zmm29, zmm0, [r8]" is first stored in the FIFO buffer 111. After that, the generation instructions 110 corresponding to the respective assembly instructions "vpadd zmm30, zmm1, [r8+64]", "vpadd zmm31, zmm2, [r8+128]", and "vpadd zmm29, zmm3, [r8+192]" are stored in the FIFO buffer 111.

FIG. 26B is referred again.

The if statement 102 is a statement that judges whether the type of the assembly instruction indicated by the generation instruction 110 stored in the FIFO buffer 111 is different from the type of the mnemonic function vpadd. The type of assembly instruction is a set of the name of the assembly instruction and the types of the operands.

For example, it is assumed that the assembly instruction indicated by the generation instruction 110 stored in the FIFO buffer 111 is "vpadd zmm29, zmm0, [r8]". In this case, the name of the assembly instruction indicated by the generation instruction 110 matches the name "vpadd" of the mnemonic function vpadd. The types of the first to third operands of the mnemonic function vpadd are the ZmmReg type, the ZmmReg type, and the memOperand type, respectively. These types match the types of the first to third operands of the assembly instruction "vpadd zmm29, zmm0, [r8]". Therefore, in this case, the type of the assembly instruction "vpadd zmm29, zmm0, [r8]" is the same as the type of the mnemonic function vpadd.

Then, either the genJitCodeOfFifo function 103 or the code 104 is executed according to the judgement result of the if statement 102.

In the present embodiment, when the plurality of generation instructions 110 are stored in the FIFO buffer 111, the types of assembly instructions indicated by all the stored generation instructions 110 are the same as each other. Therefore, the if statement 102 judges whether the type of the assembly instruction indicated by any of the plurality of generation instructions 110 is different from the type of the mnemonic function vpadd.

Figures 28A, 28B:
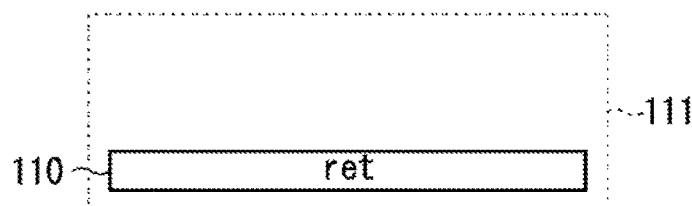
FIG. 28A is a schematic diagram of a pseudo source code described by C++ indicating the definition of a ret function according to the fourth embodiment.
FIG. 28B is a schematic diagram of the FIFO buffer in which a generation instruction of the assembly instruction "ret" is stored according to the fourth embodiment.

FIG. 28A is a schematic diagram of a pseudo source code described by C++ indicating an example of the definition of a ret function 113.

The ret function 113 is a mnemonic function that generates the machine language of Armv8-A that executes the processing equivalent to the assembly instruction "ret" included in the instruction set of the x86_64 architecture.

When the ret function 113 is called, either the genJit-CodeOfFifo function 103 or a code 115 is executed according to the judgement result of an if statement 114.

The if statement 114 is a statement that judges whether the type of the assembly instruction indicated b the generation instruction 110 stored in the FIFO buffer 111 is different from the type of the mnemonic function ret.

The code 115 is a code that stores the generation instruction 110 of the assembly instruction "ret" in the FIFO buffer 111. The generation instruction 110 is an instruction that generate the machine language of Armv8-A that executes the processing equivalent to the assembly instruction "ret" of x86_64.

FIG. 28B is a schematic diagram of the FIFO buffer 111 in which the generation instruction 110 of the assembly instruction "ret" is stored.

As described above, in the present embodiment, only the generation instructions 110 corresponding to the same type of assembly instructions are stored in the FIFO buffer 111. Therefore, the generation instruction 110 corresponding to the assembly instruction "ret" and the generation instruction 110 corresponding to the assembly instruction "vpadd" do not coexist in the FIFO buffer 111.

FIG. 29 is a schematic diagram of a pseudo source code described by C++ indicating an example of the definition of the genJitCodeOfFifo function 103.

As illustrated in FIG. 29, the genJitCodeOfFifo function 103 judges the content of a variable instType in an if statement 117 and executes processing according to the content. The variable instType is a variable indicating the name of the assembly instruction and the types of the operands which are indicated by the generation instruction 110 in the FIFO buffer 111.

For example, in the case of the generation instruction 110 of the assembly instruction "vpadd zmm30, zmm1, [r8+64]", the name "vpadd" of the assembly instruction is stored in the variable instType. Further, the type "ZmmReg" which is the type of each of the first operand (zmm30) and the second operand (zmm1) and the type "memOperand" which is the type of the third operand are stored in the variable instType.

When the generation instruction 110 of the assembly instruction "vpadd" is stored in the FIFO buffer 111, an evaluation expression of the if statement 117 becomes true, and a translateVPADD function 118 is called.

When the generation instruction 110 of the assembly instruction "ret" is stored in the FIFO buffer 111, an evaluation expression of an if statement 119 becomes true and a translateRET function 120 is called.

Then, the genJitCodeOfFifo function 103 empties the contents of the FIFO buffer 111 in a code 121 when the execution of the translateVPADD function 118 and the translateRET function 120 is completed.

FIG. 30 is a schematic diagram of a pseudo source code described by C++ indicating an example of the definition of the translateVPADD function 118 according to the present embodiment.

When the translateVPADD function 118 is called, a return value of a getTmpIndexConsideringFifo function is assigned to a class variable "index" of a variable "zSrc2" in a code 125. The getTmpIndexConsideringFifo function is a function that returns the register number of the first vector register 35 which is not used by any of the assembly instructions corresponding to the plurality of generation instructions 110 in the FIFO buffer 111. When there are a plurality of such first vector registers 35, the getTmpIndex-ConsideringFifo function returns a largest register number among them.

Next, a str function is executed in a code 126. The str function is a mnemonic function that generates the machine language of the assembly instruction "str" of Armv8-A. Here, the first operand of the assembly instruction "str" is the second vector register 45 corresponding to "zSrc2". The second operand is a memory address stored in the second general-purpose register 46 indicated by "x9" which is predetermined by the developer.

Thereby, the data stored in the second vector register 45 corresponding to "zSrc2" is saved in the memory address indicated by "x9".

Next, a for loop is executed for the number of generation instructions 110 in the FIFO buffer 111. A variable "i" in the for loop is a variable that identifies the generation instruction 110 in the FIFO buffer 111. Here, a value of the variable "i" corresponding to the generation instruction 110 first stored in the FIFO buffer 111 is set to "0". Then, the values of the variable "i" corresponding to the generation instruction 110 stored second, third, . . . are set to "1", "2", . . . , respectively.

Here, it is assumed that the member variable "offset" of the third operand "memOp" of the "memOperand" type of the assembly instruction "vpadd" indicated by the i-th generation instruction 110 is "0". In this case, in a code 127, the class variable "index" of the variable "memOp" of the i-th generation instruction 110 is assigned to the class variable "index" of the variable "xaddr" of the "XReg" type.

It is assumed that the member variable "offset" of the third operand "memOp" of the "memOperand" type of the assembly instruction "vpadd" indicated by the generation instruction 110 is not "0".

In this case, in a code 128, the value of the class variable "index" of the variable "memOp" is assigned to the class variable "index" of the variable "tmp" of the "XReg" type. Then, an add function is executed in a code 129. The add function is a mnemonic function that generates the machine language of the assembly instruction "add" of Armv8-A. Here, the first operand of the assembly instruction "add" is the second general-purpose register 46 of "x25" which is predetermined by the developer. The second operand of the assembly instruction "add" is the second general-purpose register corresponding to the variable"tmp". The third operand of the assembly instruction "add" is the memory offset indicated by the class variable "offset" of the variable "memOp" of the i-th generation instruction 110.

Next, in a code 130, a value "25" which is predetermined by the developer is assigned to the class variable "index" of the variable "xaddr".

When the for loop is completed as described above, the ldr function is executed in a code 131. The ldr function is a mnemonic function that generates the machine language of an assembly instruction "ldr" of Armv8-A. Here, the first operand of the assembly instruction "ldr" is the second vector register 45 corresponding to "zSrc2". The second operand of the assembly instruction "ldr" is the memory address stored in the second general-purpose register 46 indicated by the variable "xaddr".

Next, an add function is executed in a code 132. The add function is a mnemonic function that generates the machine language of the assembly instruction "add" of Armv8-A, as with the code 129. The first and second operands of the assembly instruction "add" are variables "zSdst" and "zSrc1" of the ZReg type, respectively. The third operand of the assembly instruction "add" is the variable "zSrc2" in which the register number of the temporary register is stored, in the code 125.

After that, a ldr function is executed in a code 133. The arguments of the ldr function are the same as the arguments of the str function in the code 126. Thereby, the data saved in the memory address indicated by "x9" is returned to the second vector register 45 corresponding to "zSrc2".

This completes the processing of the translateVPADD function 118.

Figure 31:
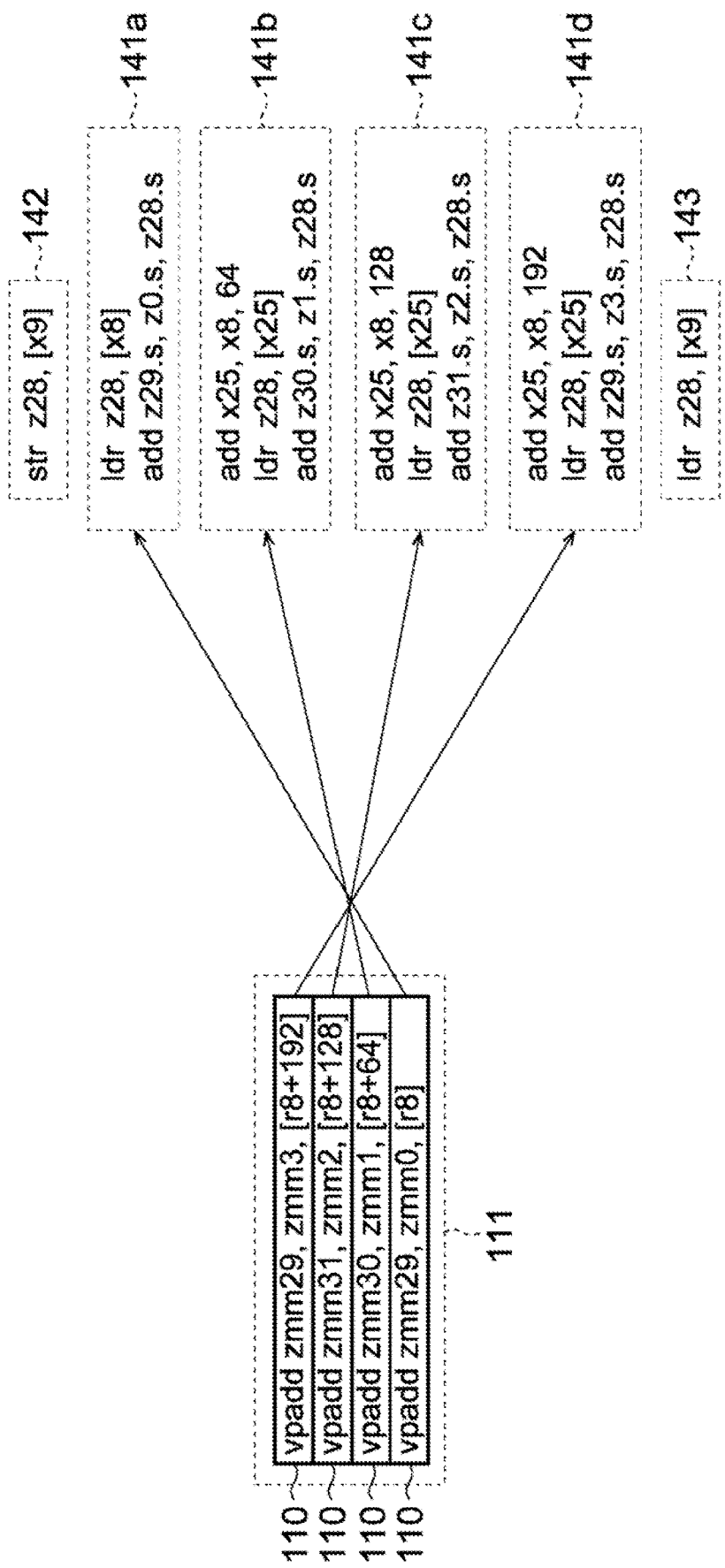
FIG. 31 is a schematic diagram illustrating an execution example of the translateVPADD function according to the fourth embodiment.

FIG. 31 is a schematic diagram illustrating an execution example of the translateVPADD function 118.

It is assumed that, in the example of FIG. 31, the generation instruction 110 corresponding to the assembly instruction "vpadd zmm29, zmm0, [r8]" is first stored in the FIFO buffer 111, and then the generation instructions 110 corresponding to the assembly instruction "vpadd zmm30, zmm1, [r8+64]" and two subsequent assembly instructions are stored in the FIFO buffer 111.

In this case, when the translateVPADD function 118 is executed, the value "28" is assigned to the variable "zSrc2" by the getTmpIndexConsideringFifo function of the code 125.

Next, the machine language corresponding to "str z 28, [x9]" store instruction 142 is generated by the code 126.

Then, the machine languages of the instruction sequences 141a to 141d including the assembly instructions "ldr" and "add" corresponding to the ldr function of the code 131 and the add function of the code 132, respectively, are generated.

In the instruction sequences 141b to 141d, the assembly instruction "add" corresponding to the add function of the code 129 is also included.

After that, the machine language corresponding to "ldr z28, [x9]" of a load instruction 143 is generated by the code 133.

According to this, in the instruction sequences 141a to 141d, the second vector register 45 of "z28" is used as the temporary register. The first vector register 35 of "zmm28" corresponding to "z28" is not used by each generation instruction 110 in the FIFO buffer 111.

Therefore, it is not necessary to add, to all the instruction sequences 141a to 141d, the store instruction that saves the data of the second vector register 45 of "z28" to the second memory 42. Similarly, it is not necessary to add, to all the instruction sequences 141a to 141d, the load instruction that returns the data to the second vector register 45 of "z28".

Thereby, in the present embodiment, the unnecessary store instruction and the unnecessary load instruction are not added to each of the instruction sequences 141a to 141d, so that it is possible to suppress the execution time of the instruction sequences 141a to 141d from becoming long.

FIG. 32 is a functional configuration diagram of the information processing apparatus 50 according to the present embodiment.

In FIG. 32, the same elements as those in the first to third embodiments are designated by the same reference numerals, and the description thereof will be omitted below.

As illustrated in FIG. 32, the information processing apparatus 50 includes the storage unit 51 and the control unit 52.

The storage unit 51 is a processing unit that stores the FIFO buffer 60.

The control unit 52 includes a calling unit 153, a storing unit 154, a judgement unit 155, an identification unit 156, a determination unit 157, a generation unit 158, and an output unit 159. Each of these units is realized by executing the assembly instruction conversion program 49 (see FIG. 8) in cooperation with the memory 50b and the processor 50c.

The calling unit 153 is a processing unit that calls the vpadd function 101 (see FIG. 26) and the ret function 113 (see FIG. 28(a)) which are the mnemonic functions.

The storage unit 154 is a processing unit that stores the generation instruction 110 in the FIFO buffer 111. As an example, the information processing apparatus 50 executes the code 104 (see FIG. 26B) and the code 115 (see FIG. 28A), so that the storage unit 154 is realized.

For example, each time the information processing apparatus 50 executes the code 104, the generation instruction 110 corresponding to the assembly instruction "vpadd" in which the operands of the arguments of the vpadd function 101 (see FIG. 26B) are specified is stored in the FIFO buffer 111. When the information processing apparatus 50 executes the code 115, the generation instruction 110 corresponding to the assembly instruction "ret" is stored in the FIFO buffer 111.

The judgement unit 155 is a processing unit that judges whether the type of the assembly instruction indicated by the generation instruction 110 stored in the FIFO buffer 111 is different from the type of the mnemonic function called by the calling unit 153. As an example, the judgement unit 155 is realized by the if statement 102 of FIG. 26B and the if statement 114 of FIG. 28A.

The identification unit 156 is a processing unit that identifies the first vector register 35 that is not used by any of the assembly instructions corresponding to the plurality of generation instructions 110 by referring to the FIFO buffer 111. For example, the identification unit 156 is realized by the getTmpIndexConsideringFifo function in the code 125 (see FIG. 30).

The determination unit 157 is a processing unit that determines the second vector register 45 corresponding to the first vector register 35 identified by the identification unit 156 as the temporary register used by each of the instruction sequences 141a to 141d. As an example, the determination unit 157 is realized by the code 125 of FIG. 30. A value assigned to the class variable "index" of the variable "zSrc2" in the code 125 is the register number of the temporary register.

The generation unit 158 is a processing unit that generates the machine language of each of the instruction sequences 141a to 141d (see FIG. 31) that executes the processing equivalent to each of the assembly instructions corresponding to the generation instructions 110 for each of the generation instructions 110 in the FIFO buffer 111. In this example, the generation unit 158 is realized by the translateVPADD function 118 of FIG. 30. Since the translateVPADD function 118 does not add the store instruction and the load instruction to all the instruction sequences 141a to 141d as described with reference to FIG. 31, it is possible to suppress an increase in the number of instructions.

Further, the generation unit 158 adds, to the beginning of the machine language sequence of the instruction sequence 141a, the machine language of the store instruction 142 that saves the data of the second vector register 45 used as the temporary register to the second memory 42. This function is realized by the code 126 of FIG. 30, for example.

Further, the generation unit 158 adds, to the end of the machine language sequence of the instruction sequence 141d, the machine language of the load instruction 143 that returns the data to the original second vector register 45. This function is realized by the code 133 of FIG. 30, for example.

The output unit 159 is a processing unit that outputs, to the outside, the machine language sequence of each of the instruction sequences 141a to 141d, the store instruction 142 and the load instruction 143.

Next, a description will be given of the assembly instruction conversion method according to the present embodiment.

Figure 33:
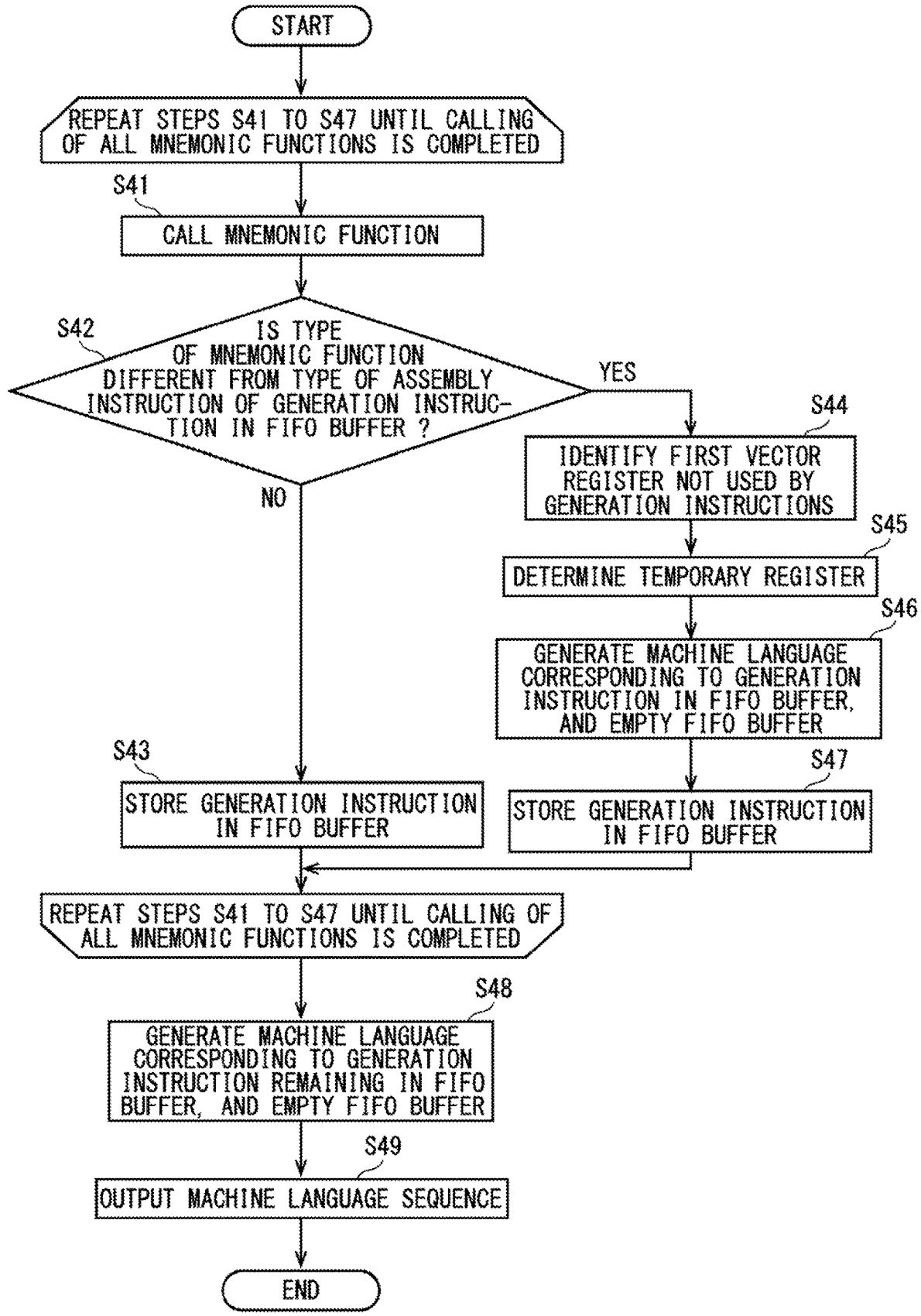
FIG. 33 is a flowchart of the assembly instruction conversion method according to the fourth embodiment.

FIG. 33 is a flowchart of the assembly instruction conversion method according to the present embodiment.

First, the calling unit 153 calls the mnemonic function (step S41). As an example, the information processing apparatus 50 calls the vpadd function 101 (see FIG. 26B) and the ret function 113 (see FIG. 28A) which are the mnemonic functions.

Next, the judgement unit 155 judges whether the type of the assembly instruction of the generation instruction 110 in the FIFO buffer 111 is different from the type of the mnemonic function called in step S41 (step S42). At this time, the judgement unit 155 also judges whether the FIFO buffer 111 is empty.

When the FIFO buffer 111 is empty, or when the type of the assembly instruction of the generation instruction 110 is the same as the type of the mnemonic function (step S42: NO), the process proceeds to step S43.

In step S43, the storing unit 154 stores the generation instruction 110 in the FIFO buffer 111. When the vpadd function 101 which is the mnemonic function is called in step S41, the generation instruction 110 becomes an instruction that generates the machine language of the assembly instruction of Armv8-A which executes the processing equivalent to the assembly instruction "vpadd". Further, when the ret function 113 which is the mnemonic function is called in step S41, the generation instruction 110 becomes an instruction that generates the machine language of the assembly instruction of Armv8-A which executes the processing equivalent to the assembly instruction "ret".

On the other hand, when the type of the assembly instruction of the generation instruction 110 in the FIFO buffer 111 is different from the type of the mnemonic function called in step S41 (step S42: YES), the process proceeds to step S44. As an example, when the name of the assembly instruction indicated by the generation instruction 110 stored in the FIFO buffer 111 is "vpadd" and the mnemonic function ret is called in step S41, the process proceeds to step S44.

In step S44, the identification unit 156 identifies the first vector register 35 that is not used by any of the assembly instructions corresponding to the plurality of generation instructions 110 by referring to the FIFO buffer 111.

Next, the determination unit 157 determines the second vector register 45 corresponding to the first vector register 35 identified in step S44 as the temporary register used by each of the instruction sequences 141a to 141d (see FIG. 31) (step S45).

Next, the generation unit 158 generates the machine language of each of the instruction sequences 141a to 141d (see FIG. 31) that executes the processing equivalent to each of the assembly instructions corresponding to the generation instructions 110 for each of the generation instructions 110 in the FIFO buffer 111 (step S46). At this time, since the generation unit 158 does not add the store instruction and the load instruction to all the instruction sequences 141a to 141d, it is possible to suppress the increase in the number of instructions.

Further, the generation unit 158 adds the machine language of the store instruction 142 to the beginning of the machine language sequence of the instruction sequence 141a, and adds the machine language of the load instruction 143 to the end of the machine language sequence of the instruction sequence 141d.

After that, the information processing apparatus 50 empties the FIFO buffer 111 by executing the code 121 (see FIG. 29).

Next, the storing unit 154 stores the generation instruction 110 corresponding to the mnemonic function called in step S41 in the FIFO buffer 111 (step S47).

After that, steps S41 to S47 are repeated until the calling unit 153 calls all the mnemonic functions described in the source code of the assembly instruction conversion program 49.

Next, the information processing apparatus 50 generates the machine language of the generation instruction 110 remaining in the FIFO buffer 111 and empties the FIFO buffer 111 by executing the genJitCodeOfFifo function 103 (see FIG. 29) (step S48).

Next, the output unit 159 outputs the machine language sequence of each of the instruction sequences 141a to 141d, the store instruction 142 and the load instruction 143 to the outside (step S49).

This completes the basic processing of the assembly instruction conversion method according to the present embodiment.

According to the present embodiment described above, the first vector register 35 corresponding to the temporary register determined by the determination unit 157 does not use any of the assembly instructions corresponding to the plurality of generation instructions 110 in the FIFO buffer 111.

Therefore, the generation unit 158 does not need to include, in each of the instruction sequences 141a to 141d, the store instruction that saves the data in the temporary register to the second memory 42 and the load instruction that returns the data to the temporary register. As a result, it is possible to suppress each of the instruction sequences 141a to 141d from becoming unnecessarily long due to the store instruction and the load instruction.

Fifth Embodiment

In the fourth embodiment, the translateVPADD function 118 is defined so as not to generate the unnecessary store and load instructions, as described with reference to FIG. 30.

In contrast, a fifth embodiment realizes the same processing as the second embodiment by defining the translateVPADD function 118 as follows.

Figure 34:
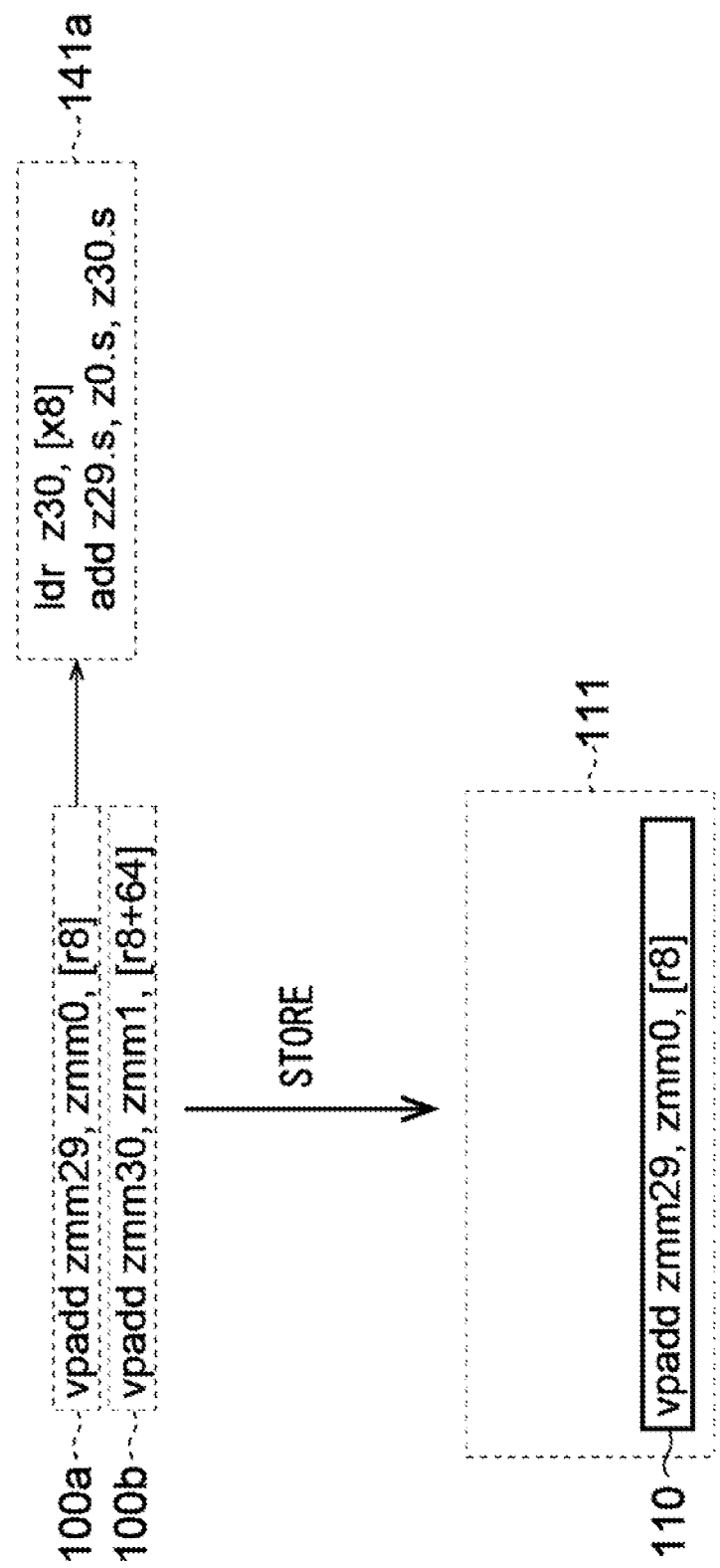
FIG. 34 is a schematic diagram illustrating processing realized by the translateVPADD function according to the fifth embodiment.

FIG. 34 is a schematic diagram illustrating processing realized by the translateVPADD function 118 according to the present embodiment.

In FIG. 34, it is assumed that mnemonic functions 100a and 100b that generate the machine languages of Armv8-A that realize the processing equivalent to the assembly instructions of x86_64 are called in this order. The vpadd function 100a called first is a mnemonic function that generates tire machine language of Armv8-A that realizes the processing equivalent to the assembly instruction "vpadd zmm29, zmm0, [r8]" of x86_64. The vpadd function 100b called next is a mnemonic function that generates the machine language of Armv8-A that realizes the processing equivalent to the assembly instruction "vpadd zmm30, zmm1, [r8+64]" of x86_64.

In this ease, the information processing apparatus 50 stores the generation instruction 110 corresponding to the mnemonic function 100a called first in the FIFO buffer 111.

Then, the translateVPADD function 118 refers to the FIFO buffer 111 and judges whether both the condition A and the condition B of FIG. 35 are satisfied for each of the vpadd functions 100a and 100b.

FIG. 35 is a schematic diagram illustrating the conditions judged by the translateVPADD function 118. The conditions A and B are equivalent to those in FIG. 16.

The condition A is a condition that the destination register of the assembly instruction vpadd corresponding to the mnemonic function 100b is different from the source register of the assembly instruction vpadd corresponding to the mnemonic function 100a.

The condition B is a condition that the destination register and the source register of the assembly instruction vpadd corresponding to the mnemonic function 100b are different from each other.

In the example of FIG. 34, both of the conditions A and B are satisfied. In this ease, the translateVPADD function 118 determines the second vector register 45 corresponding to the destination register of the vpadd function 100b as the temporary register. Then, the translateVPADD function 118 uses the temporary register for the instruction sequence 141a of Armv8-A corresponding to the assembly instruction of the vpadd function 100a, and generates the machine language of the instruction sequence 141a.

Further, the translateVPADD function 118 docs not generate the store instruction that saves the data in the temporary register to the second memory 42 and the load instruction that returns the data to the temporary register. Thereby, it is possible to suppress the instruction sequence from becoming unnecessarily long due to the store instruction and the load instruction.

FIG. 36 is a schematic diagram of a pseudo source code described by C++ indicating an example of the definition of a translateVPADD function 138 according to the present embodiment which realizes the above processing. In FIG. 36, the explanation of the types and the variables described in the fourth form is omitted.

When the translateVPADD function 118 is called, a return value of the getTmpIndexConsideringFifo function is assigned to the class variable "index" of the variable "zSrc2" in a code 171.

The getTmpIndexConsideringFifo function according to the present embodiment is a function that returns the register number of the temporary register, but the return value thereof changes depending on whether both of the conditions A and B of FIG. 35 are satisfied.

If both of the conditions A and B are satisfied, the getTmpIndexConsideringFifo function returns the register number of the destination register of the assembly instruction corresponding to the vpadd function 100b. In the example of FIG. 34, the register number is "30".

On the other hand, if both of the conditions A and B are not satisfied, the getTmpIndexConsideringFifo function returns the register number that is not used by both of the generation instruction 110 and the vpadd function 100b in the FIFO buffer 111. If there are the plurality of register numbers, the getTmpIndexConsideringFifo function returns a maximum value among the plurality of register numbers.

Next, in a code 172, a value of a isTmpCanDiscard function is assigned to a variable "TmpCanDiscard". The isTmpCanDiscard function is a function that returns "true" if both of the conditions A and B are satisfied, and "false" otherwise.

Then, when "false" is assigned to the variable "TmpCanDiscard", the str function is executed in a code 173. As described in the fourth embodiment, the str function is a mnemonic function that generates the machine language of the assembly instruction "str" of Armv8-A. The register number of the temporary register determined by the getTmpIndexConsideringFifo function is stored in the first operand "zSrc2" of the assembly instruction "str". The second operand of the assembly instruction "str" is a memory address stored in the second general-purpose register 46 indicated by "x9" which is predetermined by the developer.

Thereby, the data stored in the temporary register determined by the getTmpIndexConsideringFifo function is saved in the memory address indicated by "x9".

Here, it is assumed that the member variable "offset" of the third operand "memOp" of the "memOperand" type of the assembly instruction "vpadd" indicated by the generation instruction 110 in the FIFO buffer 111 is "0". In this case, in a code 174, the class variable "index" of the variable "memOp" of the generation instruction 110 is assigned to the class variable "index" of the variable "xaddr" of the "XReg" type.

In contrast, it is assumed that the member variable "offset" of the third operand "memOp" of the "memOperand" type of the assembly instruction "vpadd" indicated by the generation instruction 110 is not "0".

In this case, in a code 175, the value of the class variable "index" of the variable "memOp" is assigned to the class variable "index" of the variable "tmp" of the "XReg" type. Then, the add function is executed in a code 176. The first operand of the assembly instruction "add" corresponding to the add function is the second general-purpose register 46 of "x25" predetermined by the developer. The second operand of the assembly instruction "add" is the second general-purpose register corresponding to the variable "tmp". The third operand of the assembly instruction "add" is the memory address indicated by the class variable "offset" of the variable of the generation instruction 110.

Next, in a code 177, a value "25" predetermined by the developer is assigned to the class variable "index" of the variable "xaddr".

Then, the ldr function is executed in a code 178. The first operand of the assembly instruction "ldr" corresponding to the ldr function is the second vector register 45 corresponding to "zSrc2". The second operand of the assembly instruction "ldr" is the memory address stored in the second general-purpose register 46 indicated by the variable "xaddr".

Next, the add function is executed in a code 179. The first and second operands of the assembly instruction "add" corresponding to the add function are the variables "zSdst" and "zSrc1" of the ZReg type, respectively. The third operand of the assembly instruction "add" is the variable "zSrc2" in which the register number of the temporary register is stored, in the code 171.

After that, when "false" is assigned to the variable "TmpCanDiscard", the ldr function is executed in a code 180. The argument of the ldr function is the same as the argument of the str function in code 173. Thereby, the data saved in the memory address indicated by "x9" is returned to the second vector register 45 corresponding to "zSrc2".

This completes the processing of the translateVPADD function 118.

Next, a description will be given of the functional configuration of the information processing apparatus 50 according to the present embodiment.

Figure 37:
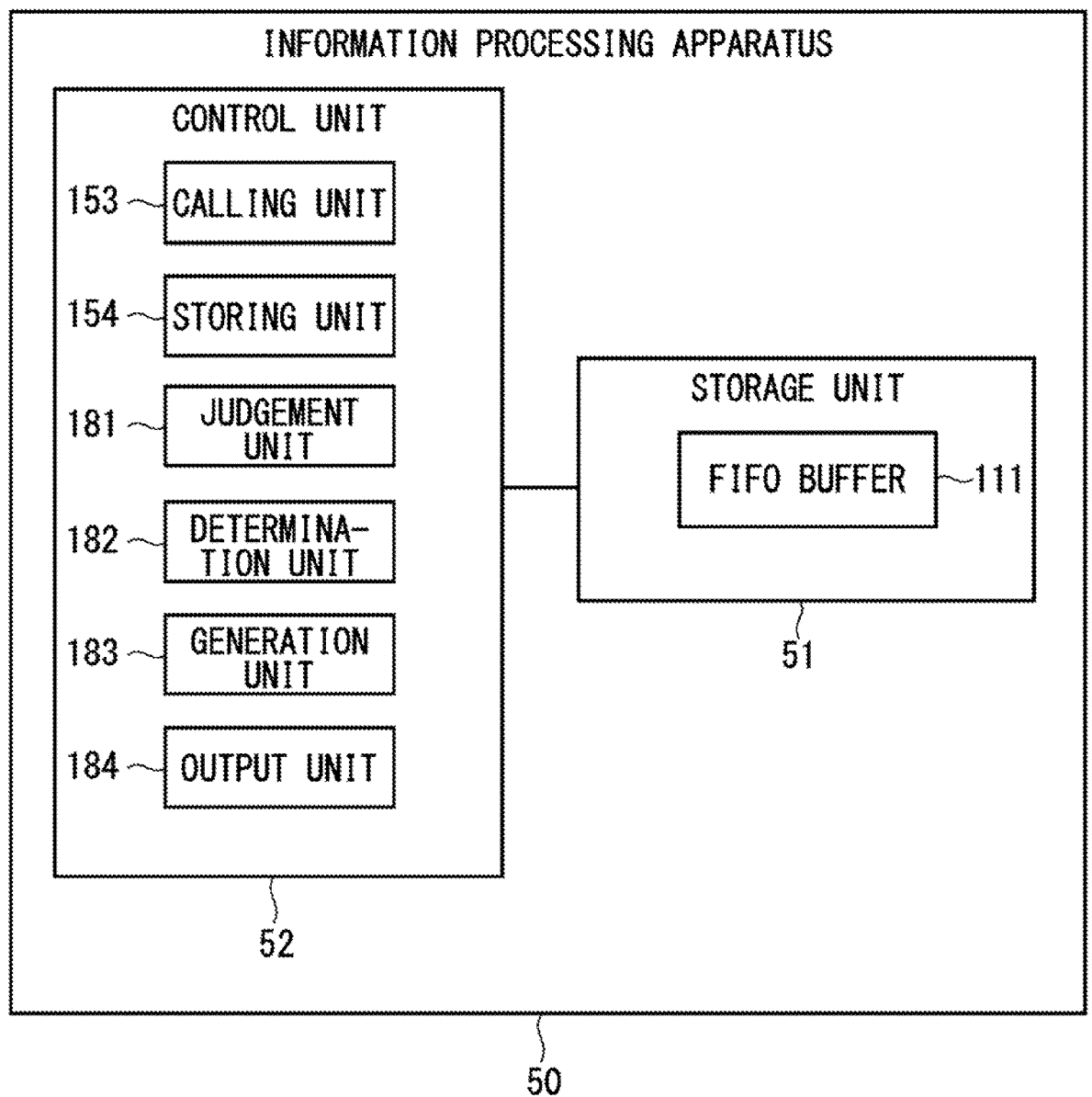
FIG. 37 is a functional configuration diagram of the information processing apparatus according to the fifth embodiment.

FIG. 37 is a functional configuration diagram of the information processing apparatus 50 according to the present embodiment. In FIG. 37, the same elements as those in the first to fourth embodiments are designated by the same reference numerals, and the description thereof will be omitted below.

As illustrated in FIG. 37, the control unit 52 of the information processing apparatus 50 includes a judgement unit 181, a determination unit 182, a generation unit 183, and an output unit 184 in addition to the calling unit 153 and the storing unit 154 described in the fourth embodiment.

The calling unit 153 is the processing unit that calls the mnemonic functions 100a and 100b of FIG. 34 in this order.

The storing unit 154 is the processing unit that stores the generation instruction 110 corresponding to each of the mnemonic functions 100a and 100b in the FIFO buffer 111.

The judgement unit 181 is a processing unit that judges whether both of the conditions A and B in FIG. 35 are satisfied based on tire mnemonic function 100a corresponding to the generation instruction 110 stored in the FIFO buffer 111 and the newly acquired mnemonic function 100b.

The determination unit 182 is a processing unit that determines the second vector register 45 corresponding to the destination register of the mnemonic function 100b as the temporary register in the instruction sequence 141a when both of the conditions A and B are satisfied.

The generation unit 183 is a processing unit that generates the machine language sequence of the instruction sequence 141a which use the temporary register determined by the determination unit 182. The output unit 184 is a processing unit that outputs the machine language sequence to the outside.

Next, a description will be given of the assembly instruction conversion method according to the present embodiment.

Figure 38:
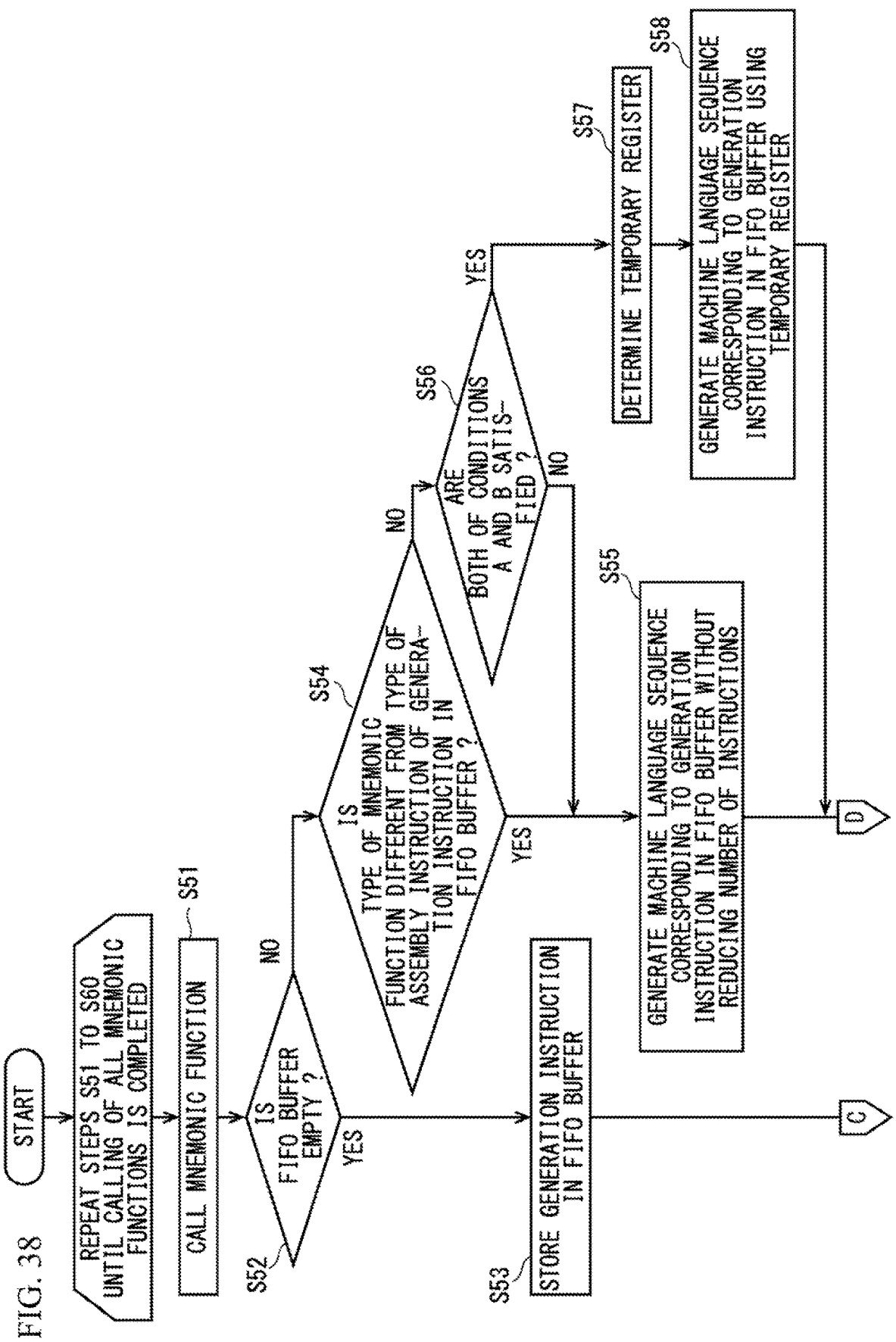
FIG. 38 is a flowchart of the assembly instruction conversion method according to the fifth embodiment (part 1)
Figure 39:
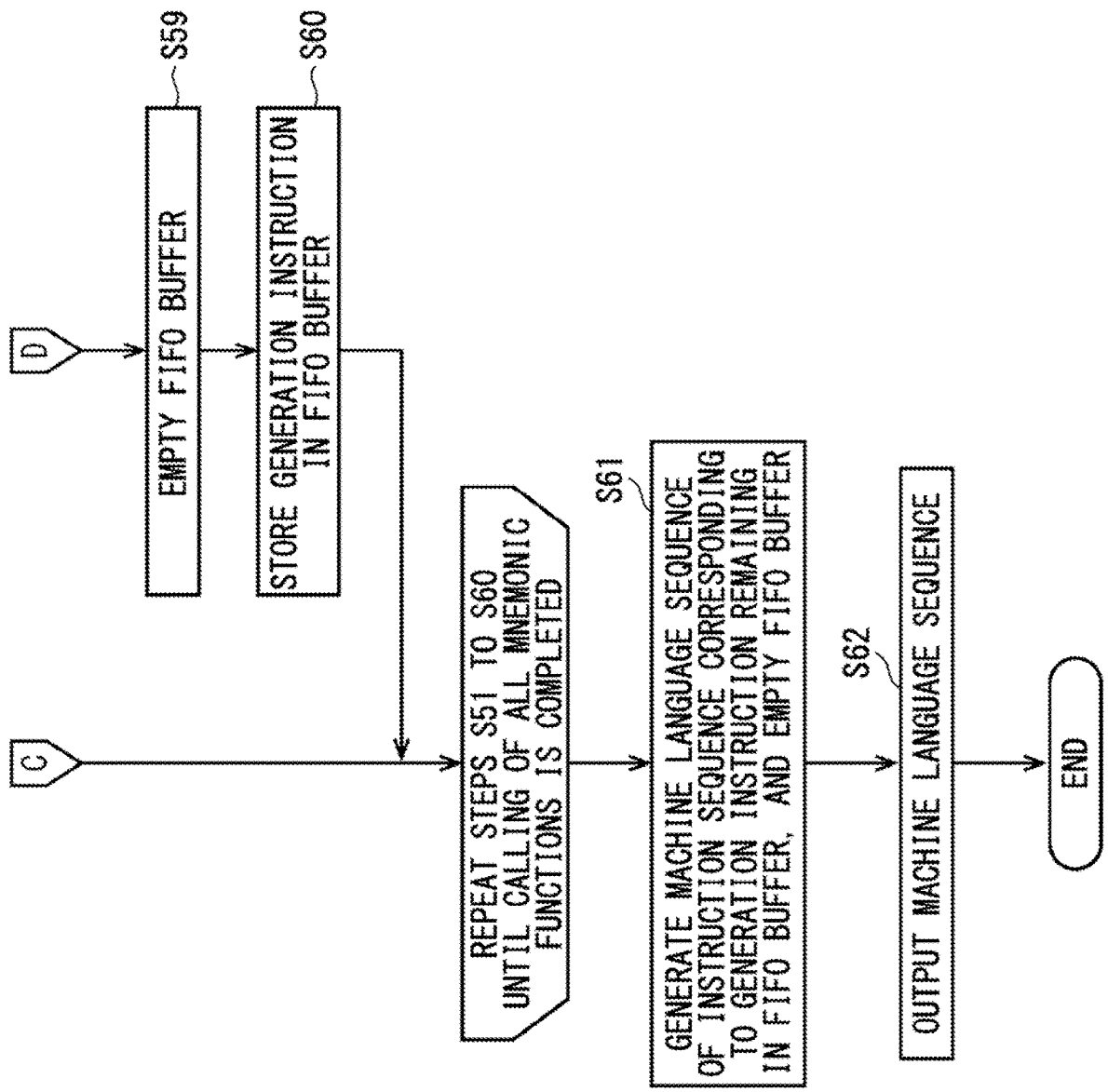
FIG. 39 is a flowchart of the assembly instruction conversion method according to the fifth embodiment (part 2)

FIGS. 38 and 39 are flowcharts of the assembly instruction conversion method according to the present embodiment.

First, the calling unit 153 calls the mnemonic function (step S51). For example, the information processing apparatus 50 calls a vpadd function 101 (see FIG. 26B) and the ret function 113 (see FIG. 28A) which are the mnemonic functions.

Next, the judgement unit 181 judges whether the FIFO buffer 111 is empty (step S52).

When the FIFO buffer 111 is empty (step S52: YES), the process proceeds to step S53. In step S53, the storing unit 154 stores the generation instruction 110 corresponding to the mnemonic function 100a acquired in step S51 in the FIFO buffer 111.

On the other hand, when the FIFO buffer 111 is not empty (step S52: NO), the process proceeds to step S54. In step S54, the judgement unit 181 judges whether the type of the assembly instruction of the generation instruction 110 in the FIFO buffer 111 is different from the type of the mnemonic function called in step S51.

When the type of the assembly instruction of the generation instruction 110 is the same as the type of the mnemonic function called in step S51 (step S54: NO), the process proceeds to step S56.

In step S56, the judgement unit 71 judges whether both of the conditions A and B of FIG. 35 are satisfied.

When both of the conditions A and B are not satisfied (step S56: NO), the process proceeds to step S55.

In step S55, the code 178 and 179 of FIG. 36 are executed, so that the machine language sequences of the respective assembly instructions "ldr" and "add" are generated. Further, when the memory offset is not "0" in the generation instruction 110 of the FIFO buffer 111, the machine language sequence of the assembly instruction "add" is also generated by executing the code 176.

Thus, when both of the conditions A and B are not satisfied, the machine language sequences of the store instruction "str" and the load instruction "ldr" are also generated by executing the code 173 and the code 180 in FIG. 36. In step S55, the number of instructions increases due to the store instruction and load instruction, and the reduction of the number of instructions is not executed.

Also, when the type of the assembly instruction of the generation instruction 110 is different from the type of the mnemonic function called in step S51 (step S54: YES), the process proceeds to step S55.

On the other hand, when both of the conditions A and B are satisfied (step S56: YES), the process proceeds to step S57.

In step S57, the determination unit 182 determines the second vector register 45 corresponding to the destination register of the mnemonic function 100b as the temporary register in the instruction sequence 141a.

Next, the generation unit 183 generates the machine language sequence of the instruction sequence 141a which uses the temporary register determined by the determination unit 182 in step S57 (step S58).

After completing step S55 or step S58 as described above, the process proceeds to step S59.

In step S59, the storing unit 154 empties the FIFO buffer 111.

Next, the storing unit 154 stores the generation instruction 110 corresponding to the mnemonic function called in step S51 in the FIFO buffer 111 (step S60).

After that, steps S51 to S60 are repeated until the calling unit 153 calls all the mnemonic functions described in the source code of the assembly instruction conversion program 49 (see FIG. 8).

Next, the generation unit 183 generates the machine language sequence of the instruction sequence of Armv8-A that executes the processing equivalent to the assembly instruction indicated by the generation instruction 110 remaining in the FIFO buffer 111 (step S61).

After that, the output unit 184 outputs, to the outside, the output file in which the respective machine language sequences generated in steps S55, S58, and S61 are described (step S62).

This completes the basic processing of the assembly instruction conversion method according to the present embodiment.

According to the present embodiment described above, the judgement unit 181 judges whether both of the conditions A and B of FIG. 35 are satisfied. When both of the conditions A and B are satisfied, the determination unit 182 determines the second vector register 45 corresponding to the destination register of the mnemonic function 100b as the temporary register in the instruction sequence 141a. The data in the temporary register is overwritten by the assembly instruction corresponding to the subsequent mnemonic function 100a. Therefore, the generation unit 183 does not need to generate the machine language of the store instruction that saves the data in the second memory 42 and the load instruction that returning the data to the temporary register. This can suppress the instruction sequence 141a from becoming unnecessarily long in the present embodiment.

Although each of the embodiments has been described in detail, each of the embodiments is not limited to the above.

FIGS. 40A to 40C are schematic diagrams for explaining other examples of the first embodiment and the second embodiment.

FIG. 40A is a schematic diagram illustrating a case where the information processing apparatus 50 generates the assembly file 67 for Armv8-A from the assembly file 65 for x86_64, as described in the first embodiment and the second embodiment.

Alternatively, the information processing apparatus 50 may acquire the assembly instruction which a disassembler for x86_64 generates from an execution file for x86_64, as illustrated in FIG. 40B. In this case, the information processing apparatus 50 generates the instruction sequence of Armv8-A according to the first embodiment or the second embodiment, and an assembler for Armv8-A converts the instruction sequence into an execution file for Armv8-A.

Further, the machine language for x86_64 stored in the first memory 32 of the first target machine 30 (see FIG. 6) may be used as a conversion source, as illustrated in FIG. 40C. In this case, the information processing apparatus 50 acquires the assembly instruction which the disassembler for x86_64 generates from the machine language. Then, the information processing apparatus 50 generates the instruction sequence of Armv8-A according to the first embodiment or the second embodiment, and the assembler for Armv8-A converts the instruction sequence into the machine language for Armv8-A and stores the machine language for Armv8-A in the second memory 42 of the second target machine 40 (sec FIG. 7).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium having stored therein a program for causing a computer to execute a process, the process comprising:
   storing each of a plurality of generation instructions in a storage area for each of assembly instructions, the generation instructions instructing the generation of instruction sequences of a first instruction set, each instruction sequence of the first instruction set executing a processing equivalent to each assembly instruction of a second instruction set;
   identifying a first register that is not used by any of the assembly instructions corresponding to the plurality of generation instructions by referring to the storage area;
   determining a second register of the first instruction set corresponding to the first register as a temporary register in each of the instruction sequences; and
   generating the instruction sequence that uses the temporary register.

2. The non-transitory computer-readable recording medium as claimed in claim 1, wherein
   each of the instruction sequences does not include a store instruction that saves data in the second register to a memory and a load instruction that returns the data to the second register.

3. The non-transitory computer-readable recording medium as claimed in claim 1, the process further comprising:
   adding, to a beginning of the plurality of instruction sequences, a store instruction that saves data in the second register to a memory; and
   adding, to an end of the plurality of instruction sequences, a load instruction that returns the data to the second register.

4. A non-transitory computer-readable recording medium having stored therein a program for causing a computer to execute a process, the process comprising:
   storing a generation instruction in a storage area, where the generation instruction instructing a generation of an instruction sequence of a first instruction set that executes a processing equivalent to a first assembly instruction, the first assembly instruction being adjacent to a second assembly instruction and preceding the second assembly instruction, the first assembly instruction and the second assembly instruction belonging to a second instruction set;
   when a destination register of the second assembly instruction is different from a source register of the first assembly instruction corresponding to the generation instruction and a source register of the second assembly instruction is different from the destination register, determining a register of the first instruction set corresponding to the destination register as a temporary register in the instruction sequence; and
   generating the instruction sequence that uses the temporary register.

5. A non-transitory computer-readable recording medium having stored therein a program for causing a computer to execute a process, the process comprising:

acquiring an assembly file in which an assembly instruction of a first instruction set is described;

when the assembly file includes a code specifying a first register, determining a second register of a second instruction set corresponding to the first register as a temporary register in an instruction sequence of the second instruction set that executes a processing equivalent to the assembly instruction; and outputting the instruction sequence in which the temporary register is set.

6. The non-transitory computer-readable recording medium as claimed in claim 5, the process further comprising:

adding a name of the first register to a list when the assembly file includes the code; and determining the second register as the temporary register when the list includes the name.

7. The non-transitory computer readable recording medium as claimed in claim 6, the process further comprising:

deleting the name from the list when the first register is specified as a destination register in the assembly instruction.

8. A non-transitory computer-readable recording medium having stored therein a program for causing a computer to execute a process, the process comprising:

calling multiple times a function that generates a machine language of a first instruction set that executes a processing equivalent to an assembly instruction of a second instruction set;

storing a plurality of generation instructions in a storage area each time the function is called, each generation instruction instructing the generation of the machine language for each assembly instruction;

identifying a first register that is not used by any of a plurality of assembly instructions corresponding to the plurality of generation instructions by referring to the storage area;

determining a second register of the second instruction set corresponding to the first register as a temporary register in the machine language; and making the function generate the machine language that uses the temporary register for each generation instruction.

9. An assembly instruction conversion method for causing a computer to execute a process, the process comprising:

storing each of a plurality of generation instructions in a storage area for each of assembly instructions, the generation instructions instructing the generation of instruction sequences of a first instruction set, each instruction sequence of the first instruction set executing a processing equivalent to each assembly instruction of a second instruction set;

identifying a first register that is not used by any of the assembly instructions corresponding to the plurality of generation instructions by referring to the storage area;

determining a second register of the first instruction set corresponding to the first register as a temporary register in each of the instruction sequences; and generating the instruction sequence that uses the temporary register.

10. An information processing apparatus comprising:

a memory including a storage area;

a processor coupled to the memory, and the processor configured to:

store each of a plurality of generation instructions in the storage area for each of assembly instructions, the generation instructions instructing the generation of instruction sequences of a first instruction set, each instruction sequence of the first instruction set executing a processing equivalent to each assembly instruction of a second instruction set;

identify a first register that is not used by any of the assembly instructions corresponding to the plurality of generation instructions by referring to the storage area;

determine a second register of the first instruction set corresponding to the first register as a temporary register in each of the instruction sequences; and generate the instruction sequence that uses the temporary register.

* * * * *